US012297031B2

(12) United States Patent
Pawlick et al.

(10) Patent No.: US 12,297,031 B2
(45) Date of Patent: May 13, 2025

(54) COOKING METHOD AND APPARATUS

(71) Applicant: Conagra Foods RDM, Inc., Chicago, IL (US)

(72) Inventors: Adam Pawlick, Omaha, NE (US); Keith Goerl, Omaha, NE (US); Michael R. Opat, Jr., Omaha, NE (US); Julia A. Zielke, Omaha, NE (US); Steven R. Baker, Omaha, NE (US); David W. France, Minneapolis, MN (US)

(73) Assignee: CONAGRA FOODS RDM, INC., Chicago, IL (US)

( * ) Notice: Subject to any disclaimer, the term of this patent is extended or adjusted under 35 U.S.C. 154(b) by 56 days.

(21) Appl. No.: 18/071,313

(22) Filed: Nov. 29, 2022

(65) Prior Publication Data

US 2023/0159258 A1    May 25, 2023

Related U.S. Application Data

(63) Continuation of application No. 16/427,792, filed on May 31, 2019, now abandoned, which is a
(Continued)

(51) Int. Cl.
*B65D 81/34* (2006.01)
*B65D 21/02* (2006.01)
(Continued)

(52) U.S. Cl.
CPC ..... *B65D 81/3453* (2013.01); *B65D 21/0206* (2013.01); *B65D 21/0209* (2013.01);
(Continued)

(58) Field of Classification Search
CPC ............ B65D 81/3453; B65D 81/3216; B65D 81/343; B65D 3581/3433;
(Continued)

(56) References Cited

U.S. PATENT DOCUMENTS 3,287,140 A * 11/1966 Brussell ............. B65D 81/3484
126/262
4,941,401 A * 7/1990 Sarnoff ................... A47J 36/04
D7/354
(Continued)

FOREIGN PATENT DOCUMENTS

FR         2774262 A1 *  8/1999   ......... B65D 81/3407
JP      H06293366 A  * 10/1994
(Continued)

OTHER PUBLICATIONS

JP H06-293366 A (Nakagome, Takashi) Oct. 21, 1994 [retrieved on Jun. 15, 2024]. Retrieved from Foreign Image and Text database, translation by Clarivate Analytics. (Year: 1994).*

*Primary Examiner* — John J Norton
(74) *Attorney, Agent, or Firm* — Ryan T. Grace; Advent, LLP

(57) ABSTRACT

An ovenable cooking apparatus for facilitating the cooking of food components while maintaining the separateness thereof may include a first container for holding a first food component, and a second container for holding a second food component. The separation of the first food component from the second food component maintains the surface area for the first and second food components to facilitate heating of the first and second food components. The first food component may have a liquid based content for producing steam when heated, and one or both of the first container and the second container may define a passage for providing airflow and steam flow for contacting the second container and/or the second foodstuff and heating or steaming the second food component. Additionally, the second container may be steam impermeable for cooking bread and the like.

14 Claims, 56 Drawing Sheets

Related U.S. Application Data continuation of application No. 15/351,718, filed on Nov. 15, 2016, now Pat. No. 11,634,262, which is a continuation of application No. 13/614,426, filed on Sep. 13, 2012, now Pat. No. 10,569,949, which is a continuation of application No. 11/903,732, filed on Sep. 24, 2007, now Pat. No. 8,302,528, which is a continuation-in-part of application No. 11/703,066, filed on Feb. 5, 2007, now Pat. No. 8,850,964, which is a continuation-in-part of application No. 11/423,259, filed on Jun. 9, 2006, now Pat. No. 9,211,030.

(60) Provisional application No. 60/728,468, filed on Oct. 20, 2005.

(51) Int. Cl.
  *B65D 25/04* (2006.01)
  *B65D 25/24* (2006.01)
  *B65D 77/00* (2006.01)
  *B65D 77/22* (2006.01)
  *B65D 81/32* (2006.01)

(52) U.S. Cl.
  CPC ......... *B65D 21/0224* (2013.01); *B65D 25/04* (2013.01); *B65D 25/24* (2013.01); *B65D 77/003* (2013.01); *B65D 77/225* (2013.01); *B65D 81/3216* (2013.01); *B65D 81/343* (2013.01); *B65D 81/3438* (2013.01); *B65D 2581/3404* (2013.01); *B65D 2581/3418* (2013.01); *B65D 2581/3425* (2013.01); *B65D 2581/3428* (2013.01); *B65D 2581/3433* (2013.01)

(58) Field of Classification Search
  CPC .... B65D 3581/3456; B65D 2581/3433; B65D 2581/3456
  See application file for complete search history.

(56) References Cited

U.S. PATENT DOCUMENTS

| | | | | |
|---|---|---|---|---|
| 6,097,017 | A * | 8/2000 | Pickford | B65D 81/261 |
| | | | | 99/DIG. 14 |
| 6,175,105 | B1 * | 1/2001 | Rubbright | A23L 23/10 |
| | | | | 426/243 |
| 6,217,918 | B1 * | 4/2001 | Oh | B65D 81/3453 |
| | | | | 426/243 |
| 2005/0051549 | A1 * | 3/2005 | Nelson | B65D 81/3216 |
| | | | | 220/23.83 |

FOREIGN PATENT DOCUMENTS

| | | | | |
|---|---|---|---|---|
| WO | WO-2007043154 | A1 * | 4/2007 | ............... A23L 5/15 |
| WO | WO-2007056866 | A1 * | 5/2007 | ............. A23L 35/00 |

* cited by examiner

COOKING METHOD AND APPARATUS

CROSS-REFERENCE TO RELATED APPLICATIONS

This application is a continuation application of U.S. application Ser. No. 16/427,792 filed May 31, 2019, which is a continuation of U.S. application Ser. No. 15/351,718 filed Nov. 15, 2016, which is a continuation of U.S. application Ser. No. 13/614,426 filed Sep. 13, 2012, now U.S. Pat. No. 10,569,949, which is a continuation of U.S. application Ser. No. 11/903,732 filed Sep. 24, 2007, now U.S. Pat. No. 8,302,528, which is a continuation-in-part of U.S. patent application Ser. No. 11/703,066 filed Feb. 5, 2007, now U.S. Pat. No. 8,850,964, which is a continuation-in-part of U.S. patent application Ser. No. 11/423,259 filed Jun. 9, 2006, now U.S. Pat. No. 9,211,030, which claims priority from U.S. Provisional Application Ser. No. 60/728,468 filed Oct. 20, 2005. The complete disclosures of the aforementioned applications are incorporated herein by reference in their entirety.

BACKGROUND

Prepared foods, such as those appearing in supermarkets, take-out establishments, and the like, while appearing to be home cooked, may be typically expensive. Additionally, like fast food, these prepared foods lack nutritional value, and may be usually high in calories, salt, and fat. Accordingly, both fast food and prepared foods do not appeal to health conscious consumers.

To address some of the problems of intermixed frozen meals, a food container for use in a microwave with an internal separator dividing the container into upper and lower compartments were developed. The upper compartment may be configured for a food product and the lower for a water or water-containing medium. The separator may be a thin perforated sheet that may be designed to snap into place with evenly spaced internal lugs. When the food container may be placed in the microwave and heated the steam created by the water medium passes through the separator to steam the product. The problem with this food container may be that the separator may be configured to latch into place for use with the container, thereby inhibiting the availability of the water-containing medium after the food product may be steamed.

Therefore a need still exists for an ovenable cooking apparatus that facilitates improved cooking of a food product in microwave ovens, conventional ovens, combination ovens and all other typical cooking apparatuses which separates the food product from the sauce or liquid and allows the consumer to easily access the food product and sauce after cooking.

There exists a similar need for improvements in the food service industry. The food service industry currently prepares food in commercial settings using foodservice tray pans that include a mixture of food ingredients. Typically, the food comprises a frozen mass of ingredients such as starch, protein, vegetables, and sauce. To prepare and serve the food, the frozen foodservice tray may be heated in an oven, commercial oven, convection oven, combination oven, microwave oven, steam cooker, or the like. Because the food ingredients may be frozen in a large mass, the heating times can be from one to two hours or more. The quality of the food using this method may sometimes be undesirable, resulting in overcooked or undercooked ingredients, variation in food texture, or discoloration of the food ingredients. Further, consumers cannot plate their meals according to their individual tastes because all the ingredients may be mixed together. The current method may be also incompatible with breaded ingredients because they come out soggy and do not meet consumer approval.

Accordingly, it would be desirable to provide a method and apparatus for preparing food in the commercial food sector that may be more efficient and produces higher quality food products.

SUMMARY

An ovenable cooking apparatus may comprise one or more upper compartments and one or more lower compartments for food components wherein one or more of the upper compartments may be perforated. The compartments may be arranged such that a food component in an upper compartment may be cooked by steam generated by heating a food component in the lower compartment until at least a portion of the food component boils. The generated steam may enter the upper compartment through openings in the base and side walls of an upper compartment.

An ovenable cooking apparatus may include at least first and second substantially coplanar compartments wherein one or more solid food components and a liquid component may be maintained in spatial separation so as to avoid their commingling during storage or cooking. The apparatus may further comprise conduits between the coplanar compartments thereby permitting the transfer of steam generated from the liquid component so as to contact the solid food components.

BRIEF DESCRIPTION OF THE DRAWINGS

The numerous advantages of the apparatus may be better understood by those skilled in the art by reference to the accompanying figures in which.

DETAILED DESCRIPTION

Figure 1A:
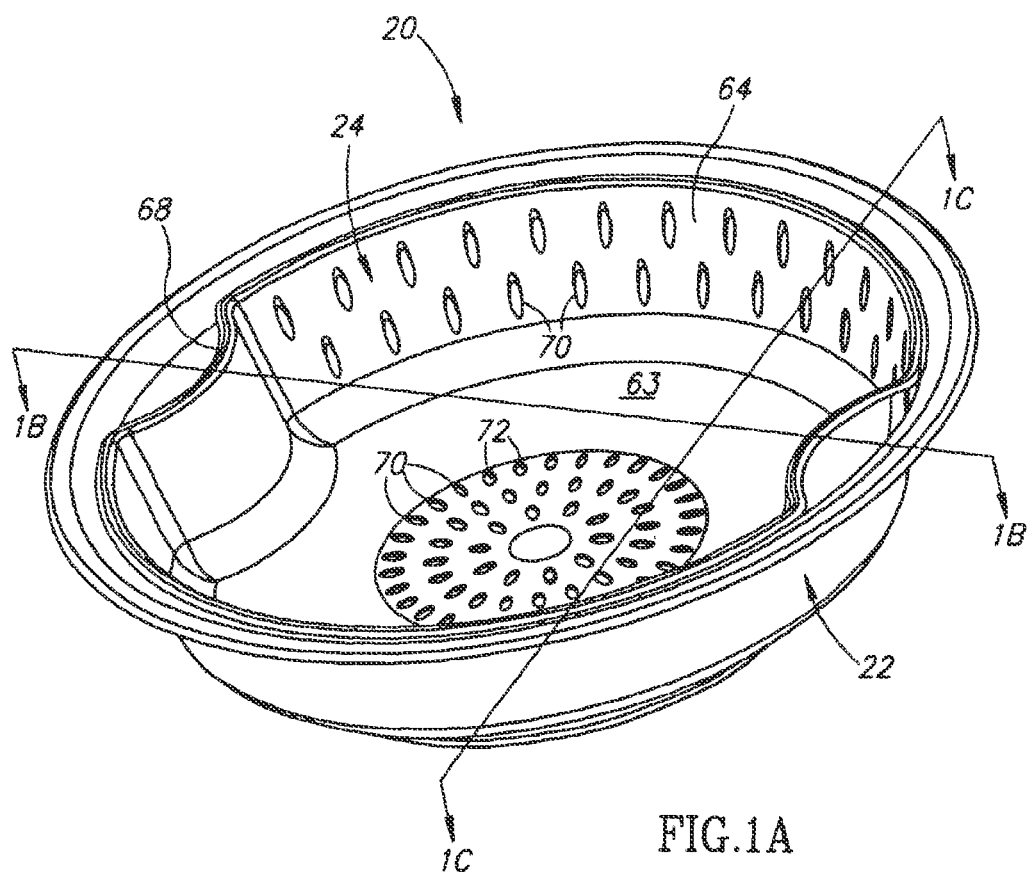
FIG. 1A is a perspective view of a cooking apparatus.

Reference will now be made in detail to the cooking apparatus and methods, examples of which may be illustrated in the accompanying drawings. Throughout this document there may be references to directions and positions. These directional and positional references may be to the apparatus in typical orientations. The references include upper, lower, top, bottom, above, below, and may be exemplary only. They may be not limiting in any way, as they may be for description and explanation purposes. The terms "cooking" and "heating," and variations thereof, may be collectively known as "cooking."

An ovenable cooking or heating apparatus may be suitable for use with conventional, convection, combination, or microwave ovens as well as steamers. The apparatus may have separate compartments for different foods or food components, such that the separateness and integrity of each food type may be maintained from processing (filling and packaging) through storage and cooking.

The second or upper compartment may be received by the first or lower compartment such that after the food product may be heated, the compartments may be easily separated. The apparatus may also include a sheet of barrier material sealing the combined compartments and food products.

As the apparatus may be heated, at least a portion of a first food component in the first or lower compartment boils producing steam. The first food component may comprise liquids, gels, partially liquid or gelatinous compositions, and mixtures thereof (hereinafter collectively referred to as "liquid components"). Examples of such liquid components may include sauces, gravies, solid food components in sauces or gravies, broths, juices, beer, wine, spirits, sodas, oils, water and the like as well as frozen, refrigerated or shelf-stable formulations thereof. Such liquid components may also be used in dehydrated or partially dehydrated formulations (hereinafter collectively referred to as dehydrated liquid components) which may or may not be subjected to rehydration.

The steam may be utilized to cook the second food component in the upper compartment. Further, the second compartment may be steam impermeable. The steam may rise into the second or upper compartment thereby steam cooking the second food component. The second or upper compartment may include a plurality of openings that allow the steam to pass from the first and lower compartment into the second or upper compartment. The sheet of barrier material ensures that the food product may be cooked uniformly by preventing the steam from escaping the compartments or dissipating into the atmosphere during cooking. Although, the apparatus may be designed such that the foods or food components in each of the compartments cook simultaneously, as the compartments may be easily separated, the consumer may choose to consume the steamed second food product by itself or in combination with the first food component.

FIGS. 1A-3C show an apparatus 20 for holding separate food components to maintain the separateness and integrity of the components during storage and cooking. The food components may be combined after cooking by the user. Apparatus 20 may also be of any general. Suitable shapes include circular, oval, rectangular, square, among others. As shown in FIGS. 1A-3C, the apparatus 20 may be of circular shape. The apparatus 20 may include a container 22 and a basket 24, that may be separate pieces, with the basket 24 constructed to be received by the container 22.

The container 22 holds a first food component. The basket 24, may be received and held by the container 22, and may be in coaxial alignment with the container 22. The basket 24 typically holds a solid food component, such as starches and/or proteins, such as rice, grains, and pasta, vegetables, or other particulate foods, that may be typically steam cooked. Accordingly, the basket 24 may include openings 70 in its base 63 and its sidewalls 64 that allow steam, generated by the cooking of the first component, to enter the basket 24, and cook the second food component. The openings 70 may be also dimensioned to allow liquids, such as water and the like, generated in the upper compartment during cooking, to drain into the container 22.

Figure 2A:
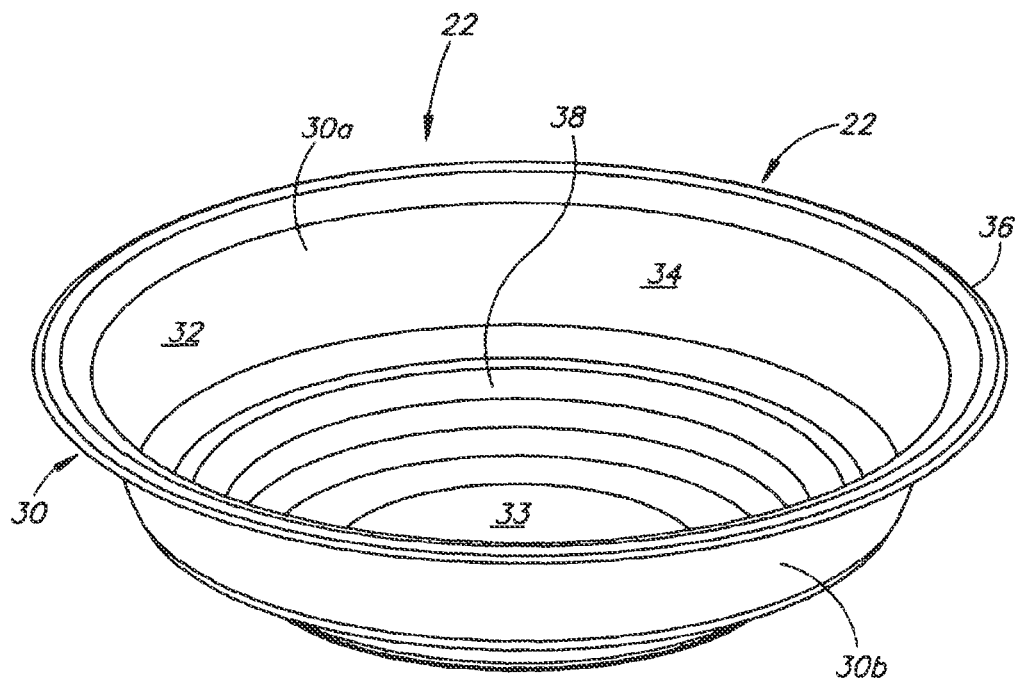
FIG. 2A is a perspective view of a container of a cooking apparatus.
Figure 2B:
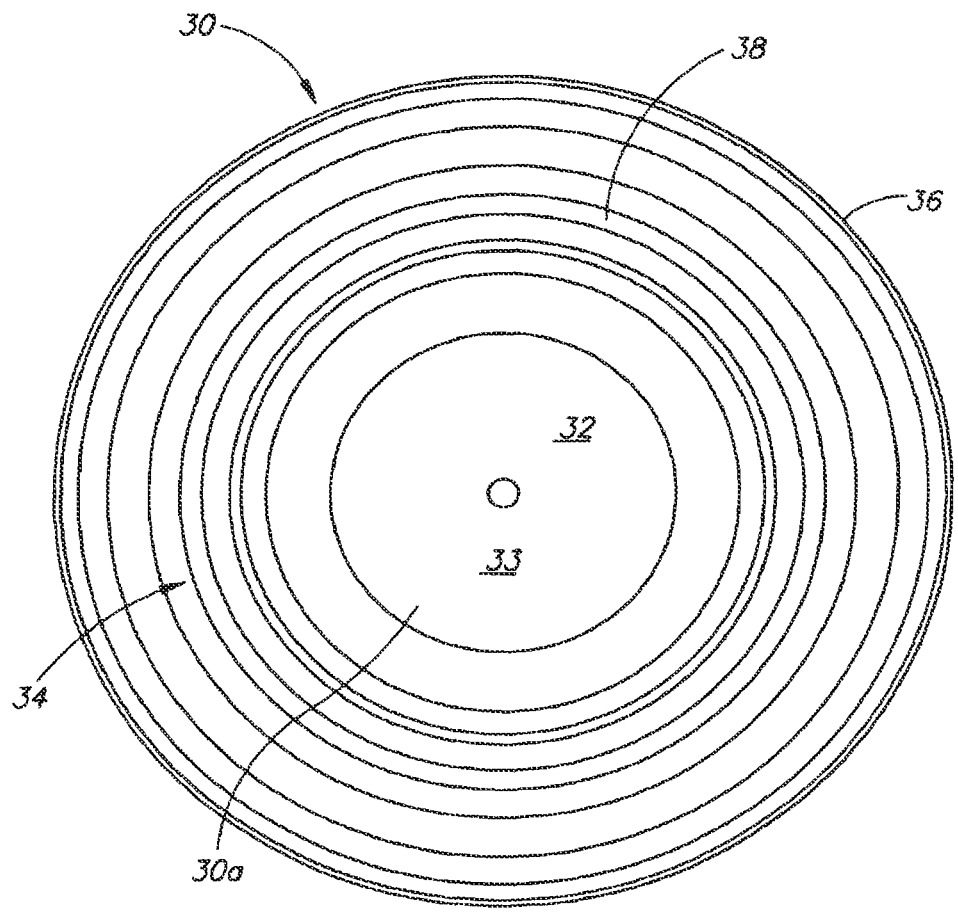
FIG. 2B is a top view of a container of a cooking apparatus.
Figure 2C:
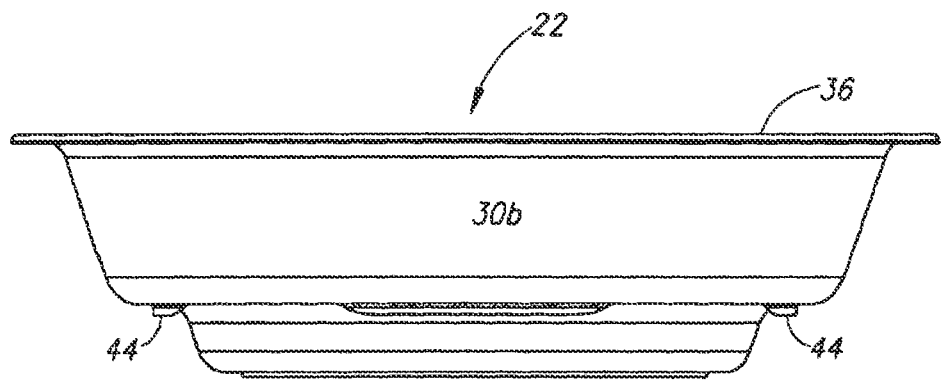
FIG. 2C is a side view of a container of a cooking apparatus.

As shown in detail in FIGS. 2A-2C, the container 22 may include a body 30 that may be circular in shape. The body 30 may include an inner side 30a, and an outer side 30b. The body 30 may include a cavity 32, defining the inner side 30a of the body, a base 33, and sidewalls 34. The body 30 may be suitable for holding a first food component and receiving the basket 24 in a secure manner.

Figure 1B:
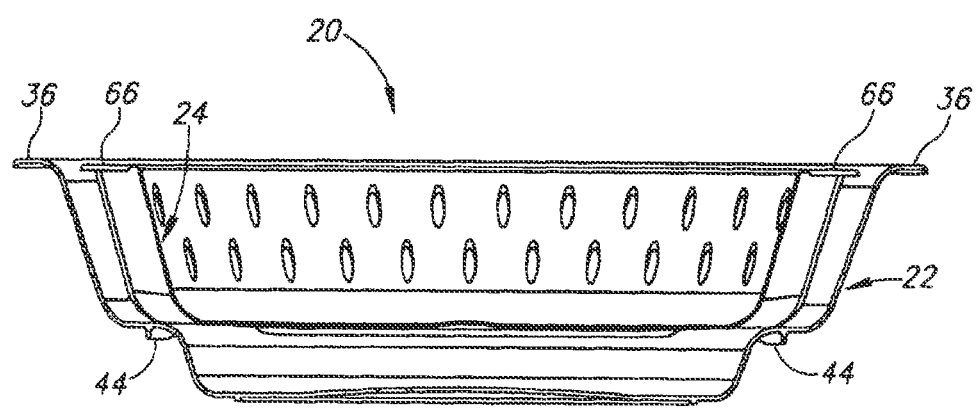
FIGS. 1B and 1C are side cross-sectional views of the cooking apparatus of FIG. 1A, taken along lines 1B-1B and 1C-1C, respectively.
Figure 1C:
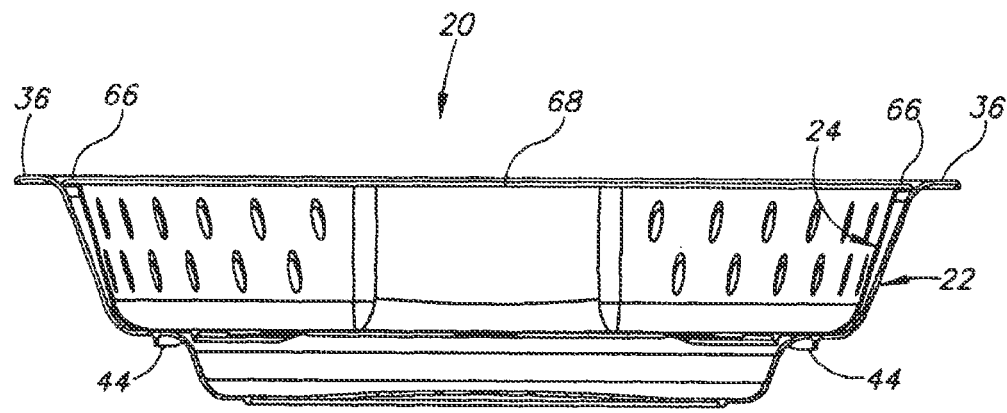

The container's 22 sidewalls 34 include a shelf portion 38 within its cavity 32. The shelf portion 38 extends along the sidewall 34 and may be typically continuous. The sidewalls 34 typically include at least a portion that tapers outwardly, with the entire sidewall 34 typically tapering outwardly from the base 33 to a rim 36, at the opening of cavity 32. The shelf portion 38 provides support for the basket 24 and ensures that the base 63 of the basket 24 may be not in direct contact with the base 33 of the container 22 (as shown in FIGS. 1B and 1C). The shelf portion 38 coupled with the sidewalls 34 allow for the basket 24 to be removably received in the container 22 in a secure manner, with minimal movement or play. Alternatively, the container's 22 sidewall 34 may include at least one ledge or protrusion rather than a shelf portion 38 to provide support for the basket 24. Optionally multiple ledges or protrusions may be included to support the basket 24.

As shown in FIG. 2C, the outer side 30b of the body 30, may include protrusion segments 44. These protrusion segments 44 allow for ease in manually gripping the apparatus 20.

Figure 3A:
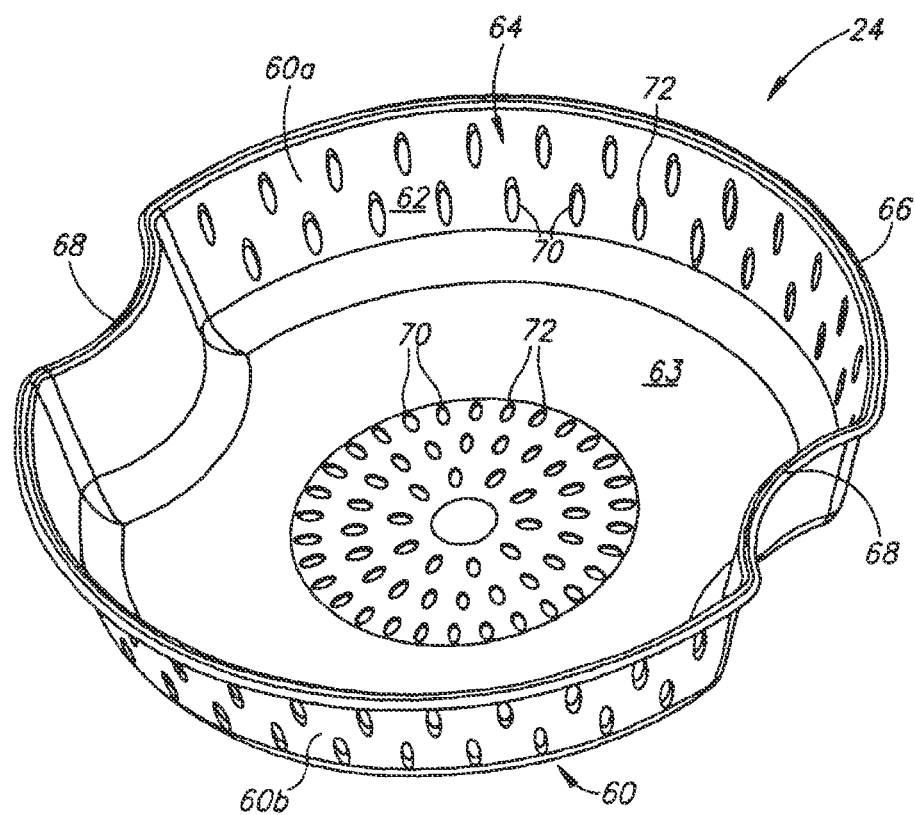
FIG. 3A is a perspective view of a basket of a cooking apparatus.
Figure 3B:
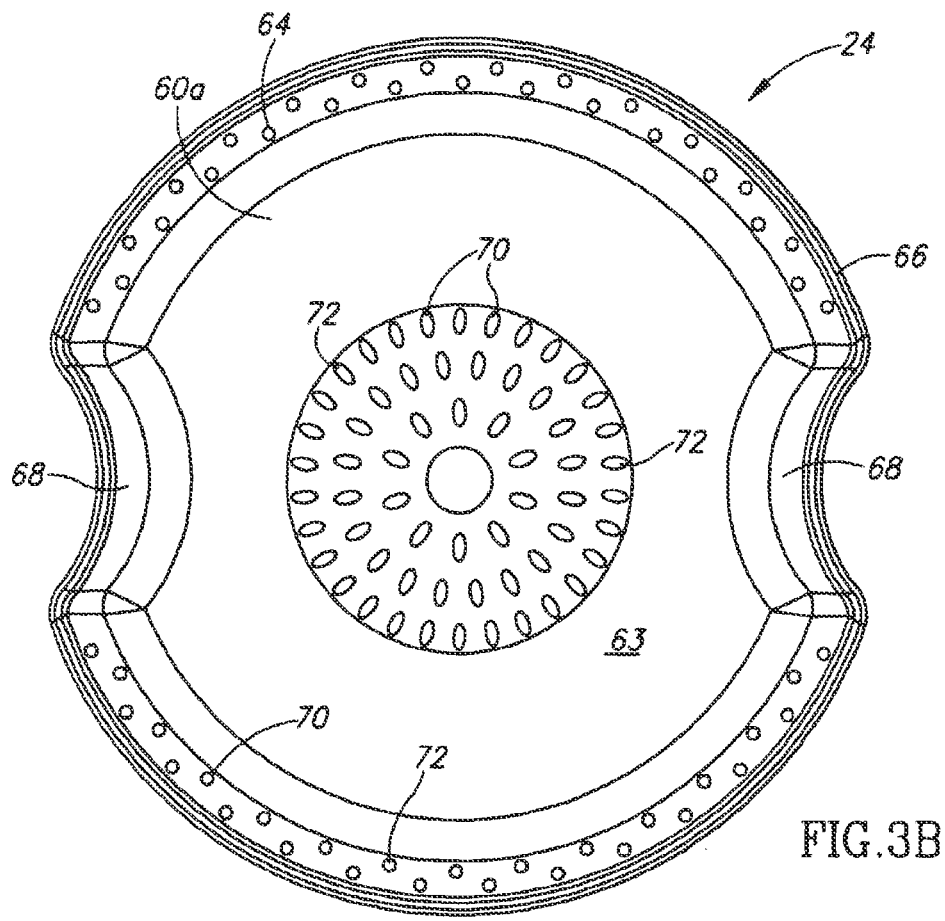
FIG. 3B is a top view of a basket of a cooking apparatus.
Figure 3C:
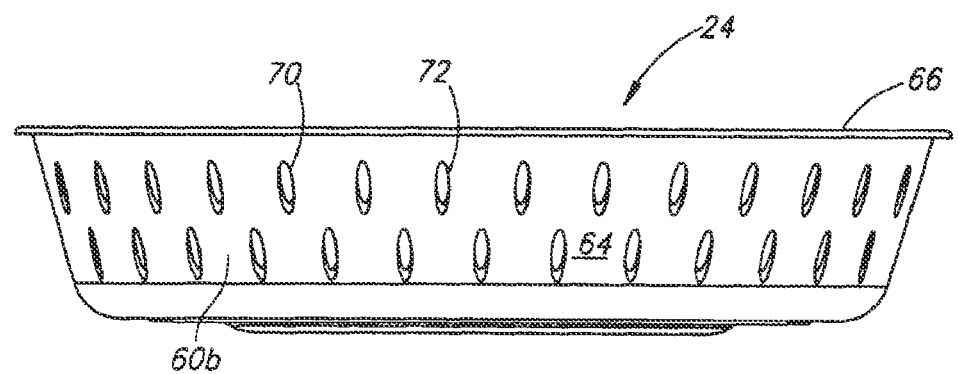
FIG. 3C is a side view of a basket of a cooking apparatus.

As shown in detail in FIGS. 3A-3C, the basket 24 may include a body 60 that may be substantially circular in shape, to conform to the shape of the container 22. The body 60 may include an inner side 60a, and an outer side 60b. The body 60 may include a cavity 62, defining the inner side 60a, a base 63, and sidewalls 64. The body 60 may be suitable for holding a second food component.

The sidewalls 64 typically include at least a portion that tapers outward, with the entire sidewall 64 typically tapering outward from the base 63, to a rim 66, at the opening of the cavity 62. The sidewalls 64 and rim 66 typically include arcs 68 that may be typically rounded inward, into the cavity 62. The arcs 68, may be approximately oppositely disposed with respect to each other, and when the basket 24 sits in the container 22, serve as vents for steam, generated in the cavity 32 of the container 22 during cooking. The arcs 68 also provide sufficient portions for manually gripping the basket 24, for its removal from the container 22.

The basket 24 may include a plurality of openings 70. The openings 70 may be perforations or bores 72 that extend through the base 63 and through the sidewalls 64. The bores 72 may be of any size or dimension so as to allow steam to pass from the cavity 32 of the container 22 into the basket 24, in order to steam heat (or steam cook) the contents (e.g., the second food component) stored in the cavity 62 of the basket 24, as well as allowing liquid (typically water) to pass from the basket 24 into the container 22. Moreover, the openings 70 may be also dimensioned to keep particulate foods, such as rice and the like, including particles thereof, from dropping out of the basket 24 and into the cavity 32 of the container 22. Suitable bore shapes include small, circular, rounded, or oval cylindrical bores, but may be not limited thereto.

The openings 70 at the base 63 and sidewalls 64 may be arranged in any desired pattern, provided sufficient amounts of steam may be able to reach the basket 24 and there may be sufficient openings 70 to allow for the passage of liquid from the basket 24 to the container 22. The openings 70 at the base 63 may be arranged in a series of concentric circles. The openings 70 at the sidewalls 64 may be arranged in a line. Typically, one or more lines of openings 70 may be included in the sidewalls 64 of the basket 24. If a second line of openings 70 may be arranged at the sidewalls 64, the second line of openings 70 may be offset with the first line of openings, such that the cylindrical bores 72 of the second line may be not directly below the cylindrical bores 72 of the first line.

The body 60, may be constructed, such that when the basket 24 may be removably received by the container 22, there may be sufficient space in the cavity 32 of the container 22, between the base 33 of the container 22 and the base 63 of the basket 24, to accommodate a first food component in both dry or frozen (storage) and cooking (heated) states, without disrupting the seating of the basket 24 in the container 22. Additionally, the body 60 may be such that the basket 24 may be adequately supported in the container by the shelf portions 38 (FIG. 1C) and the indent 46 of the rim 36, in order that it hold the second food component, without substantial bending and without allowing the first and second food components to contact one another during storage, prior to the cooking process, or during the cooking process.

Figure 4A:
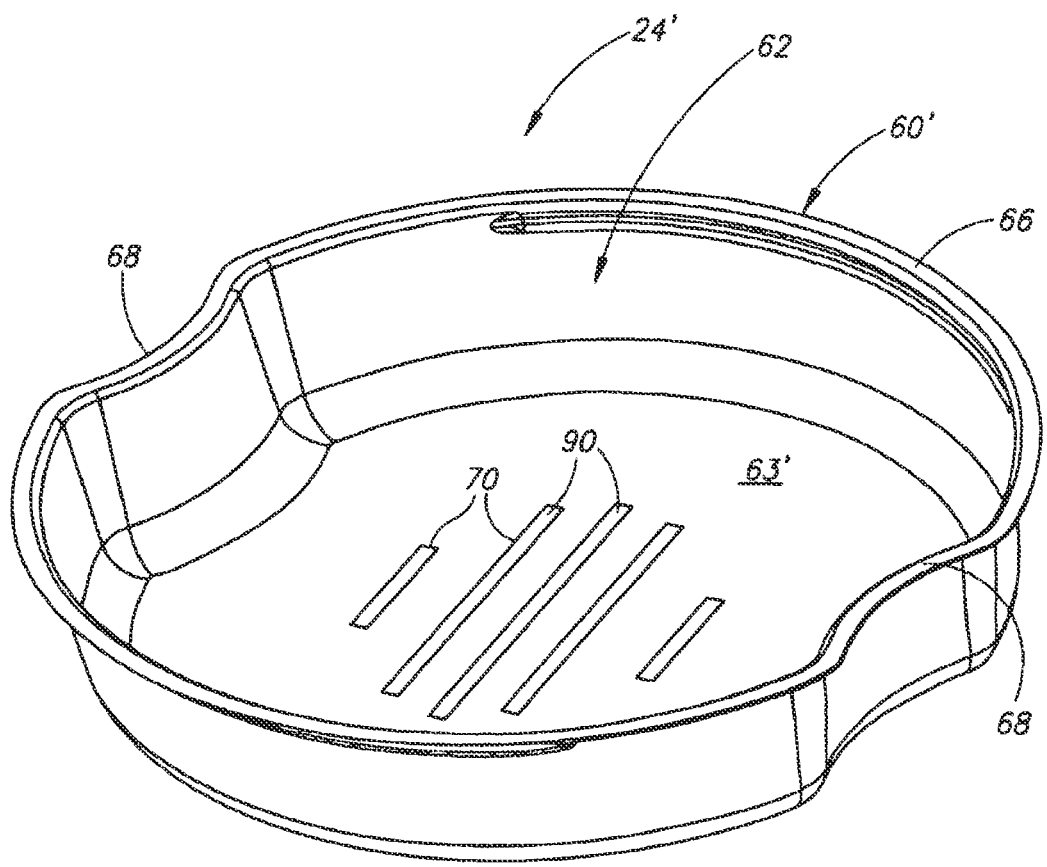
FIG. 4A is a perspective view of a basket of a cooking apparatus.
Figure 4B:
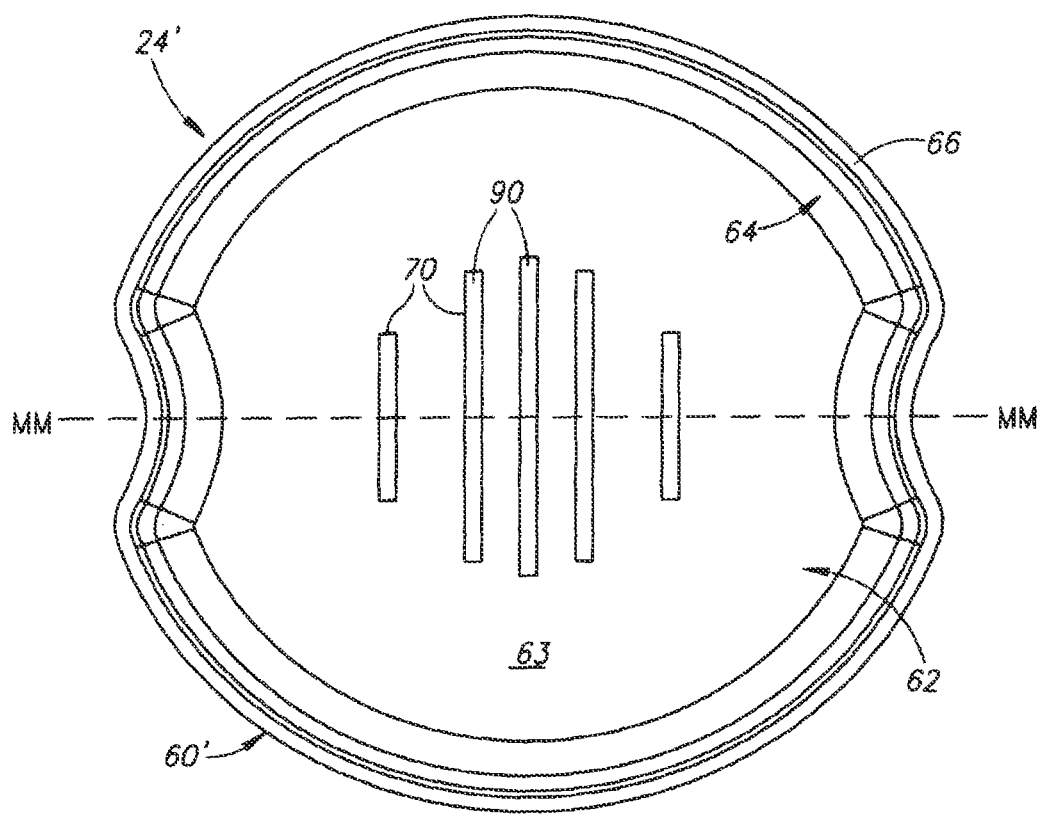
FIG. 4B is a top view of a basket of a cooking apparatus.
Figure 4C:
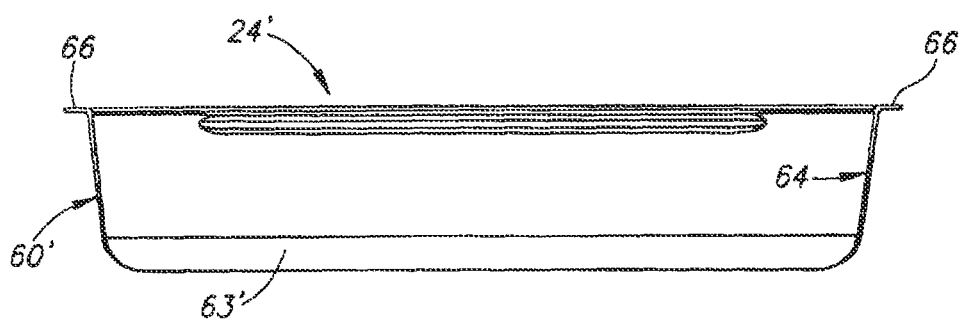
FIG. 4C is a side view of a basket of a cooking apparatus.

FIGS. 4A-4C show an alternate basket 24', similar in all aspects of construction and dimensions to the basket 24. Accordingly similar components, as detailed above, may be numbered the same as above. Changed or different components may be detailed below.

The basket 24', like basket 24, may be substantially circular in shape, and designed to sit in the container 22, as detailed above. The basket 24' differs from basket 24, in that the openings 70 may be slits 90, rather than circular, rounded, or oval cylindrical bores 72 as in basket 24. Like the cylindrical bores 72, the slits 90 may be dimensioned to facilitate the passage of steam, generated by cooking of the first food component, to enter the basket 24'. The dimensioning of the slits 90 also facilitates the passage of a liquid from the basket 24' to the container 22. This dimensioning keeps particulate food, such as rice and the like, and particles thereof, from dropping out of the basket 24' and into the cavity 32 of the container 22.

The slits 90 may be typically rectangular in shape, and extend through the base 63'. They may be typically arranged in a parallel alignment with respect to each other. The slits 90 may be typically oriented perpendicular to the longitudinal axis MM of the base 63'. Alternatively, the slits 90 may also be oriented parallel to the longitudinal axis MM of the base 63'.

FIGS. 5A-9C show an apparatus 120 of similar construction and materials to apparatus 20 detailed above. Components in apparatus 120 that may be similar to those in apparatus 20, FIGS. 1A-3C, may be numbered so as to be increased by "100." The components increased by "100" that may be not described below, function similarly to the corresponding components for apparatus 20. Different components, including components that function differently, may be described below.

Figure 5A:
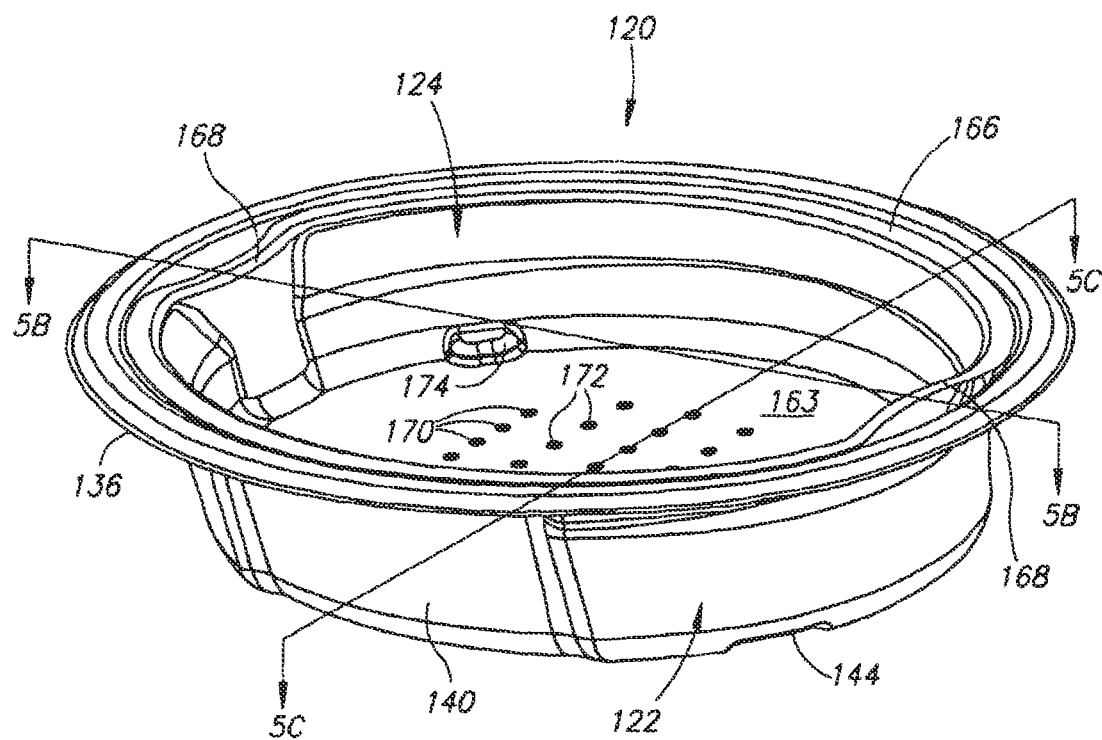
FIG. 5A is a perspective view of a cooking apparatus.

As stated above, the apparatus may be of any desired shape. As shown in FIG. 5A, the apparatus 120 may be such that it may be of an oval shape. The apparatus 120 may be formed of a container 122 that may be oval in shape, and a basket 124, for sitting in the container 122, in a secure manner, as detailed above, for the container 22 and basket 24, 24' of apparatus 20.

Figure 5B:
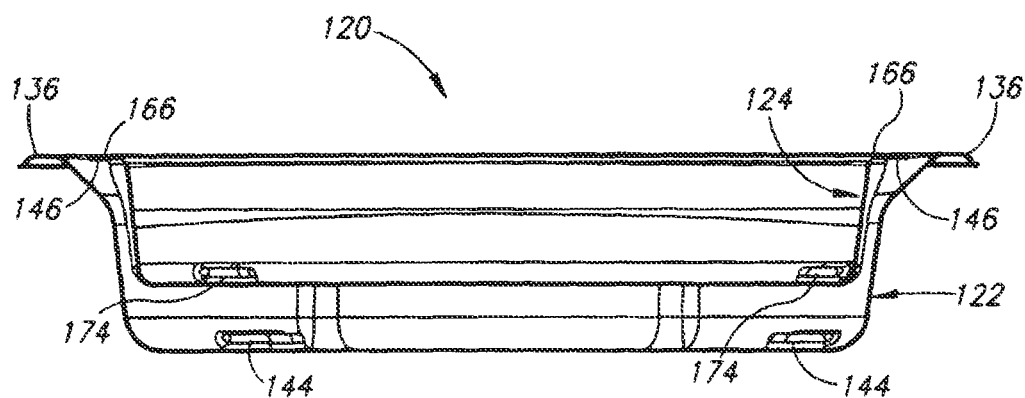
FIGS. 5B and 5C are side cross-sectional views of the cooking apparatus of FIG. 5A, taken along lines 5B-5B and 5C-5C, respectively.
Figure 5C:
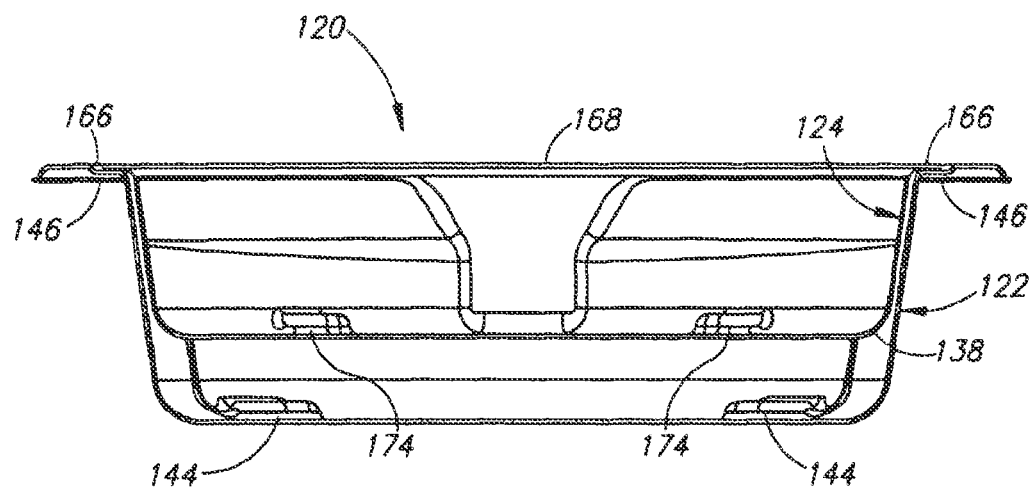
Figure 6A:
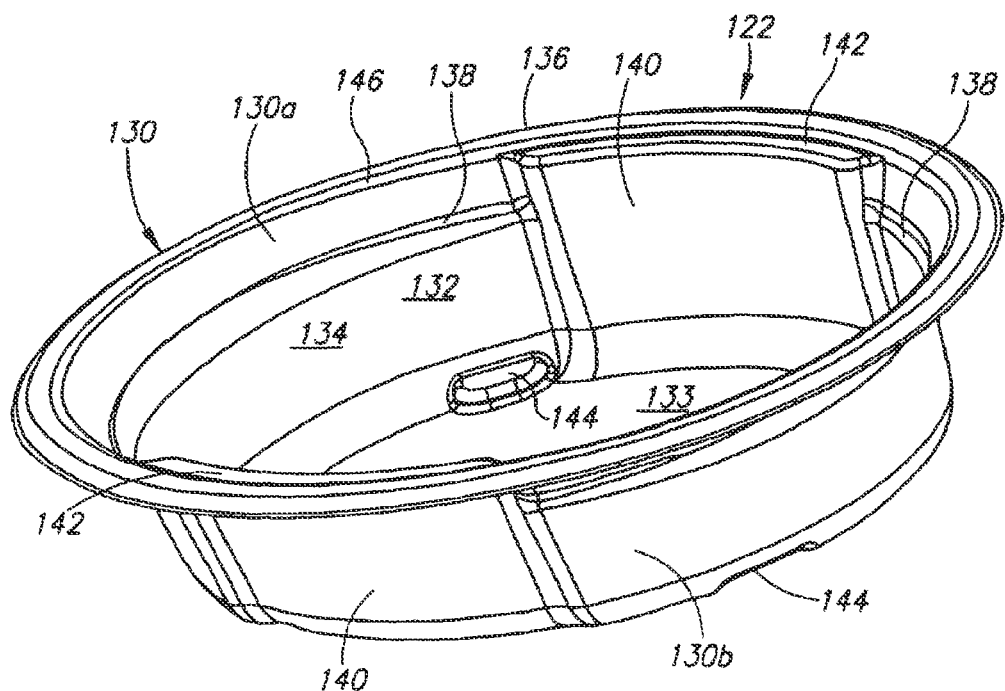
FIG. 6A is a perspective view of a container of a cooking apparatus.
Figure 6B:
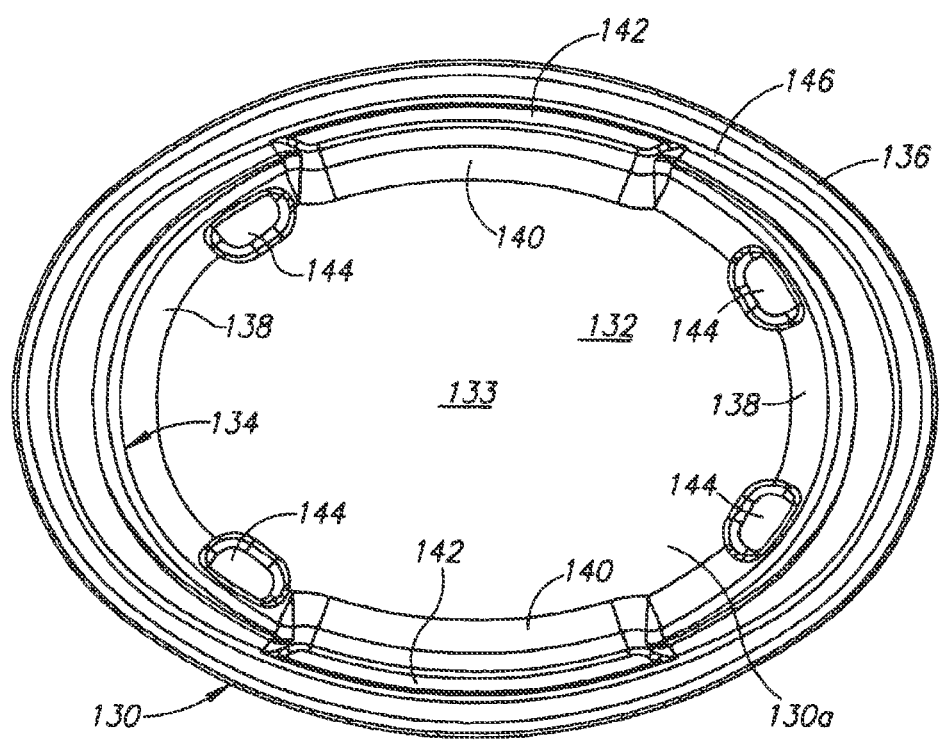
FIG. 6B is a top view of a container of a cooking apparatus.
Figure 6C:
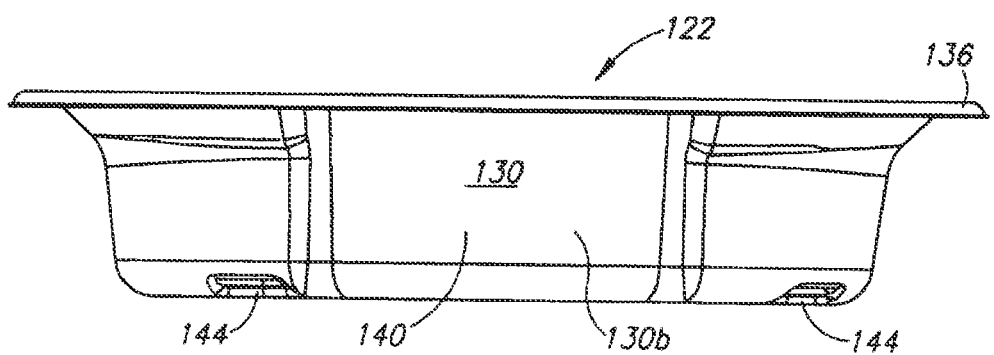
FIG. 6C is a side view of a container of a cooking apparatus.

As shown in FIGS. 6A-6C, the container 122 may include shelf portions 138, at an intermediate height along the sidewalls 134 that may be typically discontinuous from each other. Dividing portions 140 that extend inward into the cavity 132, separate the shelf portions 138 from each other. The dividing portions 140 extend from the base 133 to ledges 142, proximate to the rim 136. The shelf portions 138 and the dividing portions 140 may be typically symmetric and oppositely disposed with respect to each other. The shelf portions 138 provide support for the basket 124 (as shown in FIGS. 5B and 5C). The dividing portions 140 may be such that they provide rigidity to the container 122. The rim 136 of the container 122 also may include an indent 146, similar to the indent 46, along the inner periphery of the rim 136. The rim serves in maintaining a secure fit of the basket 124 in the container 122.

Figure 7A:
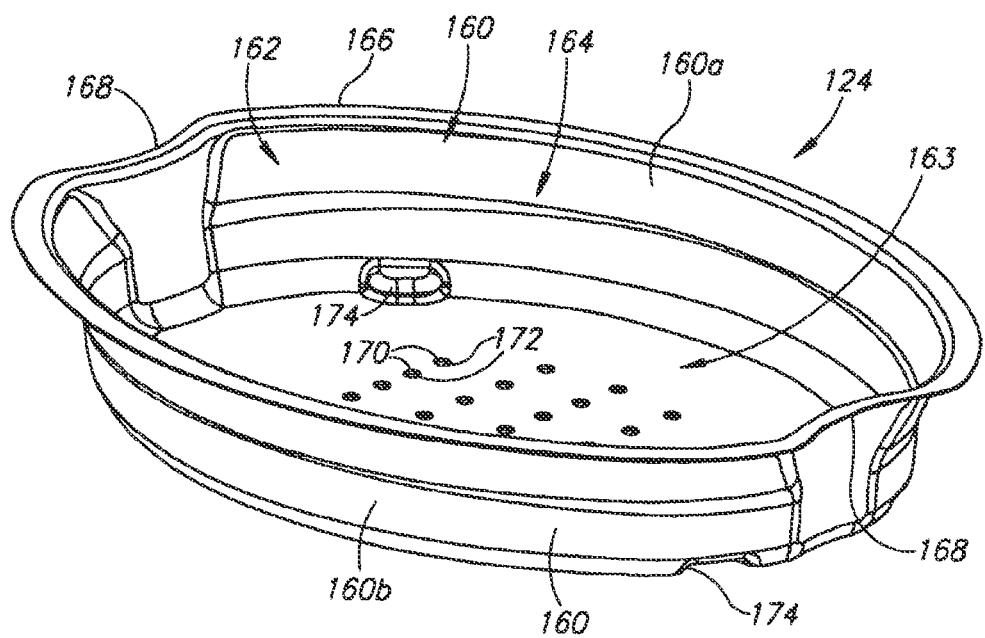
FIG. 7A is a perspective view of a basket of a cooking apparatus.
Figure 7B:
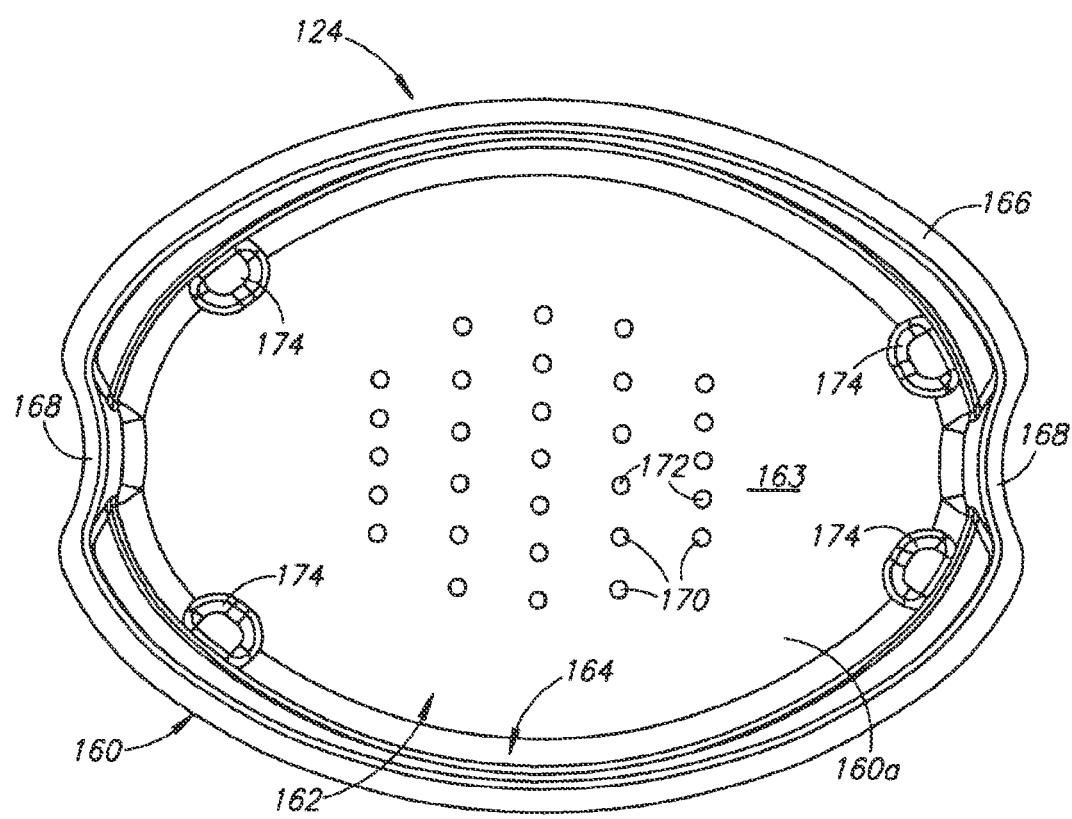
FIG. 7B is a top view of a basket of a cooking apparatus.
Figure 7C:
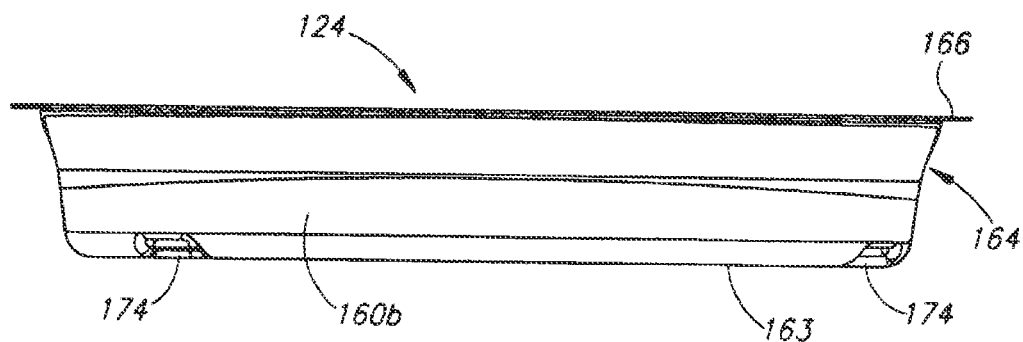
FIG. 7C is a side view of a basket of a cooking apparatus.

As shown in FIGS. 7A-7C, the basket 124 may be of a substantial oval shape, but may include arcs 168, similar to the arcs 68, to allow for venting of steam as well as ease of gripping, by fingers. The basket 124 may include openings 170 of cylindrical bores 172, arranged in lines. The cylindrical bores 172 may also be staggered. Alternatively, other arrangements of the openings 170 may be also permissible, such as concentric circles. The openings 170 (formed of cylindrical bores 172) function similarly to the openings 70 (formed of cylindrical bores 72) of the basket 24, as detailed above.

The outer side 160b of the body 160 may include protrusion segments 174. These protrusion segments 174 allow for ease of use in manually gripping the basket 124.

Figure 8A:
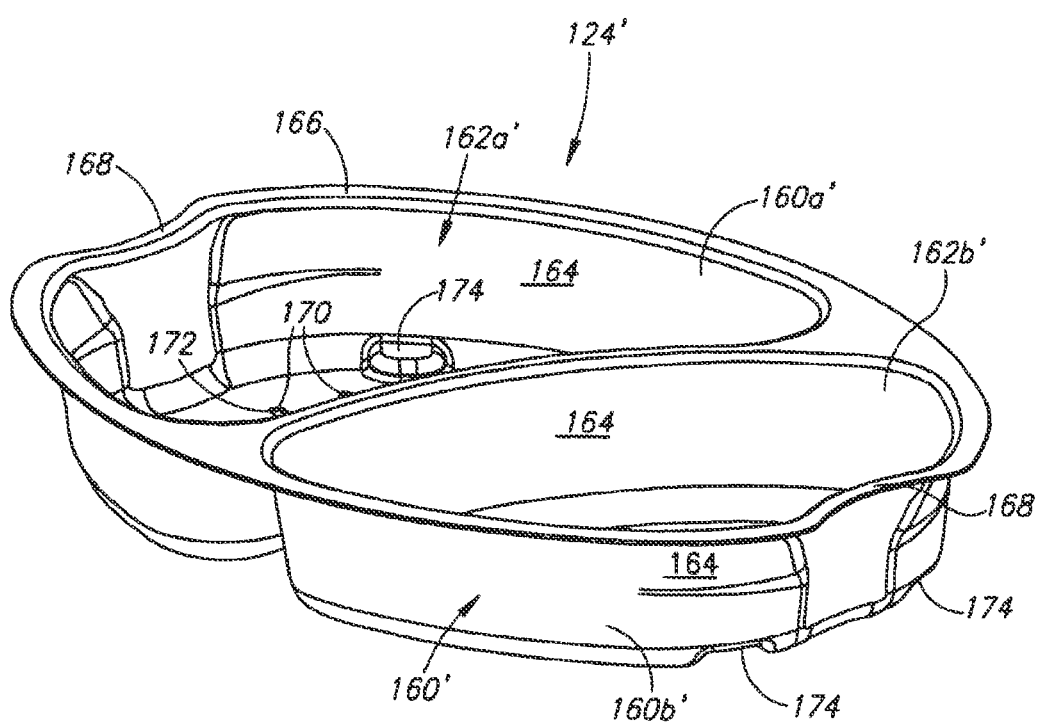
FIG. 8A is a perspective view a basket of a cooking apparatus.
Figure 8B:
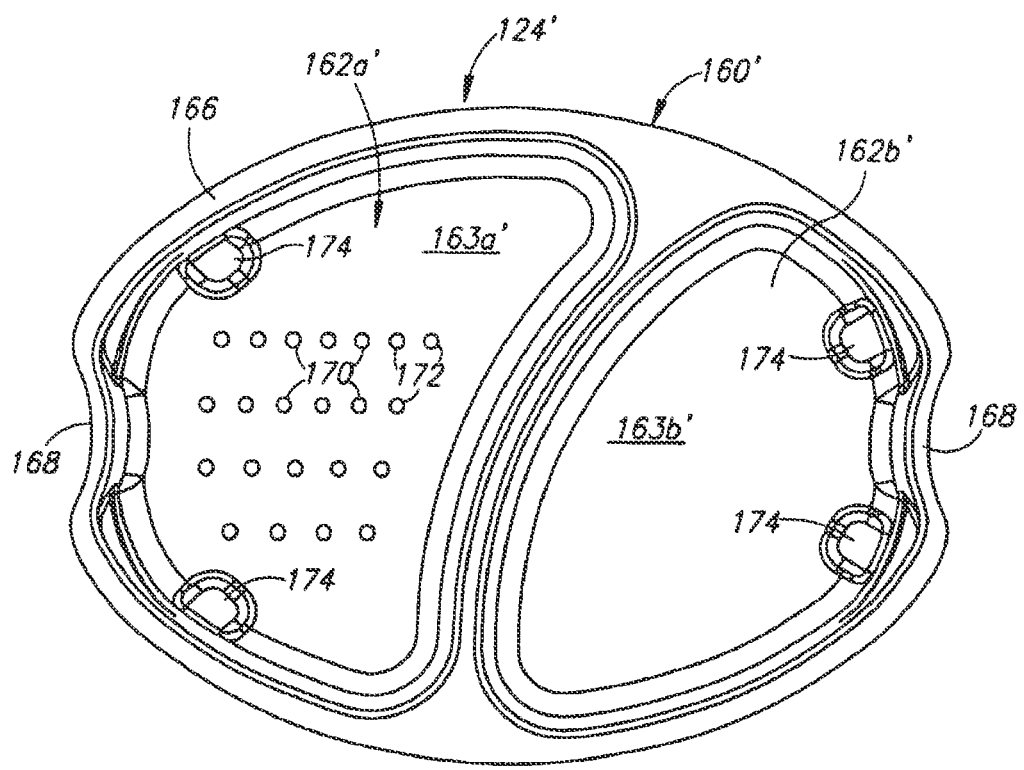
FIG. 8B is a top view of a basket of a cooking apparatus.
Figure 8C:
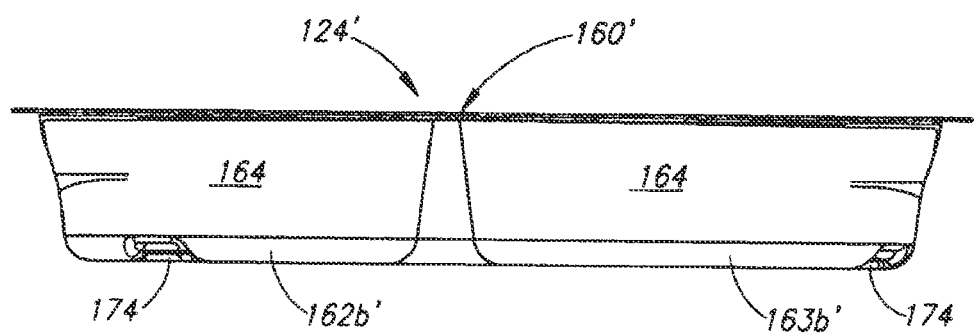
FIG. 8C is a side view of a basket of a cooking apparatus.

FIGS. 8A-8C show an alternate basket 124', similar in all aspects of construction to basket 124, except where indicated. The basket 124', like basket 124, may be substantially oval in shape, and designed to sit in the container 122, as detailed above. The basket 124' differs from the basket 124, in that the body 160' may be divided into two cavities 162a', 162b', for holding separate food components. Additionally, the base 163a' of the first cavity 162a' may include openings 170 cylindrical bores 172, as detailed above. The base 163b' of the second cavity 162b may be solid, whereby the food component therein may be primarily heated by the heating source.

Figure 9A:
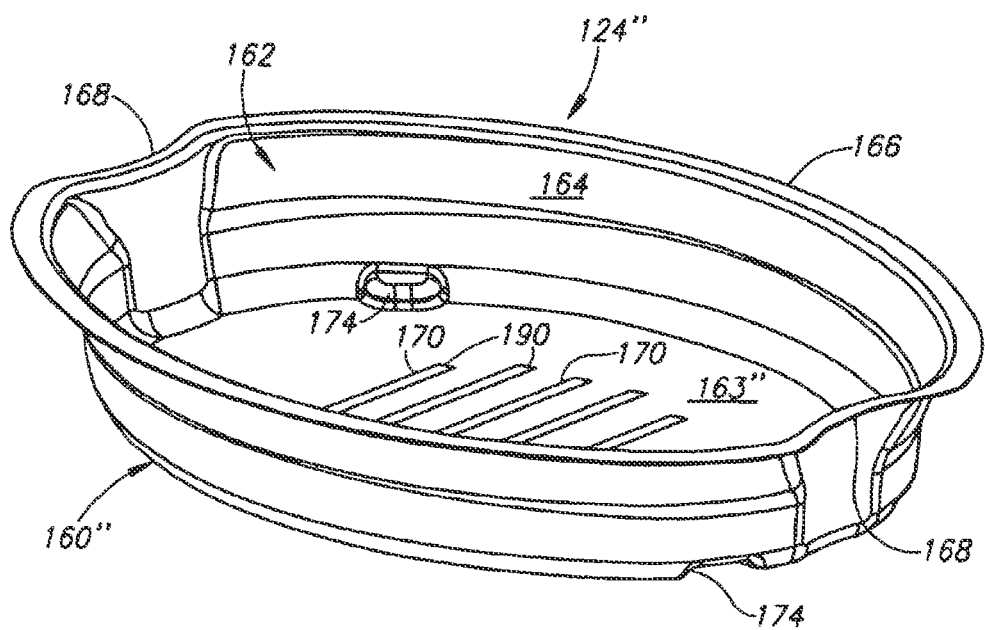
FIG. 9A is a perspective view of a basket of a cooking apparatus.
Figure 9B:
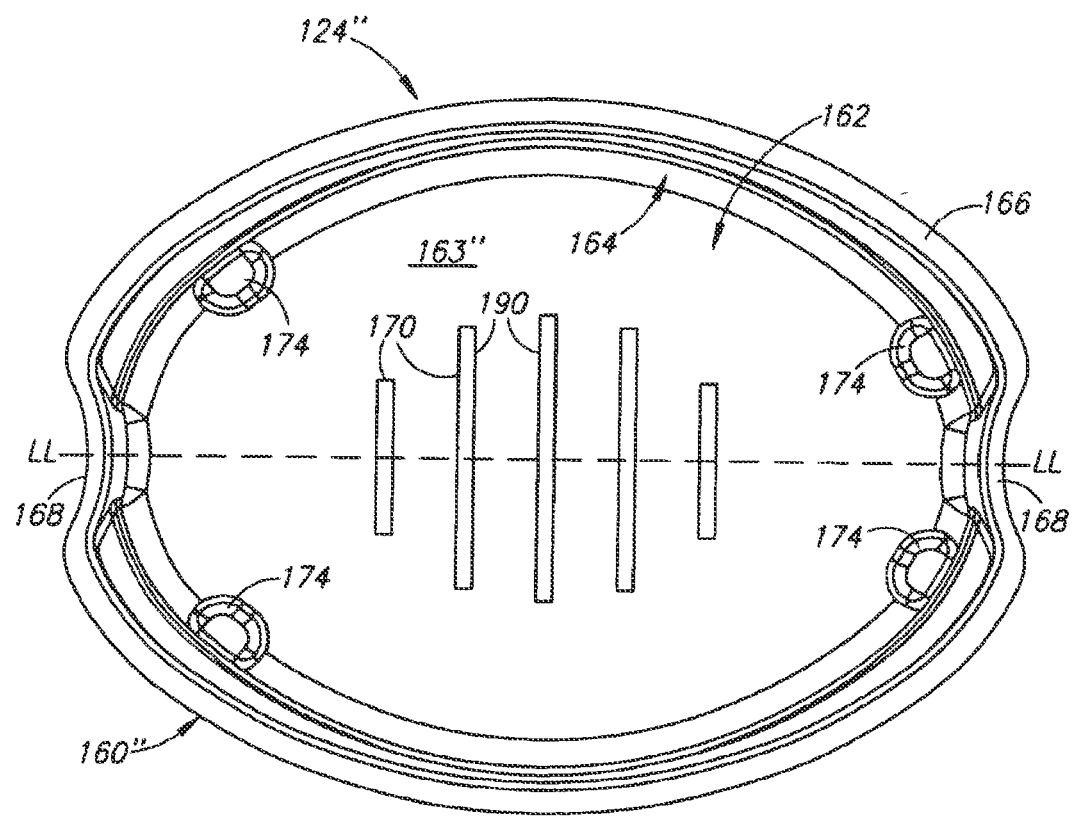
FIG. 9B is a top view of a basket of a cooking apparatus.
Figure 9C:
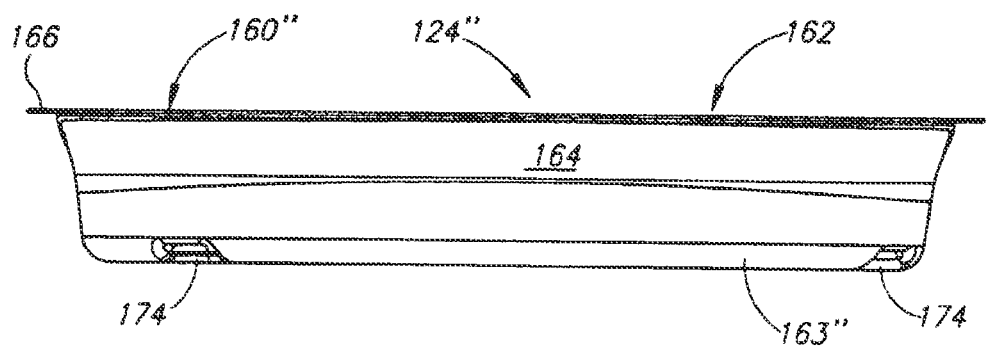
FIG. 9C is a side view of a basket of a cooking apparatus.
Figure 10:
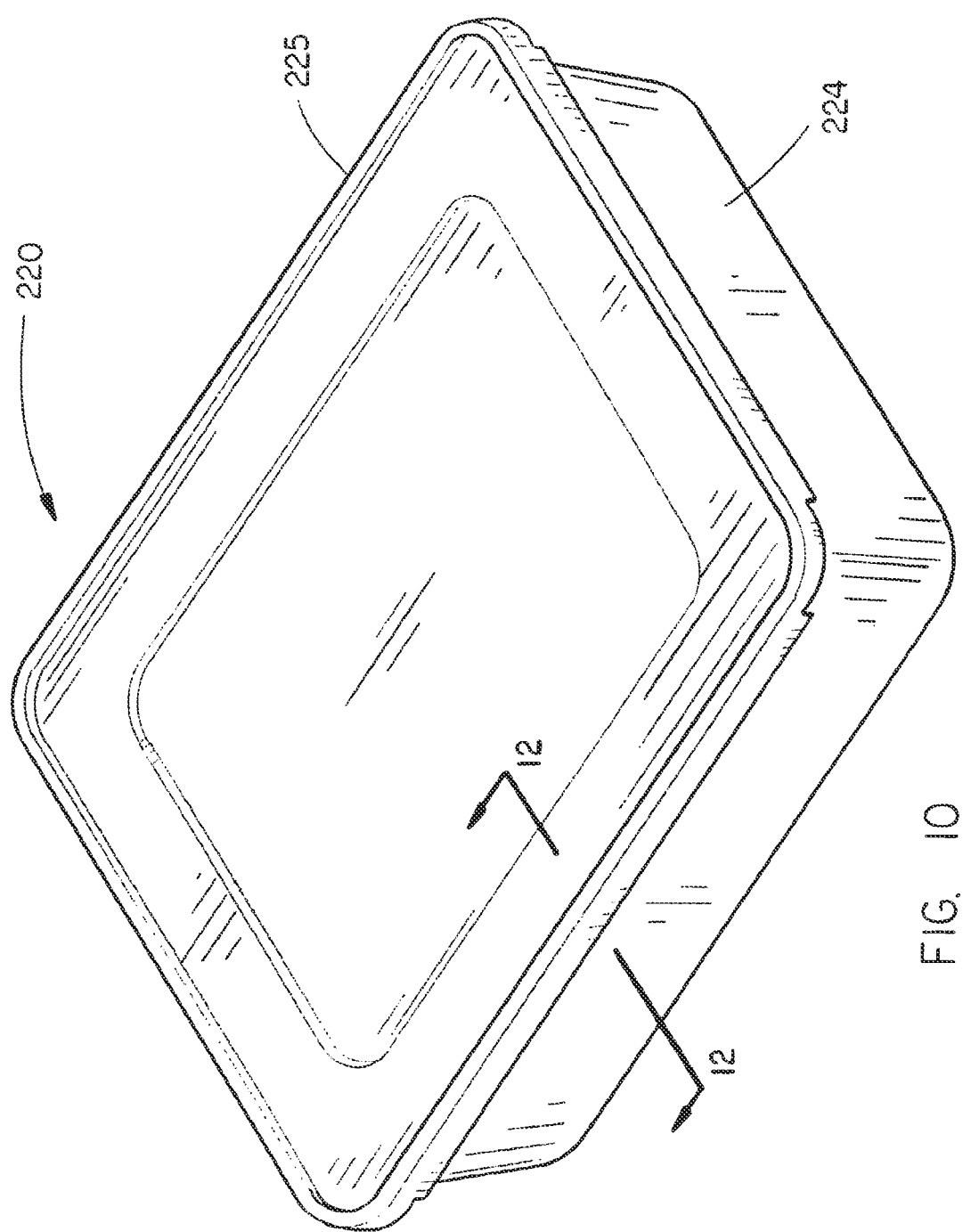
FIG. 10 is an illustration of an ovenable cooking apparatus.

FIGS. 9A-9C show another alternate basket 124", similar in all aspects of construction and dimensions to the basket 124. Accordingly similar components, as detailed above, may be numbered the same as above. Changed or different components may be detailed below.

The basket 124", like basket 124, may be substantially oval in shape, and designed to sit in the container 122, as detailed above. The basket 124" differs from basket 124, in that the openings 170 may be slits 190.

The slits 190 may be similar in construction and function to the slits 90 of the basket 24, as detailed above. The slits 190 may be cut into and extend through the base 163" of the body 160". They may be typically arranged in a parallel alignment with respect to each other. The slits 190 may be typically oriented perpendicular to the longitudinal axis LL of the base 163". Alternatively, the slits 90 may also be oriented parallel to the longitudinal axis LL of the base 163".

The containers 22,122 and baskets 24, 24',124, 124', 124" may be made of polymers, such as Polypropylene (PP) (e.g., Co-polymer Polypropylene), Crystallized Polyethylene Terepthalate (CPET), or any other microwave and food safe non-toxic material. The containers 22,122 and baskets 24, 24', 124, 124', 124" may be formed by conventional polymer forming and working techniques. Suitable forming and working techniques include injection molding, rotational molding, and the like, as well as thermoforming. The containers 22, 122 and baskets 24, 24', 124, 124', 124" may be suitable for refrigerated storage, freezer storage, and subsequent heating without substantial deformation.

The apparatuses 20,120, in particular, the containers 22,122 and baskets 24, 24', 124, 124', 124" may be typically of dimensions to ensure that during the cooking process the second food component may be uniformly steam cooked. In addition, the apparatuses 20, 120, in particular, the containers 22,122 and baskets 24, 24', 124, 124', 124" may be of dimensions to fit within a typical consumer, or alternatively, food service microwave oven, with sufficient space remaining. The containers 22 and 122 may be of circular shape and with a diameter of from about 4 to about 12 inches. Alternatively, the containers 22 and 122 may be of rectangular shape, with dimensions of from about 3 to about 6 inches in width to about 7 to about 12 inches in length. In addition, the containers 22 and 122 may include 1 to 6 servings, preferably 2 to 4 servings. Other dimensioning and/or shapes for the apparatuses 20,120, containers 22, 122 and baskets 24, 24', 124, 124', 124" may be also possible, to accommodate different packages, cartons, or sleeves, that hold the apparatus prior to its use, as well as the internal cooking chambers of microwave ovens, high energy cooking apparatus, and the like. Similarly, other serving sizes may be also possible to accommodate consumer demand.

The apparatuses 20,120 may be such that they may be covered by a sheet of barrier material (e.g., transparent, translucent, or opaque) continuously sealed to the rim 36 of the containers 22 and 122, but also could be sealed to the rim 66, 166 of the baskets 24, 24,124, 124', 124". This sheet of barrier material may be made of a material that may be suitable to withstand oven temperatures during cooking and may be moisture-impervious. Suitable materials include polymers, such as polypropylene and polyethylene, among others. The sheet of barrier material may be sealed to the rim using any method generally known in the art The sheet of barrier material may be sealed to the rim to prevent substantial bulging or expansion of the sheet material during the cooking process. In particular, the seal may be such as to allow the release of some pressure build up inside the container while maintaining uniform heating and cooking of the food products therein.

The ovenable cooking apparatus 220 may be suitable for use in commercial foodservice applications. FIGS. 10 through 26 show an ovenable cooking apparatus 220 suitable for foodservice applications. The ovenable cooking apparatus 220 may include a basket 222 and a container 224 that may be dimensioned to allow the basket 222 to nest inside the container 224. The container 224 may be used for containing the first food component 234 and receiving the basket 222, which holds the second food component 236. Use of the ovenable cooking apparatus 220 may result in a higher quality food product as compared to current methods in foodservice applications without requiring significant changes to current equipment and procedures. Use of the basket 222 and the container 224 allows separation of the sauce or liquid components of the meal from the vegetable, starch, or protein components. This separation leads to improvements in vegetable, protein, and starch integrity. The separation of food ingredients also allows for the preparation of breaded ingredients, which have typically been avoided using conventional methods because the soggy breaded items do not meet consumer standards. Use of the ovenable cooking apparatus 220 may result in breaded items, such as chicken parmesan, that meet consumer approval and may be not soggy.

Figure 21:
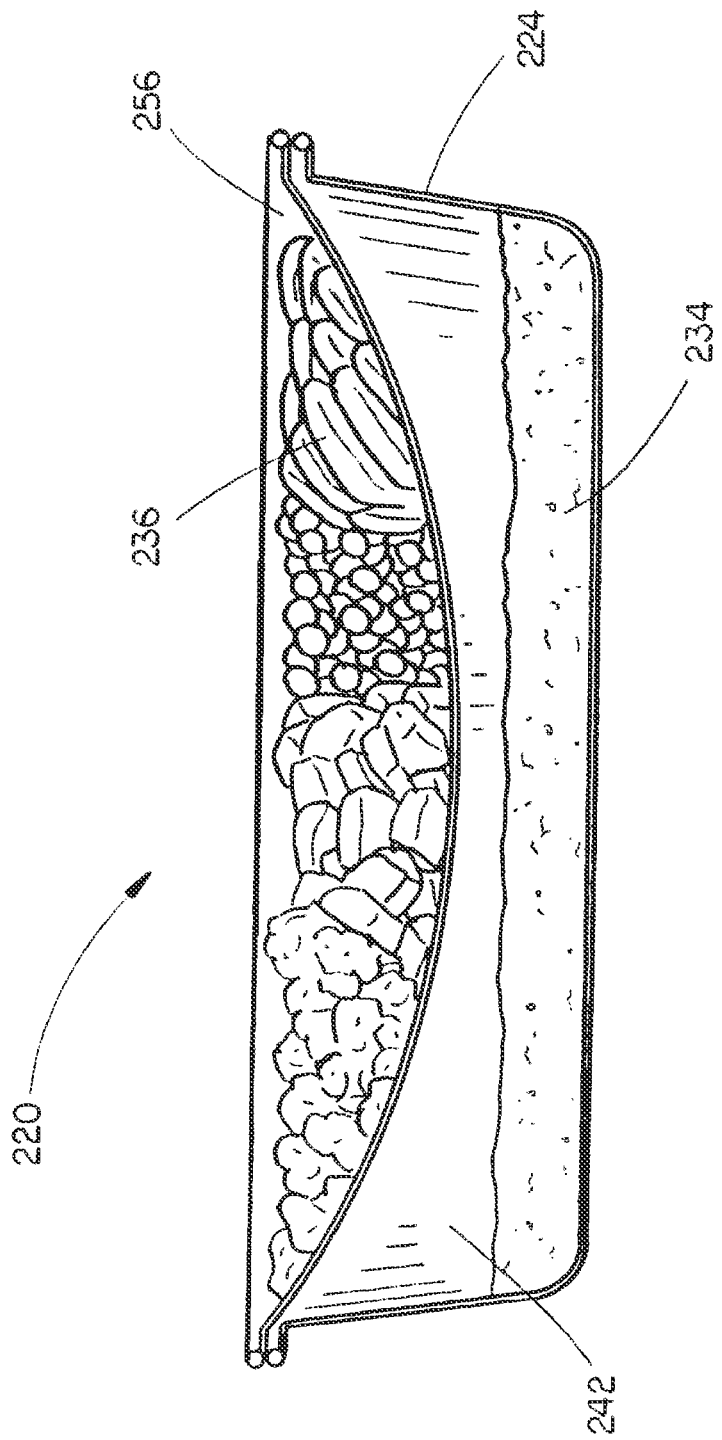
FIG. 21 is an illustration of a basket containing a second food component removably received within a container containing a first food component.

The ovenable cooking apparatus 220 may include a passage for providing airflow and steamflow for cooking the second food component 236. These passages may be defined by the basket 222 and the container 224, and allow an area through which steam may pass to transfer heat and/or steam to the second food component 236. The passage may be defined between the bottom or base 240 of the basket 222 and the top surface of the second food component 236. Cooking the liquid-based second food component 236 generates steam, which may travel across this passage to contact the basket 222 and heat or steam the second food component 236. In the methods illustrated in FIGS. 12, 13, and 15, the passage may be a rectangular prism. However, it will be appreciated that the prism may be shaped differently, such as in a concave shape for increasing the surface area of the basket 222 adjacent to the passage (as depicted in FIG. 21). The passages may also take the form of openings 238 that may be located at the base 240 of the basket 222. The openings 238 may include apertures such as perforations, pores, holes, slits, outlets, slots, vents, gaps, pricks, or the like to facilitate steaming when steaming may be desired. The basket may also be solid to prevent steam from passing (for instance, when cooking breaded items).

Figure 11:
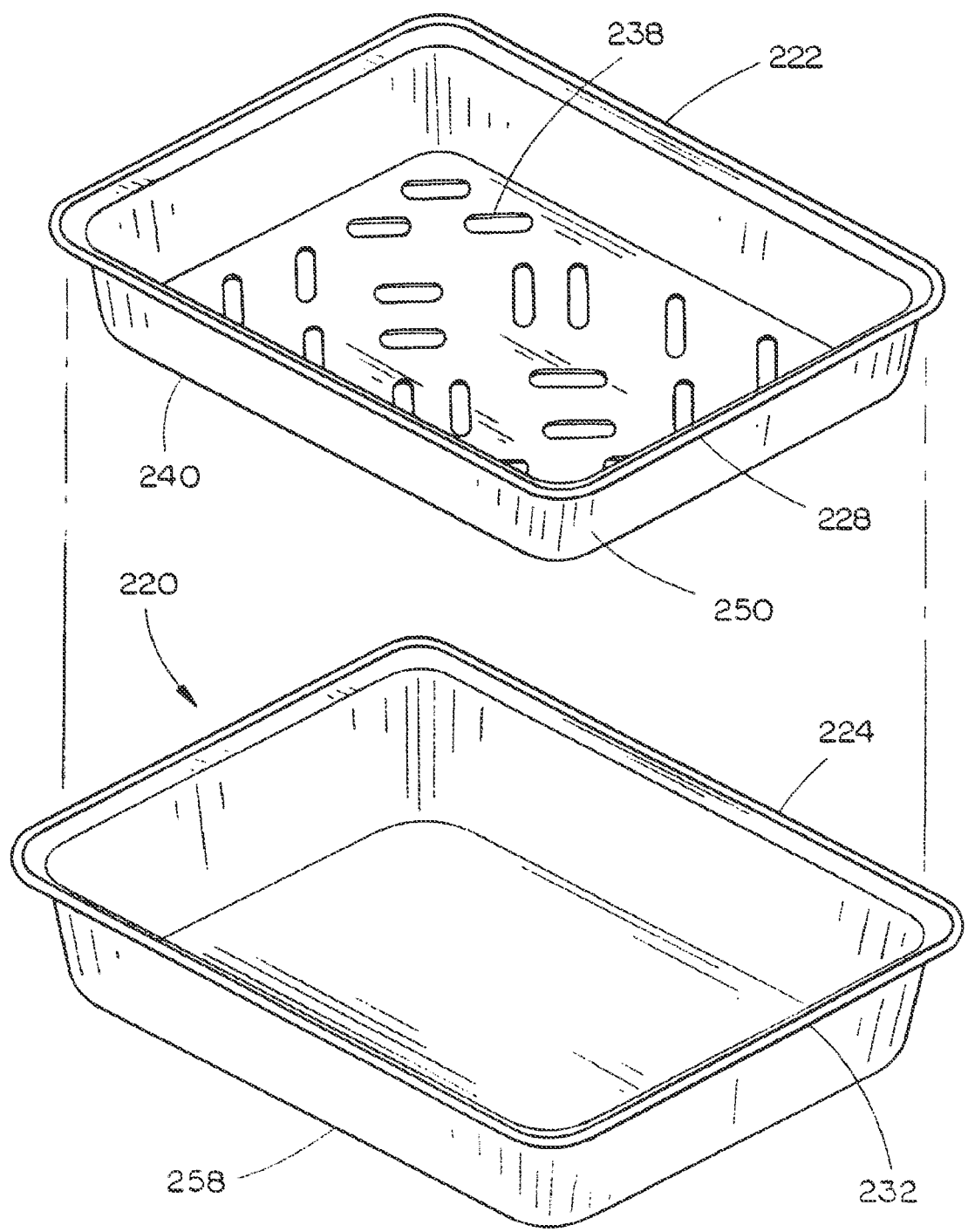
FIG. 11 is an illustration of an ovenable cooking apparatus.
Figure 12:
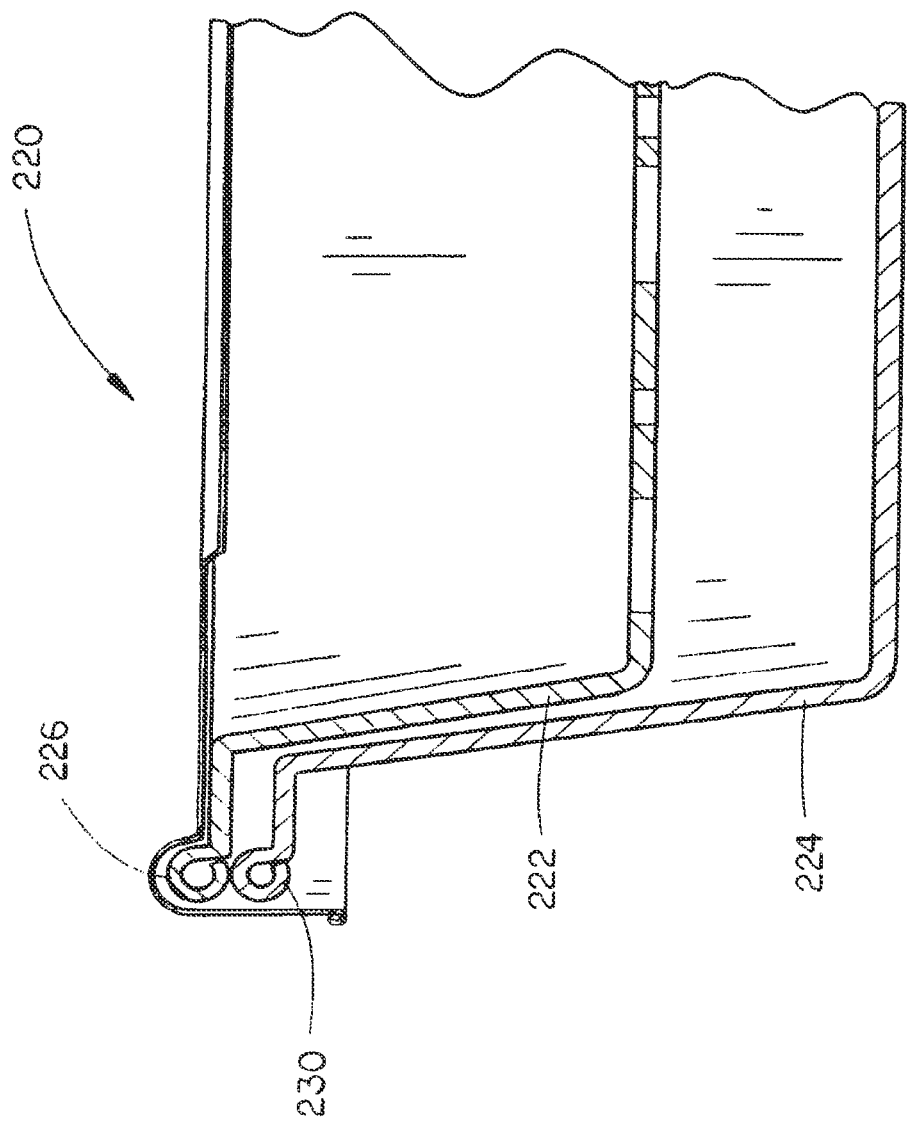
FIG. 12 is an illustration of a rolled edge of a container supporting a rolled edge of a basket.
Figure 13:
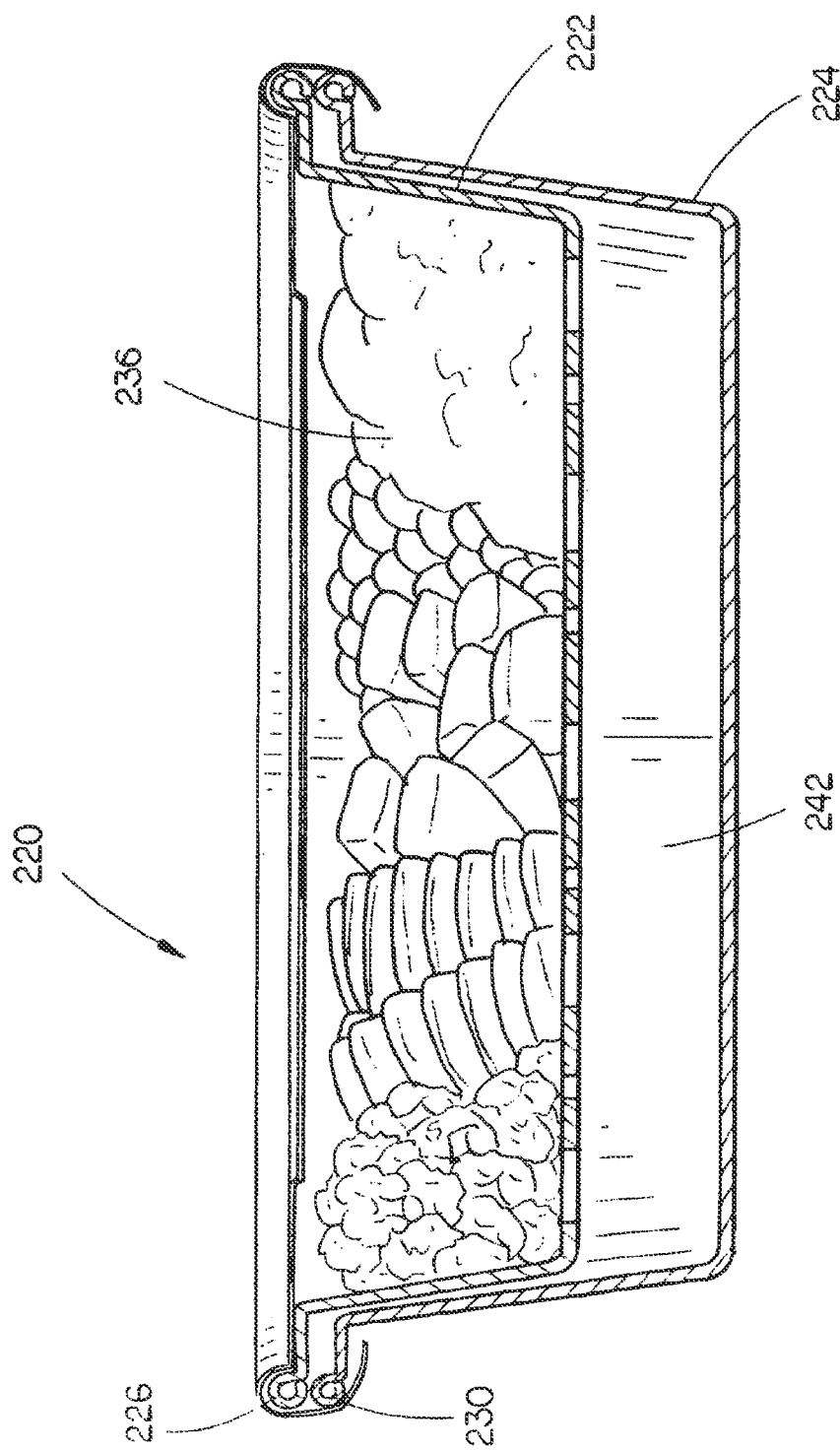
FIG. 13 is an illustration of a basket containing a second food component removably received within a container of an ovenable cooking apparatus.
Figure 14:
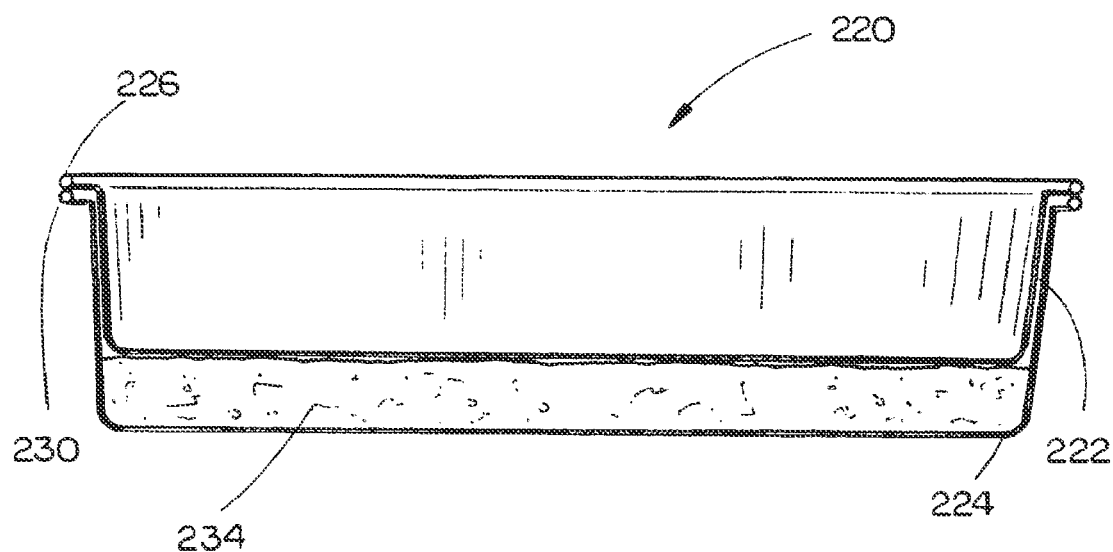
FIG. 14 is an illustration of a basket removably received in a container containing a first food component.
Figure 15:
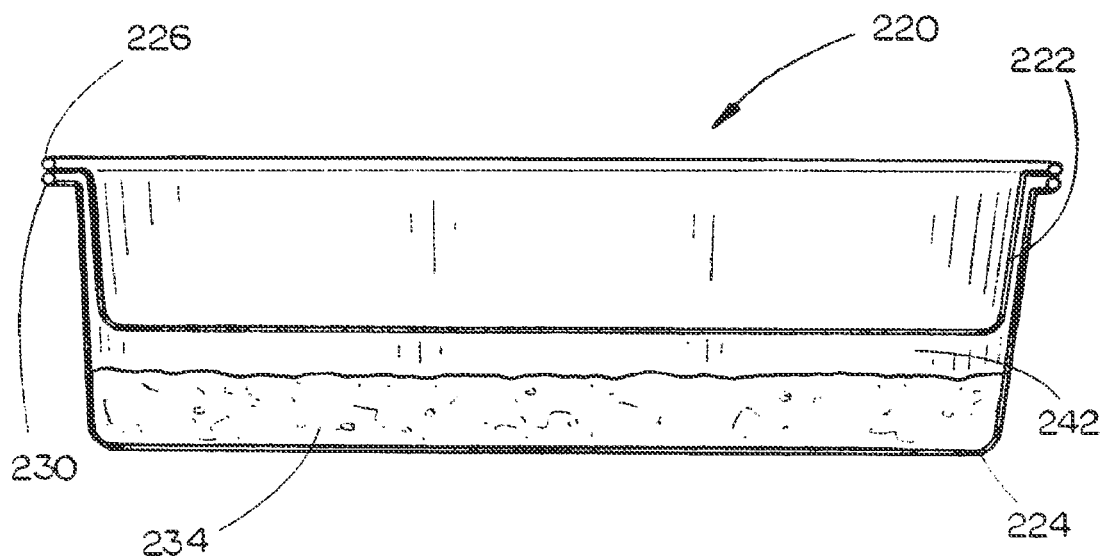
FIG. 15 is an illustration of a basket removably received in a container containing a first food component.

FIGS. 11 through 13 depict the basket 222 that may be suitable for foodservice applications. The basket 222 may include openings 238 that extend through the base 240 of the basket 222. The basket 222 may also include openings 238 along the sidewalls 250 of the basket 222. The basket 222 may also include a rolled edge 226 along the rim 228 of the basket 222 to allow the stacking of the rim 228 of the basket 222 along the rolled edge 230 of the container 224. As previously discussed, the body of the basket 222 may take any shape. The basket 222 may be of a rectangular shape with dimensions that may range from 4" to 18" in length, 3" to 12" in width, and 1" to 8" in depth. The basket 222 allows the second food component 236 to be cooked separately from the first food component 234.

FIGS. 10 through 13 show the container 224 that may be suitable for foodservice applications. The container 224 may include a rolled edge 230 along the rim 232 of the container 224 to allow stacking of the basket 222 within the container 224. The container 224 may be dimensioned to allow nesting of the basket 222 within the container 224. The dimensions of the container 224 may range from 4" to 18" in length, 3" to 12" in width, and 1" to 8" in depth. The container 224 allows the first food component 234 to the cooked separately from the second food component 236.

FIGS. 3 through 6 demonstrate how the basket 222 may be removably received within the container 224 when food may be loaded into the ovenable cooking apparatus 220. The basket 222 may be stacked in the container 224 and the first food component 234 may be filled to a level to provide airspace between the base 240 of the basket 222 and the first food component 234. As presented in FIG. 14, the basket 222 may be stacked in the container 224 and the first food component 234 may be filled to a level to limit or eliminate the airspace to provide partial or complete contact between the base 258 of the container 224 and the first food component 234. Either configuration may be selected depending on the type of food components, required cook times, thermodynamic properties of the cooking method and the food components, etc. The dimensions of the basket 222 and container 224 may vary to provide a greater or lesser amount of airspace. Similarly, the amount of the first food component 234 that may be loaded into the container 224 may vary to provide the appropriate amount of airspace. By controlling air space, water, and the like, cooking times and food attributes can be controlled.

FIG. 12 depicts how the rolled edges of the basket 222 and the container 224 may be stacked to allow the basket 222 to nest within the container 224. The container 224 and the basket 222 may be formed of aluminum. The rolled edges may be formed using a crimper using methods known in the art of foodservice tray formation. The stackability of the basket 222 within the container 224 may be provided using another method known in the art.

Figure 16:
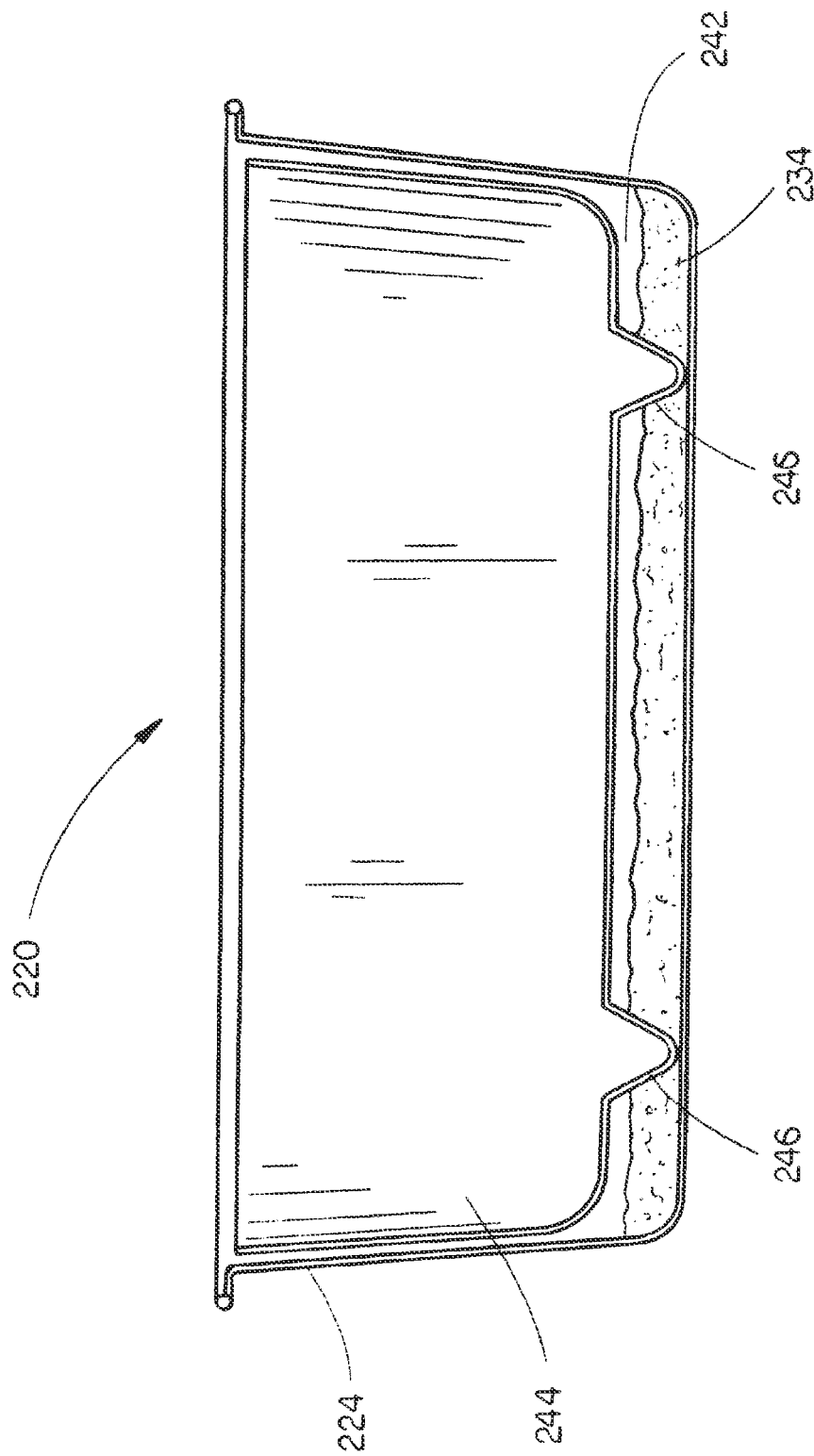
FIG. 16 is an illustration of a footed basket removably received within a container containing a first food component.
Figure 17:
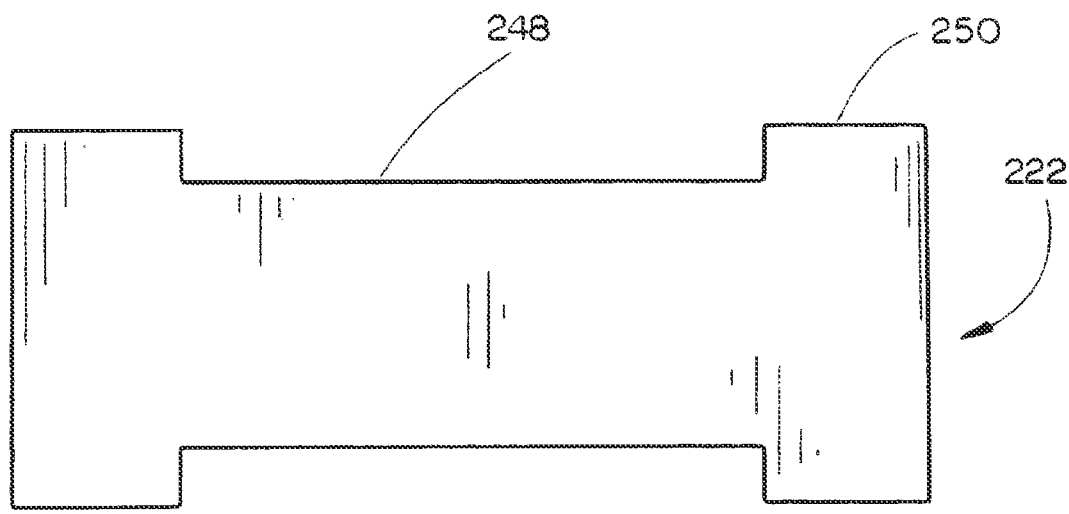
FIG. 17 is an illustration of a basket including indentations along the sidewalls of the basket.
Figure 18:
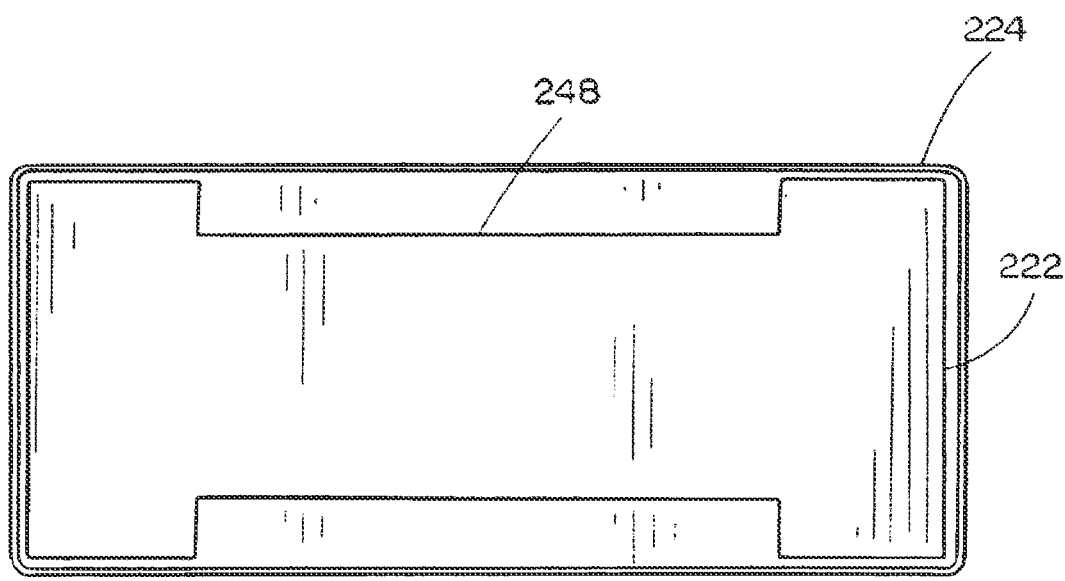
FIG. 18 is an illustration of a basket including indentations removably received within a container.

Referring to FIG. 16 an ovenable cooking apparatus 220 may include a footed basket 244 and a container 224. The footed basket 244 may further include a plurality of support members which rest on the base 258 of the container 224. This provides airflow and separation between the base 240 of the basket and the base 258 of the container 224. The passage may comprise a gap that exists between the base 240 of the basket 222 and the base 258 of the container 224. This passage serves to facilitate and permit the flow of steam from the first food component to the basket 222, and thus to the second food component 236. It will be appreciated that the support structures will be designed to minimize obstruction of the passage. This may also be designed to work with no air gap between the footed basket 244 and the container 224.

The footed basket 244 may be depicted in FIG. 16, and may include a basket with a plurality of support members, which may include ridges, contours, or foot members 246. The foot members 246 protrude from the base 240 of the basket and contact the base 258 of the container 224. The foot members 246 may be dimensioned to keep the base 240 of the basket 222 separate from the base 258 of the container 224. The amount of the first food component 234 that may be loaded into the container 224 may vary to provide varying amounts of airspace. Similarly, the size of the foot members 246 may also vary to provide varying amounts of airspace, but may be generally sized so as not to obstruct the passage. The footed basket 244 may include openings 238 to allow steam to enter and drain from the basket and cook the second food component 236. The foot members 246 may provide sufficient separability between the container 224 and the basket to provide the passage for steam and heat to cook the second food component 236, and openings 238 may be not required.

Employment of the footed basket 244 may provide sufficient support to the basket 222 so that rolled edges 226, 230 may be not required suspend the basket 222 above the first food component 234. This can provide certain manufacturing advantages, as modifications to the edge crimper which typically forms the rolled edges, would not be required. The footed basket 222 can be manufactured using a thermoform process, aluminum press, or other method known in the art.

Referring to FIGS. 17 through 20 a cooking apparatus may comprise a container 224 and a basket 222 with indentations 248. The basket 222 with the indentations 248 may be dimensioned to provide increased steam and airflow along the periphery of the basket 222. The indentations 248 in the sidewalls 250 of the basket and the sidewalls of the container may serve to define the passage for steam to cook the second food component 236. The form of the passage may be vertical.

The basket 222 may be steam impermeable. Suitable materials include polymers, such as polypropylene and polyethylene, among others. For example, the basket may be formed from one continuous material, such as a continuous sheet of metal or the like. The basket 222 may be utilized for cooking foods that need to be separated from the steam produced by the first food component. The basket 222 may be utilized for cooking a foodstuff such as bread, or the like. It will be appreciated that other foodstuffs may be cooked in the basket 222 and separated from steam generated by the first food.

Figure 19:
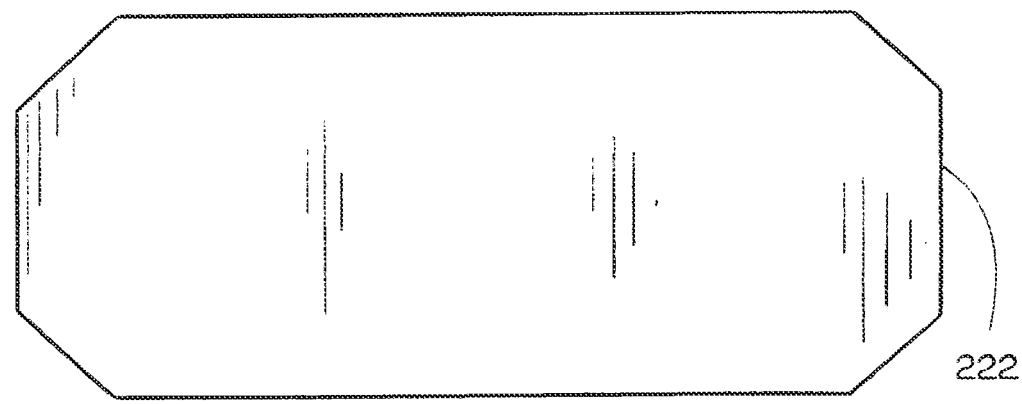
FIG. 19 is an illustration of a basket including indentations along corners of the basket.
Figure 20:
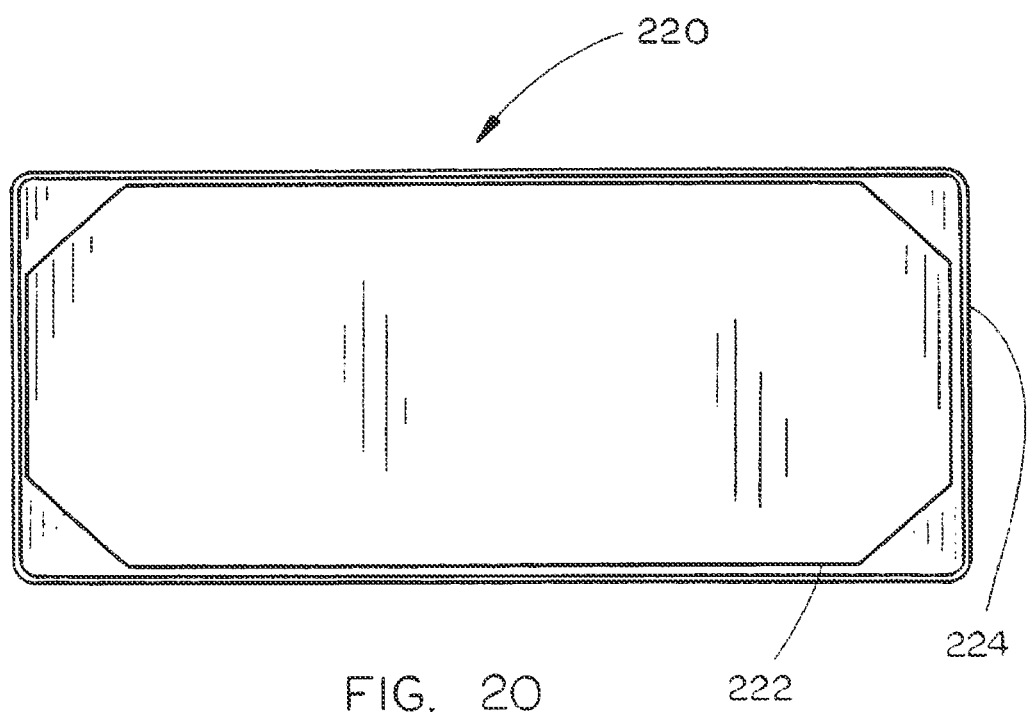
FIG. 20 is an illustration of a basket including indentations along corners of the basket removably received within a container.

The basket 222 may be of a generally rectangular shape as described previously and include indentations 248 in the side walls 250 of the basket 222. The basket 222 may include two indented side walls along the length of the basket 222. The basket 222 may include indentations 248 along both the length of the basket 222 and along the width of the basket 222. FIGS. 19 and 20 depict a generally rectangular basket 222 which may be removed to provide increased airflow and steam along the corner of the basket 222. Other configurations of indentations 248 to the basket 222 may be also possible, and may include circular indentations, contoured indentations, or the like on any number of the basket's sidewalls 250. The indentations 248 may result in a symmetrically shaped basket 222, or an asymmetrically shaped basket 222.

The ovenable cooking apparatus 220 may also include a container 224. The container 224 may be dimensioned to define the passage and provide gaps 254 between the edge/rim of the container 224 and the rim/edge of the basket 222. These gaps 254 provide steam flow and airflow to heat the second food component 236. It will be appreciated that the lid 225 for the ovenable cooking apparatus 220 may be separated from the lip of the basket 222 to allow steam to move from the passage to the second food component 236.

Referring to FIGS. 17 through 20 the cooking apparatus 220 may also include a basket 222 with handles. The handles may include a protrusion segment or other means to allow manual gripping of the basket 222 for removal from the container 224. The handles may be located on the indentations 248 at the opposing corners of the edge of the basket 222. The handles may be located on opposing sides of the length-wise indentation of the basket 222. Employment of the handles may eliminate the need for rolled edges on the basket 222 and the container 224, thus providing ease in manufacturing.

Referring to FIGS. 17 through 20, a cooking apparatus 220 may provide sufficient steam flow and airflow to the basket 222 so that openings 238 may not be required. The basket 222 may not include openings 238. The manufacturing process for forming a basket 222 with indentations 248 may be thus easier and cleaner because a secondary cut for the openings 238 may be not required. The basket 222 with indentations 248 can be formed using a thermoform process, aluminum press, or other method known in the art.

The ovenable cooking apparatus 220 described in FIGS. 17 through 20 may also be compatible with the footed basket 244 depicted in FIG. 16. The basket 222 may include foot members 246 and indentations 248 along the length of the basket 222. The foot members 246 and the indentations 248 provide steam flow and air flow to the periphery of the basket 222 to cook the second food component 236.

Referring to FIG. 21, a cooking apparatus 220 may include a wok-shaped basket 256 and a container 224. The basket 222 may be formed in a wok-like or bowl-like shape. The wok-like shape may provide enhanced thermodynamic and cooking properties for certain food components and heating devices.

The wok-shaped basket 256 may be depicted in FIG. 21 and may include a rolled edge 226 to allow stacking of the basket 222 within the container 224. The wok-shaped basket 256 may include openings 238 to provide increased steam flow and drainage. The wok-shaped basket 256 does not include openings 238 because the shape of the wok provides sufficient air flow and steam flow to heat the second food component 236. For example, the curvature of the wok-shaped basket 256 may provide a larger air gap 242 along the periphery of the wok-shaped basket 256 so air and steam can cook the second food component 236. In some instances, the second food component 236 may include breaded items for which steam contact may be not desired. In such an instance, the steam generated by the first food component 234 provides sufficient heat transfer to the basket 256 to heat the second food component 236.

Referring to FIG. 21, the container 224 may be dimensioned to allow nesting of the wok-shaped basket 256 in the container 224. The container 224 may include a rolled edge 230 to allow the basket to stack into the container 224. The amount of the first food component 234, as well as the dimensions of the wok-shaped basket 256 and the container 224, may be varied to provide different sized air gaps. The container 224 and the wok-shaped basket 256 may be dimensioned such that a portion of the base 240 of wok-shaped basket 256 may contact a portion of the base 258 of the container 224. Only a portion of the base 240 of the wok-shaped basket 256 contacts the base 258 of the container 224 or the first food component 234, providing an air gap 242 along the edge/rim of the wok-shaped basket 256. The base 240 of the wok-shaped basket 256 does not contact the first food component 234 or the base 258 of the container 224, and instead may be supported by the rolled edges to provide a larger air gap 242.

Figure 22:
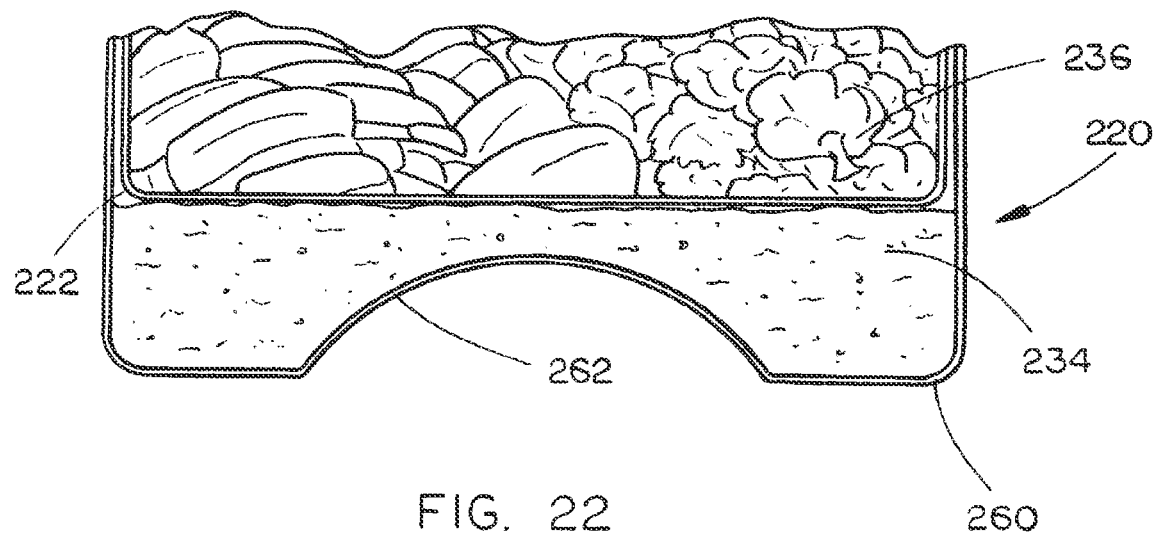
FIG. 22 is an illustration of the basket containing a second food component removably received in a container containing a first food component.

Referring to FIG. 22, a cooking apparatus 220 may include a basket 222 and a container 224 with a contoured base 260. The container may include a contour 262 at the base 258 of the container, with the concavity of the contour 262 being oriented towards the basket 222. Such a configuration may provide enhanced heat transfer to the food components. The base of the container 224 may be shaped to extend into the passage, in close proximity to the base of the basket 222. This may facilitate heat transfer between the container 224 and the basket 222 by reducing the distance between them.

Figure 24:
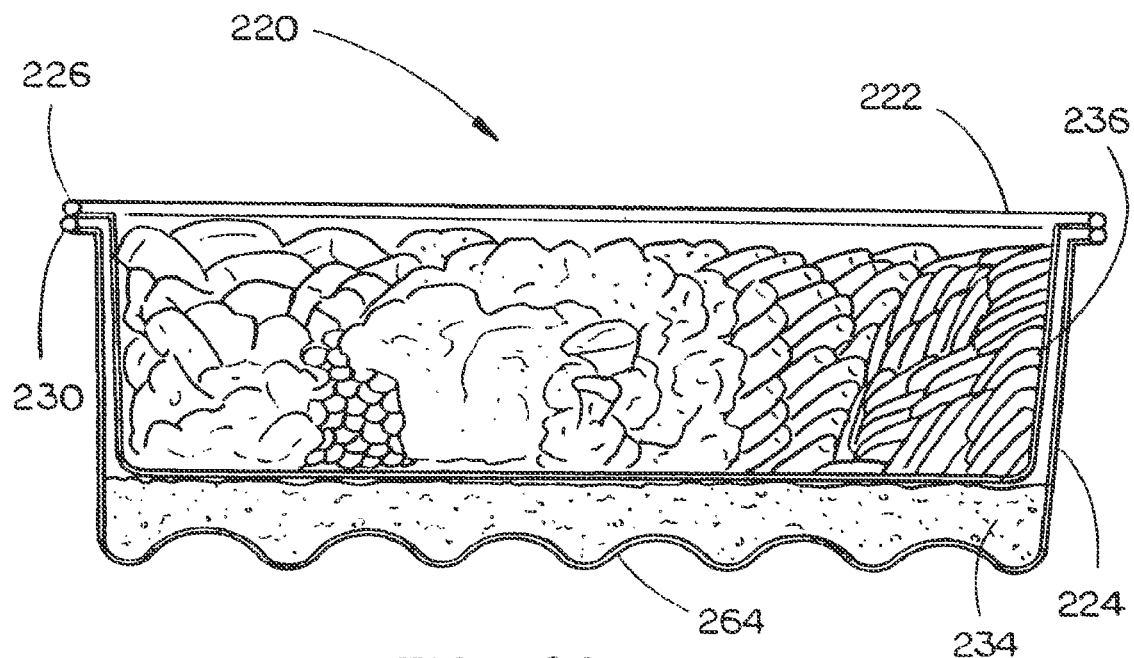
FIG. 24 is an illustration of the basket containing a second food component removably received within a container with a containing a first food component.

As depicted in FIG. 22, the container may include a contour 262 at the base 258 of the container. In some instances, the food components that may be located towards the center of the basket 222 and the container may be the most difficult to heat because they receive the least amount of heat transfer. Unlike the edges of the container, which may receive heat through the bottom and the sides of the container, the center of the base may only receive heat from one direction. The contour 262 may provide enhanced heat transfer because it reduces the thickness of this center area of the ovenable cooking apparatus 220 which may be difficult to heat. The size and concavity of the contour 262 may vary depending on the heat transfer desired and the type of food. Multiple contours 264 may also be included to provide enhanced heat transfer and cooking. Referring to FIG. 24, the container may include a plurality of contours 264 to provide a greater surface area to volume ratio on the tray. This may provide enhanced heat transfer because a greater surface area on the container provides a greater area for heat transfer to occur. Other textures may also be applied to the base 258 of the container to increase the surface area for heat transfer, including pyramidal textures, sinusoidal textures, wave patterns, or the like.

Figure 23:
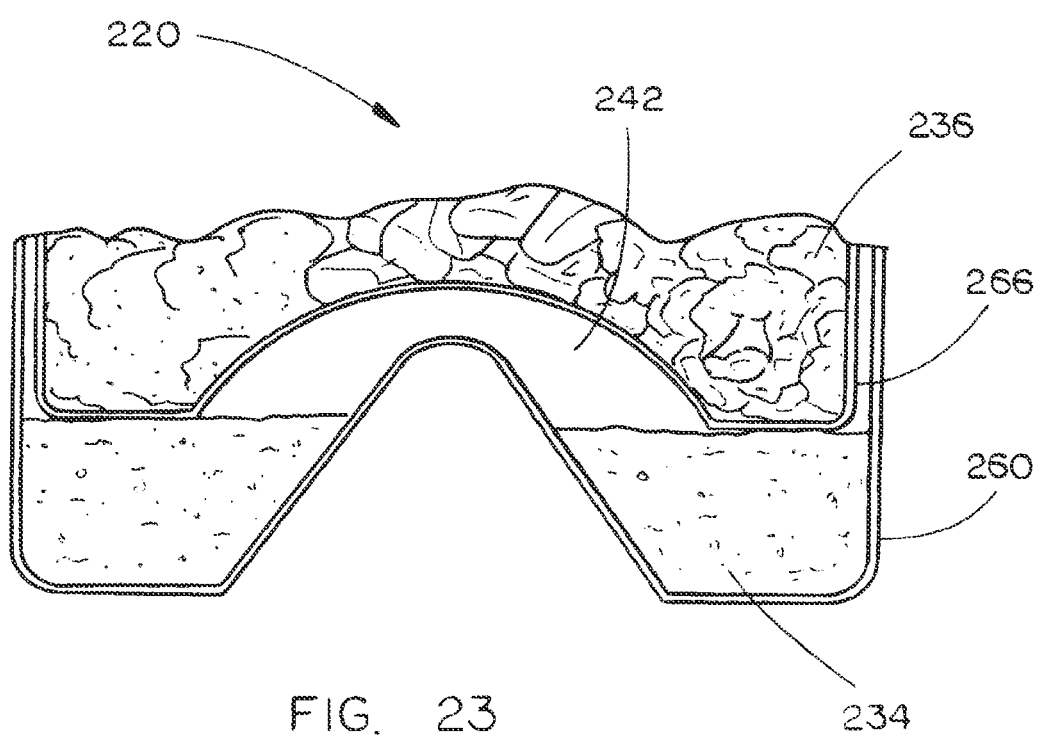
FIG. 23 is an illustration of a basket containing a second food component removably received within a container containing a first food component.

Referring to FIG. 23, the basket 222 may also include a contour 266 to provide enhanced heat transfer and cooking. The contour 262 of the container may be greater than the contour 266 of the basket 222 so that when the basket 222 may be removably received in the container the air gap may be minimized.

Figure 25:
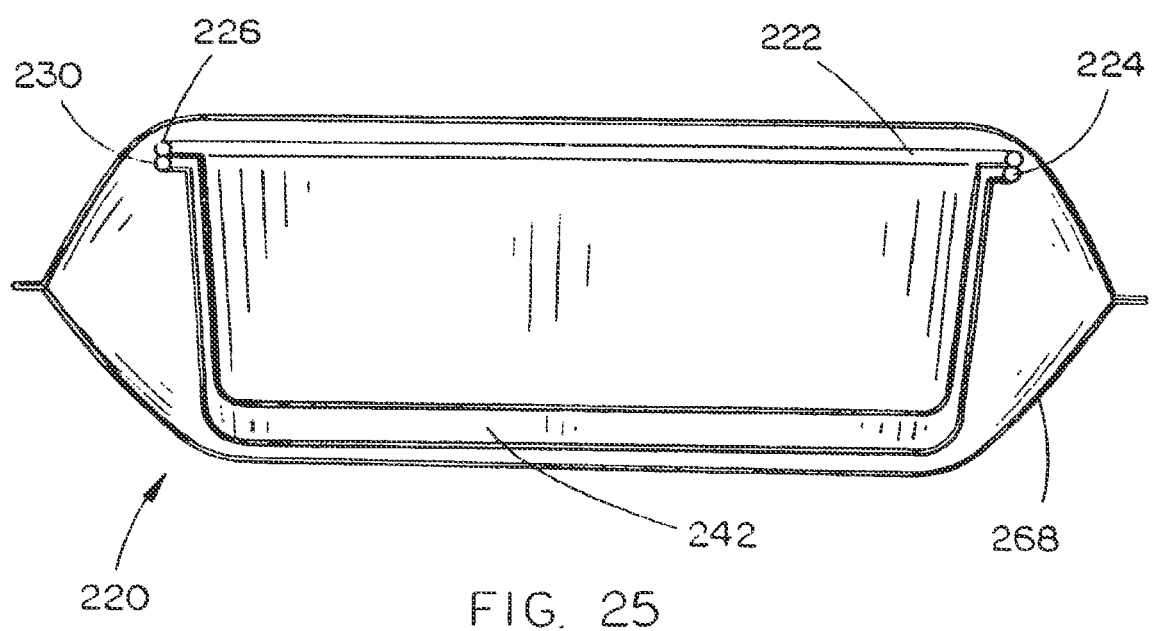
FIG. 25 is an illustration of an oven bag containing a basket removably received in a container.

Referring to FIG. 25 a cooking apparatus may include a basket 222, container 224, and an oven bag 268. The oven bag 268 may be non-venting to increase the cooking pressures and decrease cooking time. To prepare the food, the basket 222 may be removably received within the container 224 and both may be cooked inside the oven bag 268. For packaging, transport, and sale, the basket 222 and container 224 may be already packaged within the oven bag 268, or the oven bag 268 may be included with the container 224 and basket 222 and the user puts the container 224 and basket 222 into the oven bag 268.

Figure 26:
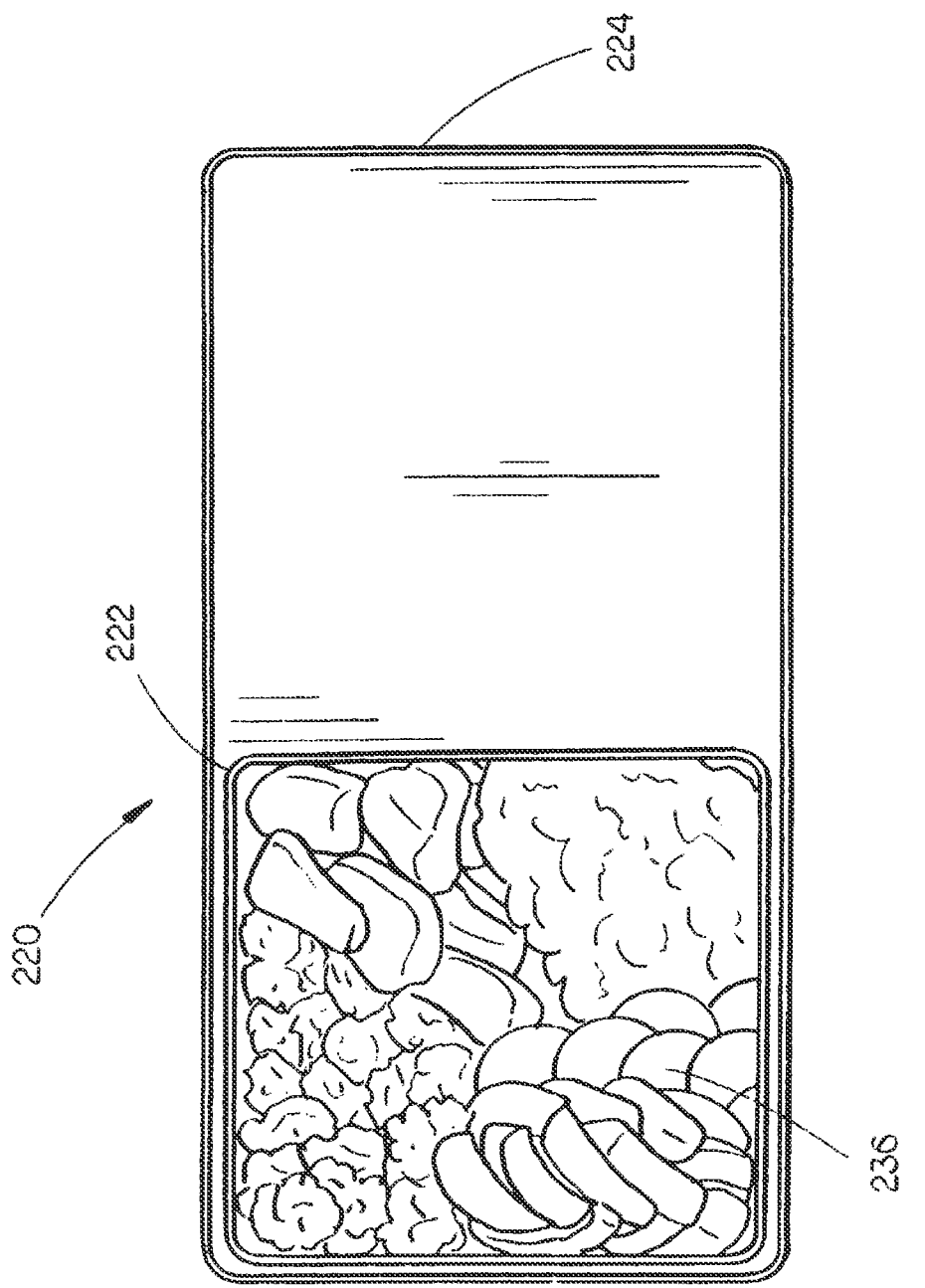
FIG. 26 is an illustration of a basket containing the second food component removably received in a container containing a first food component.

Referring to FIG. 26, an ovenable cooking apparatus 220 may include a basket 222 that may be dimensioned to be smaller than the container 224. The basket 222 may be less than half the size of the container 224. Such a configuration may be used for food products that include a greater amount of a first food component 234 (such as sauce or sauce and vegetables) than a second food component 236 (such as starch, protein, or the like). The second food component 236 may be packaged in the basket 222, which may be smaller and dimensioned to receive a smaller amount of food and the first food component 234 may be packaged in the container 224. Multiple baskets may also be included in the container 224. The container 224 and the baskets may be dimensioned to allow the container 224 to accommodate two or more baskets containing different food components.

The ovenable cooking apparatus 220 may include a container 224 with a first basket 222 and a second basket. The container 224 holds a first food component 234, the first basket 222 holds a second food component 236 and the second basket may hold a second food component 236 or a third food component. The first basket 222 and the second basket may employ any of the features described previously, including openings 238, handles, or foot members 246. The first basket 222 and the second basket may have different characteristics, particularly if they may be used to hold different food components. For example, the first basket 222 may include openings 238 to provide extra drainage and steam flow to a second food component 236, while the second basket may not include openings 238. The container 224 and baskets may be dimensioned to allow several baskets to be removably received within a single container 224.

The ovenable cooking apparatus 220 may be used according to a number of methods. In one method, the container 224 containing the first food component 234 and the basket 222 containing a second food component 236 may be packaged and sold together. The basket 222 and the container 224 may be packaged in a nested fashion for efficiency, but prepared separately. For instance, a user may be instructed to heat the container 224 and the basket 222 separately instead of in a nested fashion to prepare the food components. The ovenable cooking apparatus 220 may include a container 224 containing a first food component 234 and a basket 222 containing a second food component 236, as well as a second basket containing a third food component. The first and second baskets may be removably received in the container 224 during transport and sale, and during preparation a user may separate the second basket and cook it separately while leaving the first basket and the container 224 to cook in a nested fashion.

The materials used to construct the basket 222 and the container 224 may depend on the cooking mechanism, the type of food, cost, and other factors. The materials may include all the aforementioned materials (PP, CPET, APET, Nylon, Aluminum, etc.), and others such as pressed paperboard, molded pulp, or the like. It may also be possible to construct the basket 222 from one material and the container 224 from another. For instance, the basket 222 may be constructed of polypropylene (PP) and the container 224 may be constructed of Crystallized Polyethylene Terephtalate (CPET).

An ovenable cooking apparatus 300 suitable for use in multi-serve or family style applications is presented. FIGS. 29-35 show an ovenable cooking apparatus 300 suitable for such applications. The previously disclosed cooking apparatuses (as in FIGS. 1 and 11) generally comprise a base container (which may hold a liquid component) and a basket (which typically holds a solid food component or components) which may be received and held by the container.

While this arrangement may be beneficial for single-serve or large-batch preparation (as for food service) where all solid food components of the product may be combined in a single compartment, in multi-serve, family-style configurations, alternate constructions may also be desired. The meal preparation needs of today's busy families require convenient mechanisms for providing a variety of food items to accommodate the varied tastes of multiple individuals.

Figure 27:
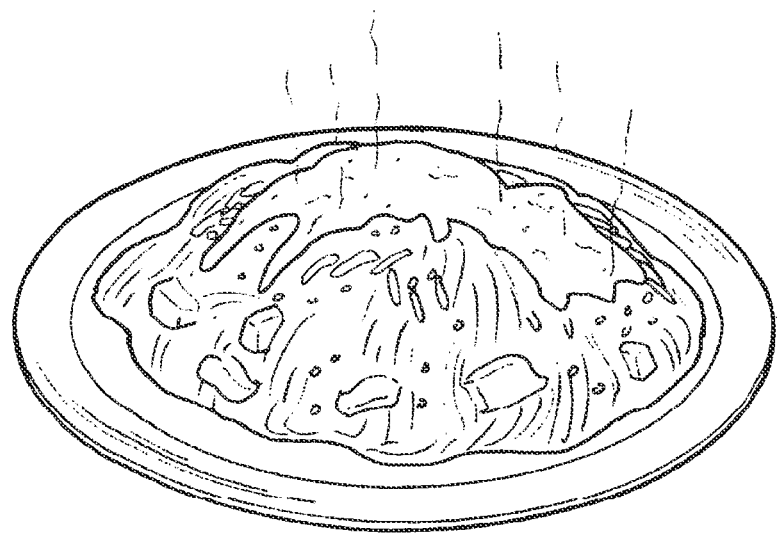
FIG. 27 is an illustration of a configuration for plated food components.
Figure 28:
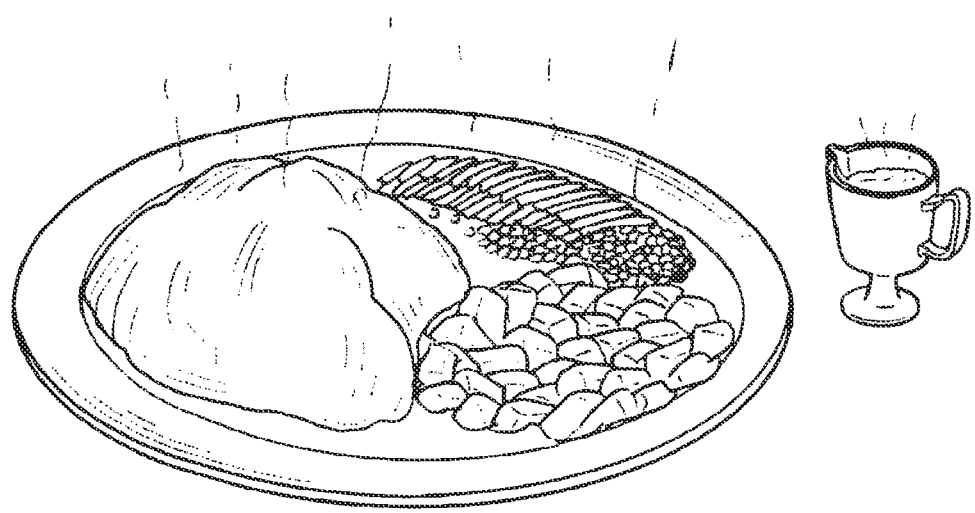
FIG. 28 is an illustration of a configuration for plated food components.

For example, a first individual may desire that all components of a meal be combined in a single grouping as the individual prefers the combined flavors and textures of various combinations of components, as in FIG. 27. However, a second individual may not enjoy such a combination of flavors and textures of the components and may prefer for the components to remain spatially separate as in FIG. 28.

As such, FIGS. 29-35 disclose multi-serve cooking apparatuses incorporating multiple food-types which may be physically separated and may be combined according to individual tastes.

Figure 29:
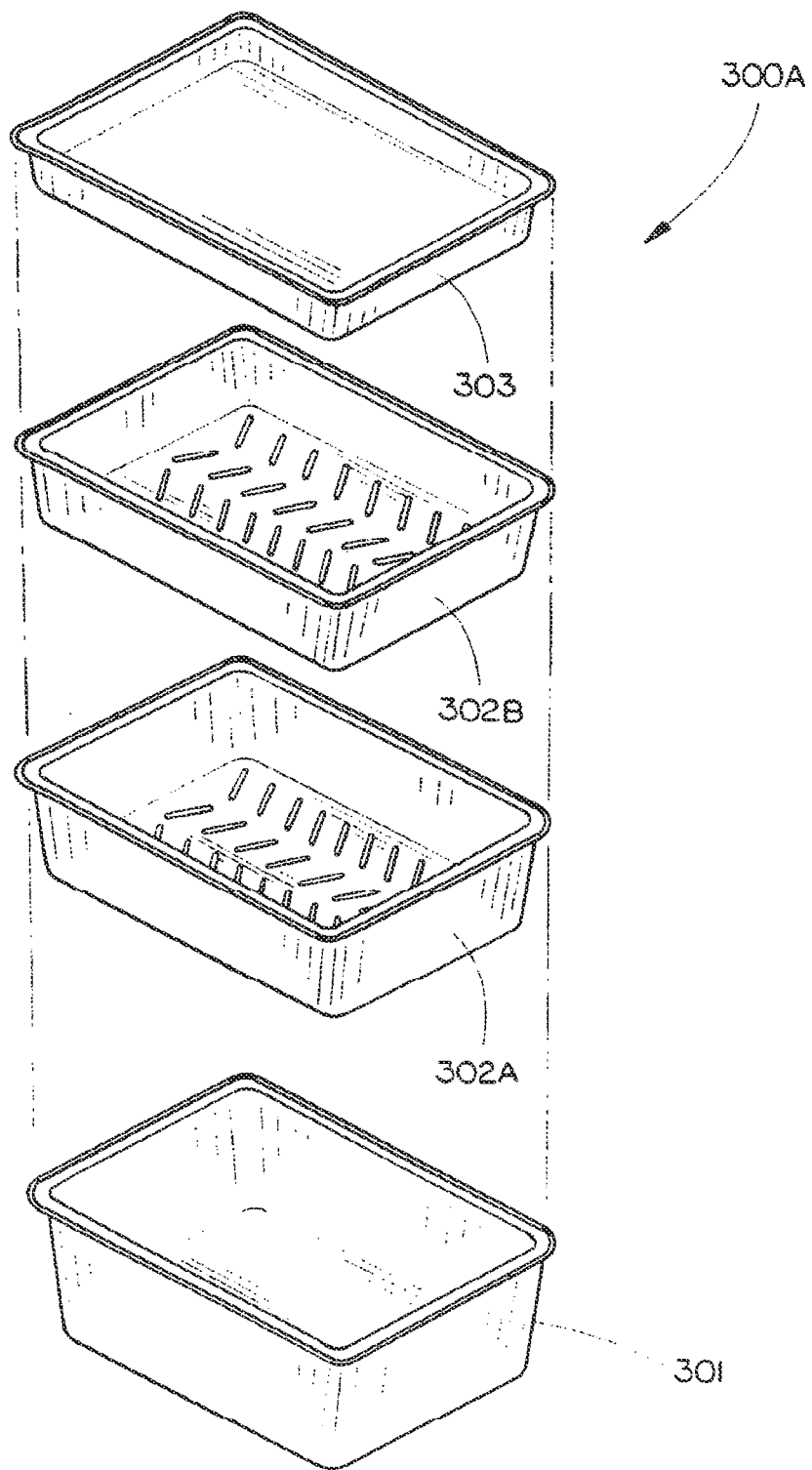
FIG. 29 is an illustration of basket-trays and non-perforated trays removably received within a base container.

In FIG. 29, a multi-serve cooking apparatus 300A is presented. The apparatus 300 may comprise a base container 301, perforated basket-type trays 302 and/or non-perforated trays 303 which may be removably received within the base container 301.

As previously discussed, the base container 301 may hold a liquid component. A portion of this liquid component may be converted to a vapor phase upon heating, thereby facilitating the cooking of food items disposed in the trays 302, 303 removably received within the base 301.

The number and type of removably received trays 302, 303 may be configured based on the nature of the food components which may be disposed therein. For example, food items which require more thermal energy to ensure adequate cooking, such as proteins, may be disposed in a first basket-tray 302A which may be directly adjacent to the base 301. Food components which require less thermal energy for cooking but still benefit from the steaming characteristics provided by a basket-type tray construction, such as fruits, vegetables, and certain starches may be disposed in a second basket 302B. Further, components which require limited thermal energy or may be degraded by steaming, such as breads, may be disposed in a tray 303 having a base substantially or completely free of perforations so as to inhibit or prohibit the interaction between the vapor phase of the liquid component and the food components disposed within such perforation-free compartments.

Figure 29B:
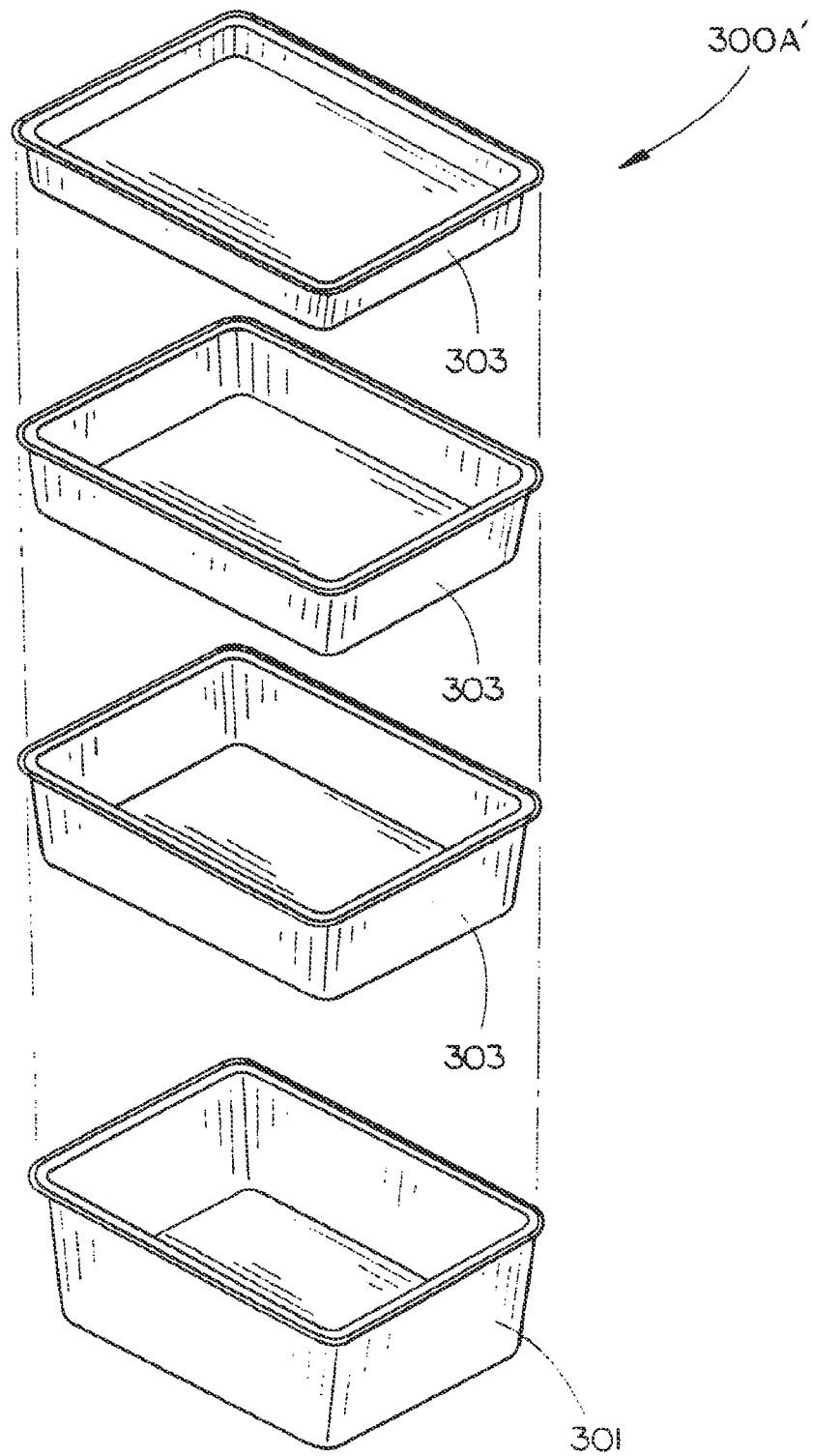
FIG. 29B is an illustration of non-perforated trays removably received within a base container.

Referring to FIG. 29B, a cooking apparatus 300A' is presented. The apparatus 300 may comprise a base container 301, and one or more non-perforated trays 303 which may be removably received within the base container 301.

Figure 30A:
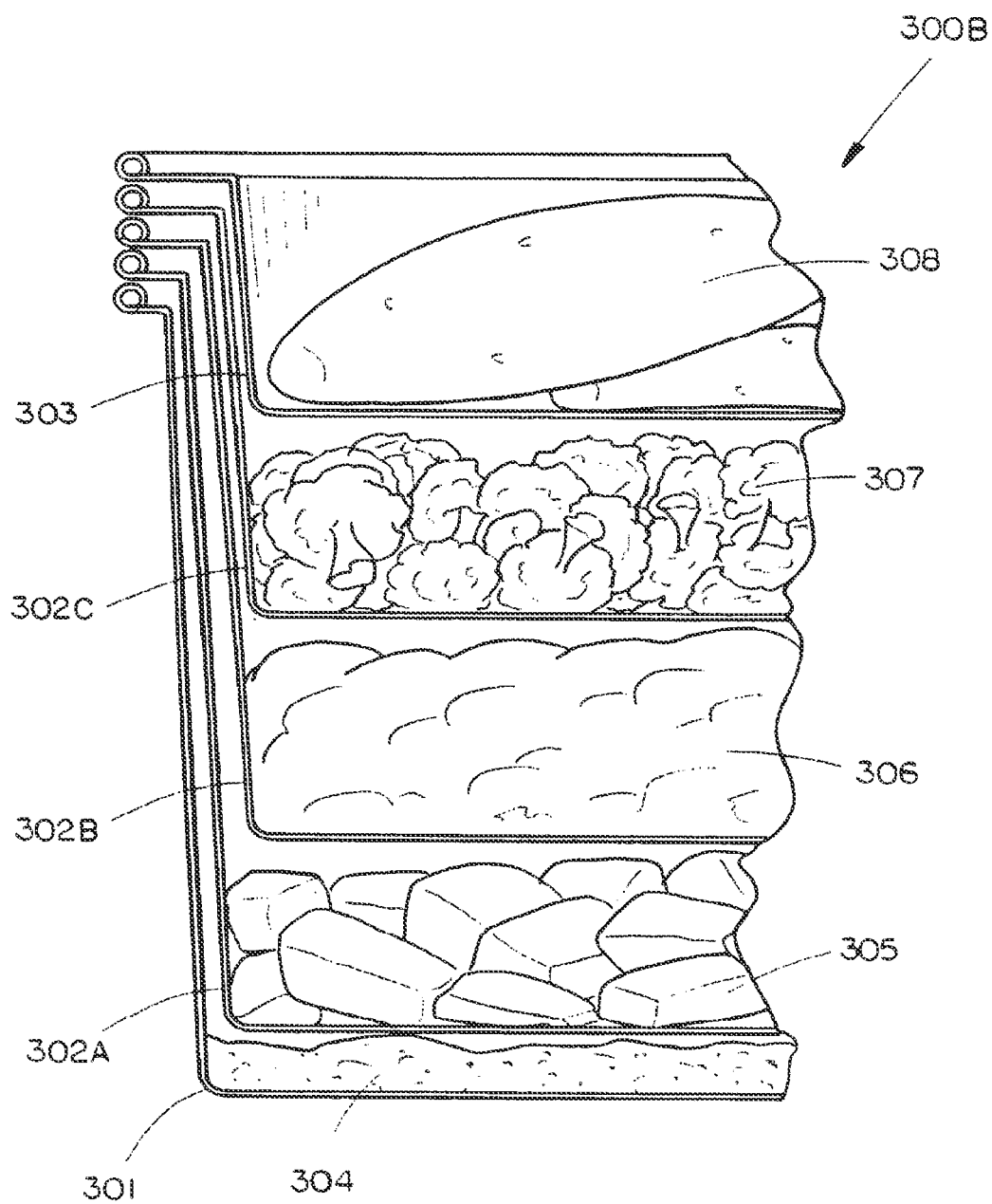
FIG. 30A is an illustration of basket-trays and non-perforated trays removably received within a base container.

Referring to FIG. 30A, a liquid component 304, such as a sauce or broth, may be disposed in base container 301. A second food component, such as a protein 305, may be disposed within basket-tray 302A. A third component, such as a vegetable or fruit 306, may be disposed within basket-tray 302B. A fourth component, such as a starch or grain 307, may be disposed in basket-tray 302O. A fifth component, such as a bread 308, may be disposed within a non-perforated tray 303.

Such a configuration may operate to create a gradient of vapor concentration as the components adjacent to the base container 305 will receive a greater level of steaming and flavoring from the liquid component 304 than will those at more distant levels 306, 307, 308.

Figure 30B:
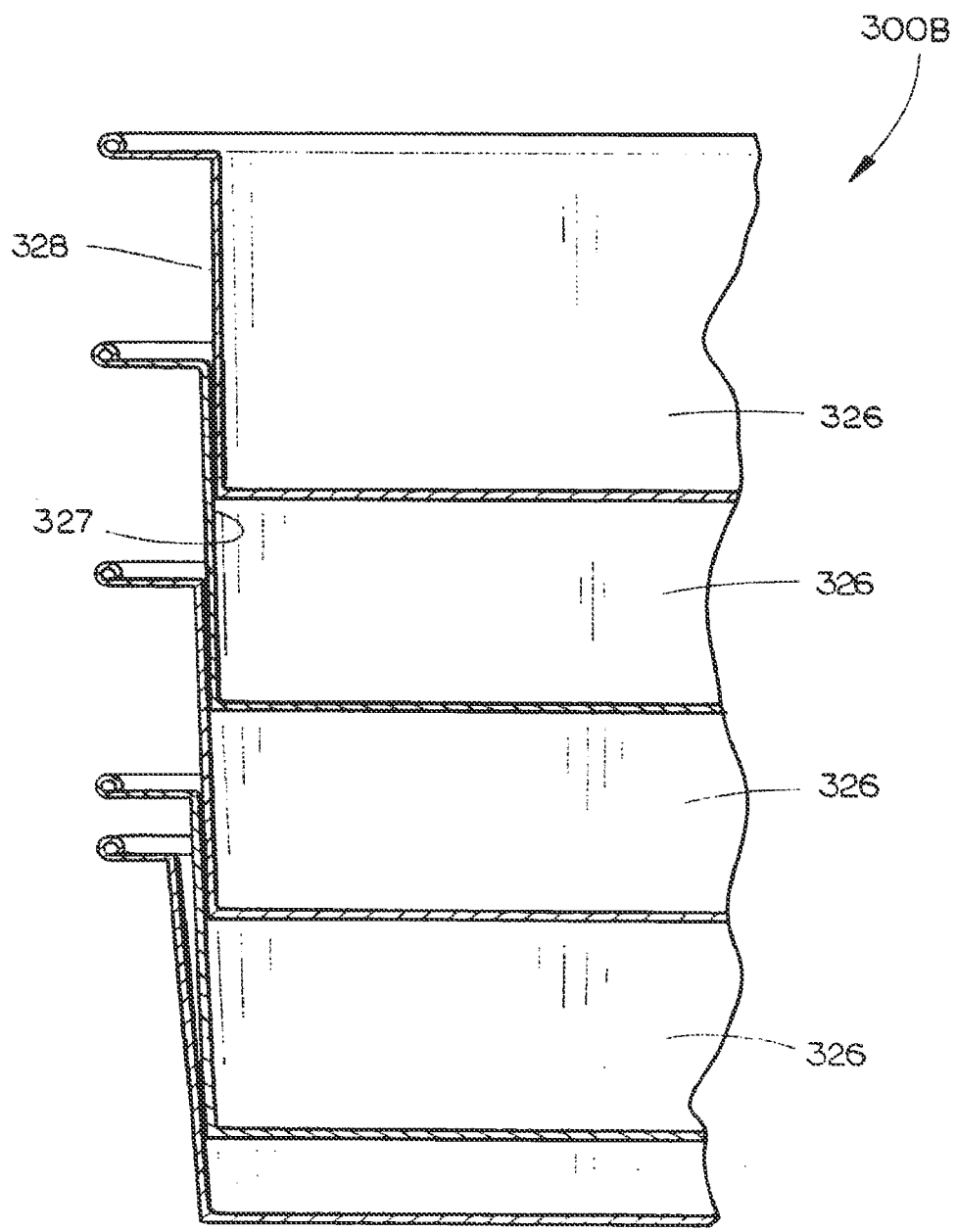
FIG. 30B is an illustration of basket-trays and non-perforated trays removably received within a base container.

It should also be noted that in the nesting configuration of the cooking apparatuses 300A-B, the flanged portion of each removably received tray rests upon the flanged portion of the tray beneath it. However, other nesting configurations are fully contemplated. FIG. 30B presents a configuration where the walls of each of the removably received trays 326 may be dimensioned such that the interior surface of a lower tray 327 may be contacted with the exterior surface of an upper tray 328 so as to retain the upper tray 328 in an elevated position with respect to the lower tray 327.

Figure 30C:
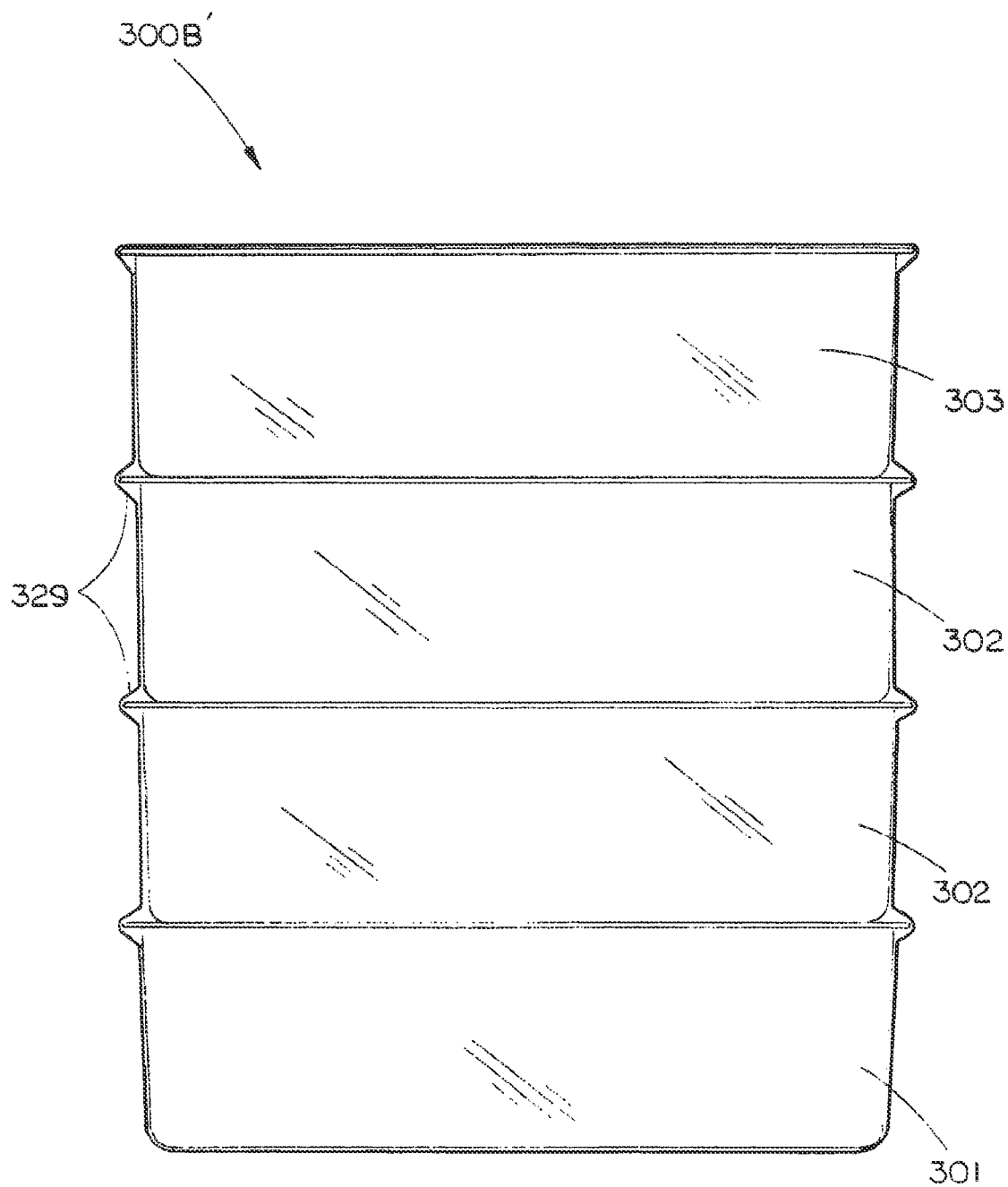
FIG. 30C is an illustration of basket-trays and non-perforated trays stacked atop a base container.

Referring to FIG. 30C, a base container 301, basket trays 302, and/or non-perforated trays 303 may be configured so as to sit atop one another in a stacked configuration such that no portion of a container or tray is received within another container or tray. The base container 301 and trays 302 and 303 may comprise rim portions and floor portions dimensioned such that a floor portion of a first container 301 or tray 302, 303 may contact a rim portion of a second container 301 or tray so as to support the first container 301 or tray 302, 303 above the second container 301 or tray 302, 303. The base container 301 and trays 302, 303 may comprise support structures, such stilts, tabbed portions, or other supporting elements such that a first container 301 or tray 302, 303 may contact the support structure of a second container 301 or tray so as to support the first container 301 or tray 302, 303 above the second container 301 or tray 302, 303.

Figure 30D:
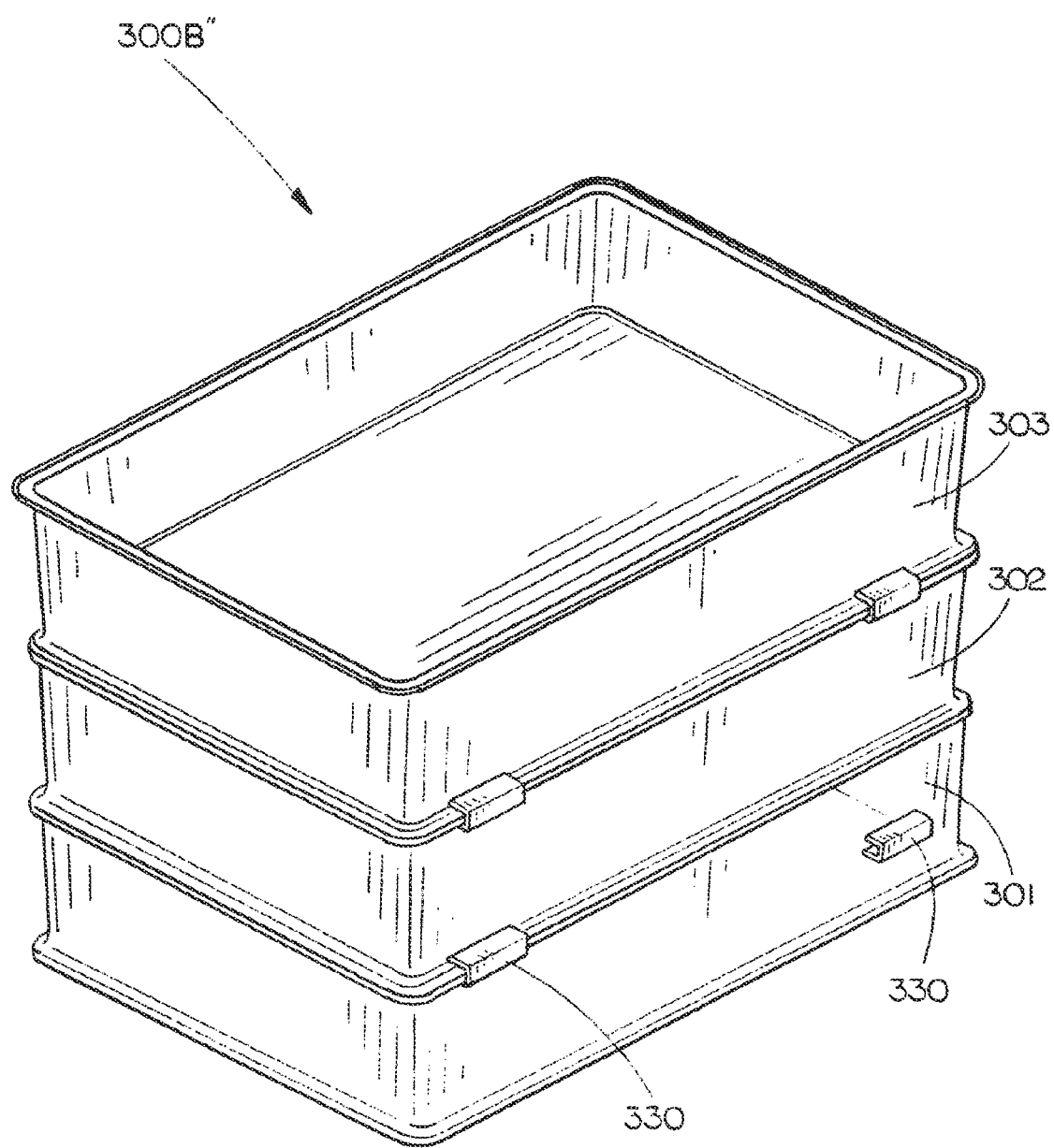
FIG. 30D is an illustration of basket-trays and non-perforated trays stacked atop a base container.

The base container 301 and trays 302, 303 may be maintained in a stacked configuration through the use of an ovenwrap film 329. The film overwrap may be constructed of plastics, polymers, heat sealable papers, cellophane, foils and the like. Referring to FIG. 30D, the base container 301 and trays 302, 303 may be maintained in a stacked configuration through the use of clips or fasteners 330 which cooperatively engage a portion of at least two of the base container 301 and the trays 302, 303.

Figure 31:
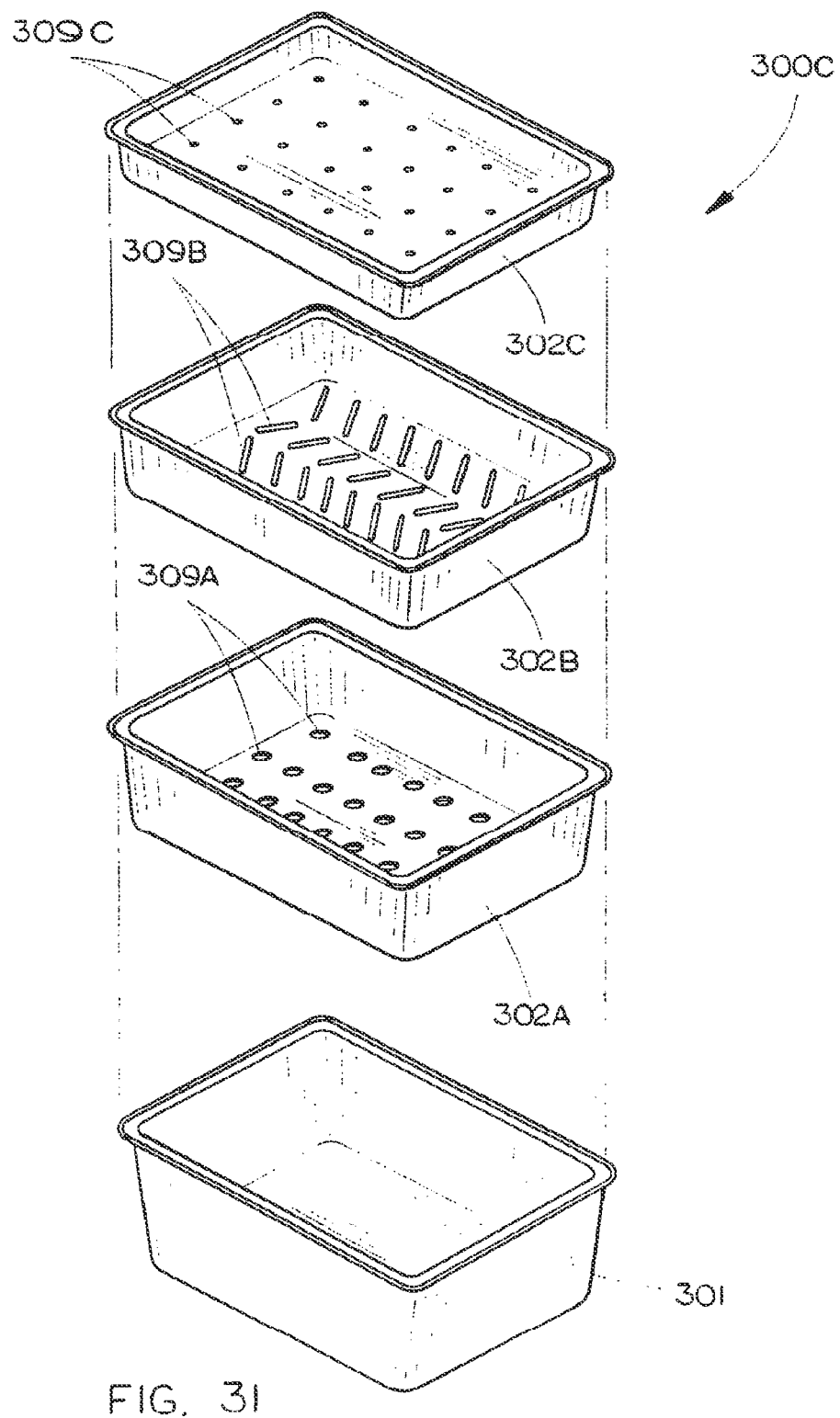
FIG. 31 is an illustration of a basket-trays and/or non-perforated trays removably received within a base container.

The level of interaction of the vapor phase of the liquid component with subsequent components may be regulated by the size and/or shape of the perforations of the basket-trays. FIG. 31 provides a cooking apparatus 3000 comprising a base container 301 and basket-trays 302. The basket-trays 302A-C may comprise perforations 309, 310 and 311 having respective cross-sectional areas wherein perforations 309 may have a cross-sectional area greater than those of perforations 310. Similarly, perforations 310 may have greater cross-sectional area than those of perforations 311. Such varied cross-sectional areas provide a mechanism for controlling the amount of vapor which contacts a given food component, thereby further optimizing the cook characteristics of a particular food component.

It should be noted that the size and relative arrangement of the perforations of trays 302A-C may be arbitrary and one skilled in the art would necessarily recognize that such parameters may be easily adjusted to obtain specified cooking characteristics for individual food components and/or combinations thereof.

Figure 32:
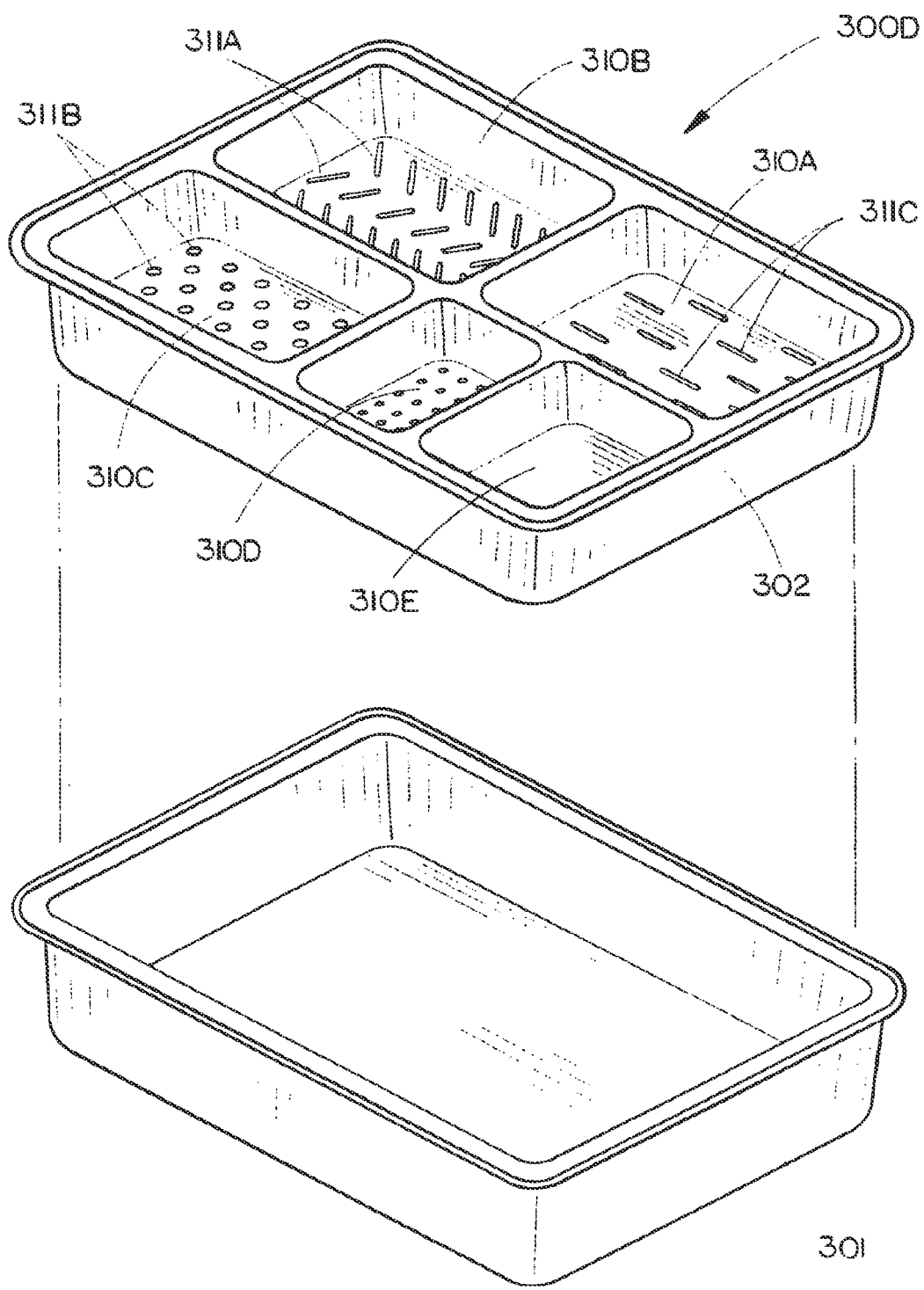
FIG. 32 is an illustration of a compartmentalized tray removably received within a base container.

Referring to FIG. 32, a cooking apparatus 300D may comprise a base container 301 and a compartmentalized basket-tray 302. The basket-tray 302 may include a plurality of compartments 310, each containing one or more distinct food components. Each compartment 310 may include perforations 311 allowing the transfer of the vapor-phase of a liquid component disposed in the base container 301 into the individual compartments 310. Such a configuration provides a mechanism whereby the food component disposed in each compartment 310 may be directly adjacent to the liquid component in the base tray and may receive the full effects of the vapor-phase interaction.

As previously described the size and shape of the perforations 311 may be adjusted so as to optimize the amount of interaction between the vapor-phase of the liquid component and the remaining food components disposed in the respective compartments 310. It should also be noted that one or more of the compartments 310E may be either substantially or completely free of perforations so as to inhibit or prohibit the interaction between the vapor phase of the liquid component and the food components disposed within such perforation-free compartments.

Figure 33:
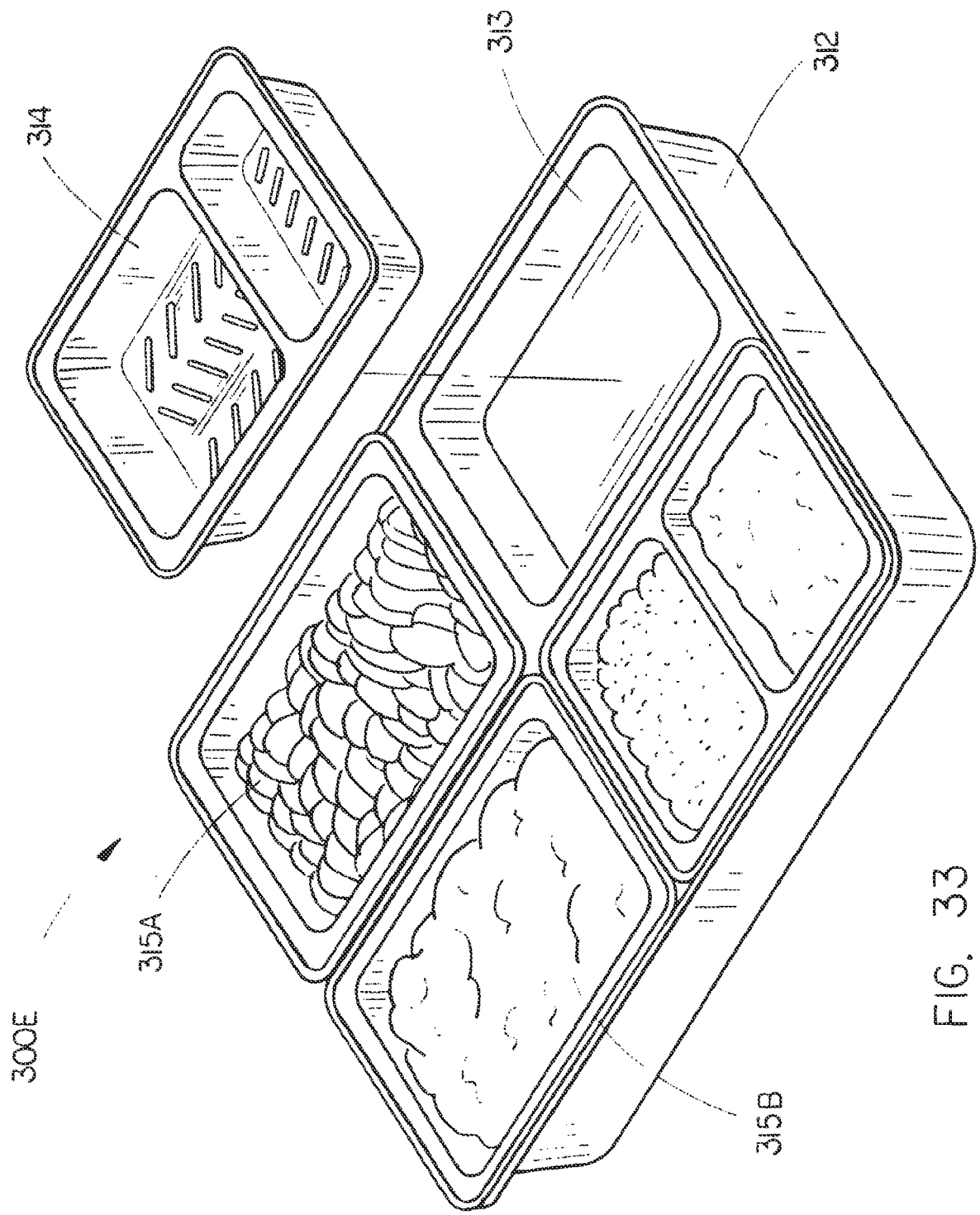
FIG. 33 is an illustration of a compartmentalized tray removably received within a compartmentalized base container.

Referring to FIG. 33, a cooking apparatus 300E may comprise a base container 312 having a plurality of compartments 313 and a plurality of basket trays 314 and non-perforated trays (not shown) which may be received within the compartments 313. Such a configuration allows for the use of one or more liquid components which may be independently disposed within the various compartments 313. As such, various solid food components 315 may be contacted with vapor-phases of distinct liquid components thereby providing for the optimization of the cooking and flavoring characteristics for each component 315. Additionally, the final moisture content of a specific solid food component 315 may be specifically tailored by controlling the amount of liquid component.

Figure 34:
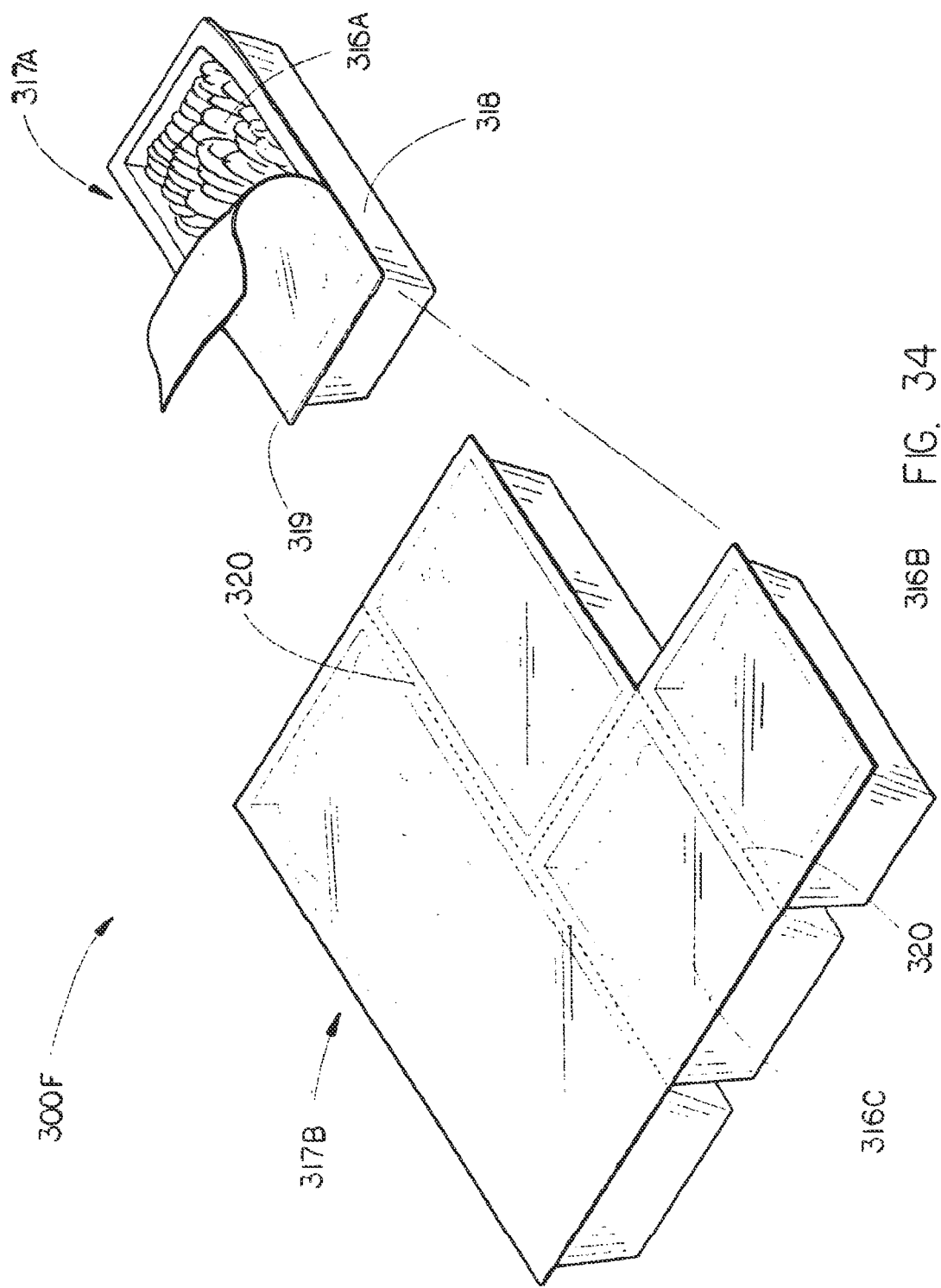
FIG. 34 is an illustration of a plurality of trays removably received within a plurality of base containers.

Similarly, FIG. 34 presents a cooking apparatus 300F where distinct food components 316 and their associated liquid components may be maintained in separable containers 317. Each separable container 317 may comprise a base container 318 and a basket-tray 319 or non-perforated tray 319 which may be received in the base container 318. The apparatus 300 may also comprise means 320 for separating the separable containers 317. Such means may include perforations, score lines, tear tabs, or any other such mechanism common to the art. Such a configuration provides the benefits of the multiple compartment/multiple liquid arrangement detailed with respect to FIG. 33. Additionally, the separable containers 317 may allow for the varied cooking characteristics of specific food types. The separable nature of the apparatus 300 allows for differing cook times to be realized for differing food types thereby optimizing the characteristics of the finally prepared food product 316. The separable nature of the apparatus 300F also provides a mechanism whereby a given liquid component disposed in a base container 318 may be further utilized as a component of the meal as it can be independently plated on or about a given food component 316 due to the ease of pouring or otherwise removing the liquid component from a base container 317A which may have been individually separated from other base containers 317B.

Figure 35:
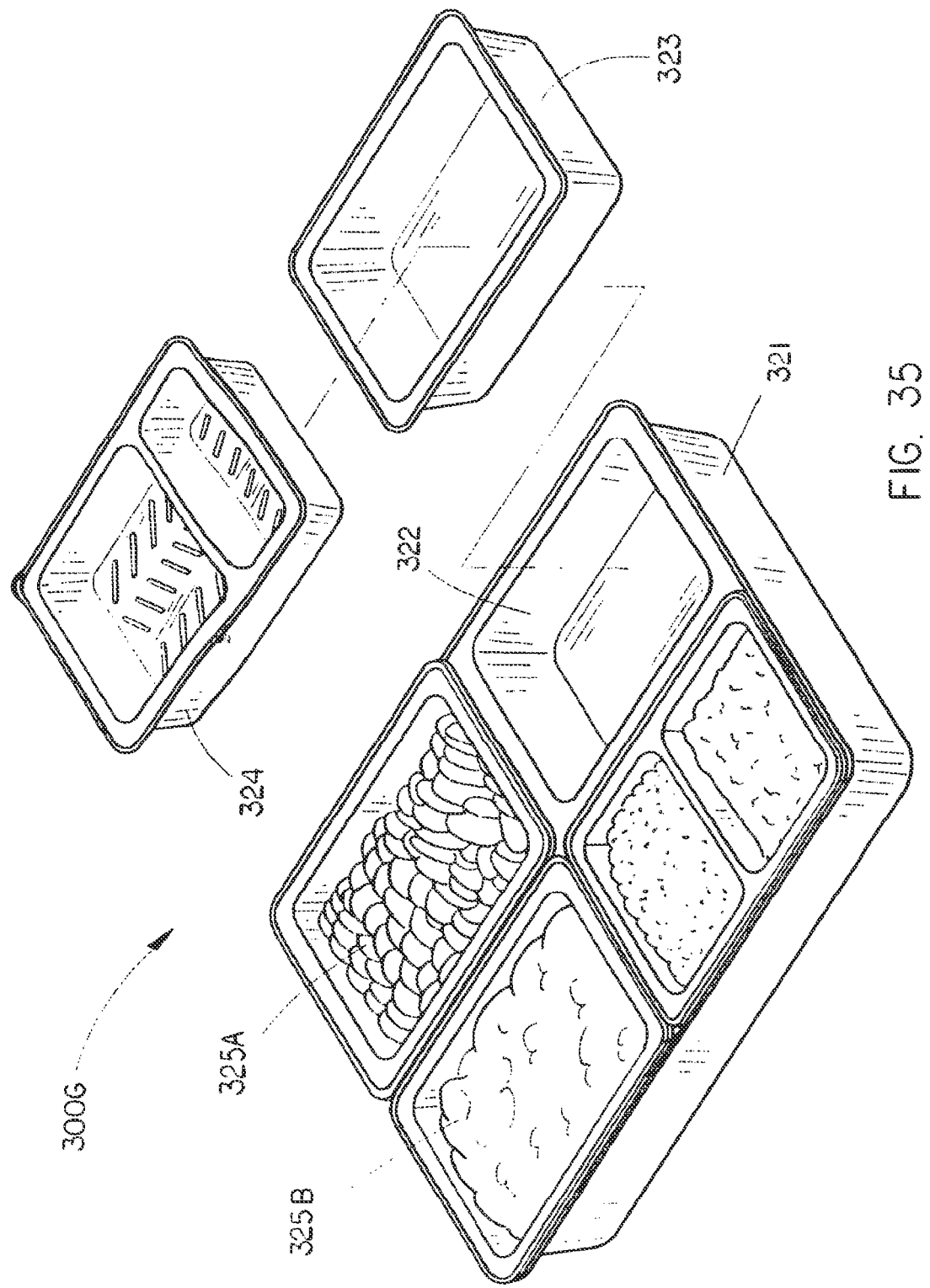
FIG. 35 is an illustration of a basket-tray removably received within a secondary tub container removably received within a base tray.

FIG. 35 presents a cooking apparatus 300G, similar to that presented in FIG. 34. Cooking apparatus 300G may comprise a base container 321 having a plurality of compartments 322, a plurality of secondary tub containers 323, and a plurality of basket-trays 324. The basket-trays 324 may be received in the secondary tub containers 323, which may then be received within a given compartment 322 of the base container 321. As with the separable base containers 317 of FIG. 34, the incorporation of the secondary tub containers 323 allows for the use of one or more distinct liquid components which may be independently disposed within the various secondary tub containers 323. Such a product also provides a simplified mechanism for separating various food components 325 for independent preparation whereby the secondary tub container 323 and basket-tray 324 containing each food component may simply be removed from the base container 321. Similarly, a basket-tray 324 may be omitted from a secondary tub container 323 so as to provide a simple tray container for food items for which steam cooking is not desired.

As previously described, the cooking apparatuses generally comprise base containers which may hold a liquid component, such as liquids, gels, partially liquid or gelatinous mixtures, and mixtures thereof as a single mass maintained in a frozen condition which, upon heating, generates a vapor-phase which facilitates the cooking and/or flavoring of various other solid food components. The cooking apparatus may also comprise additional formulations and structures for the liquid component.

Figure 36A:
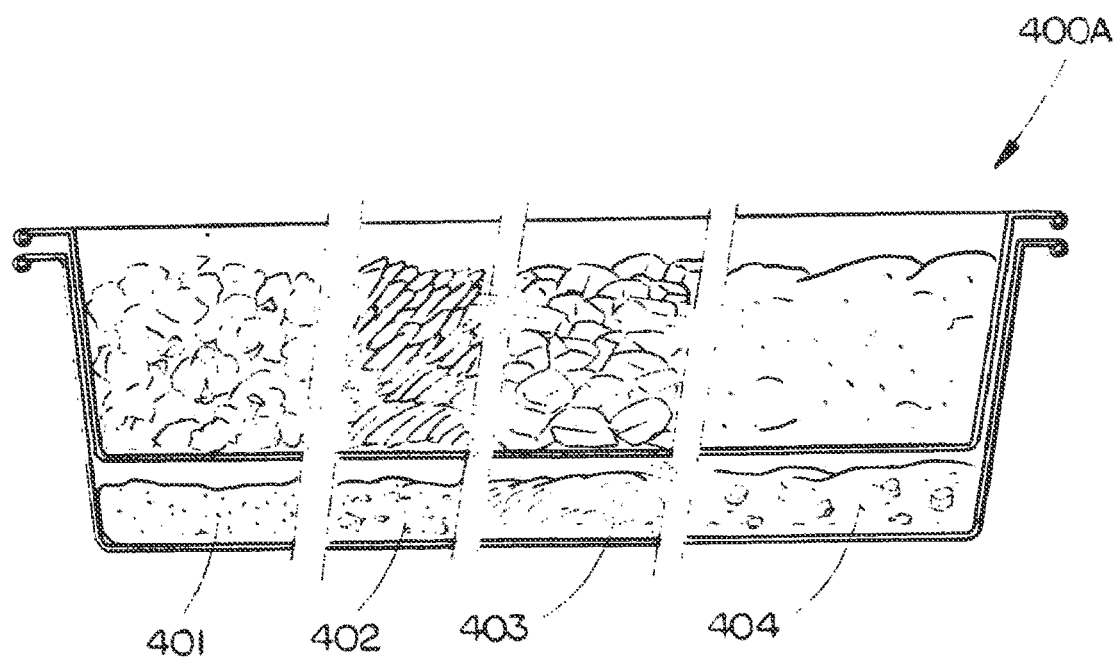
FIG. 36A is an illustration of a basket-tray removably received within a base container where the base container contains various formulations of a liquid component.

Referring to FIG. 36A a cooking apparatus may include a liquid component having a particulated formulation. Such particulates may include granules 401, flakes or chips 402, shavings 403, or chunks or cubes 404. The various particulate formulations provide numerous advantages including more efficient thawing and heating of the food components due to the increased surface-area:volume ratio and corresponding decrease in density. Such characteristics result in shorter cook times, thereby causing less thermal degradation of the food components due to heating.

The liquid component may be initially disposed in a frozen block or particulated 401-404 form atop the solid food components (not shown) such that, upon heating, the liquid component may melt and flow downward over the solid food items to create a braising effect for the solid food items.

Figure 36B:
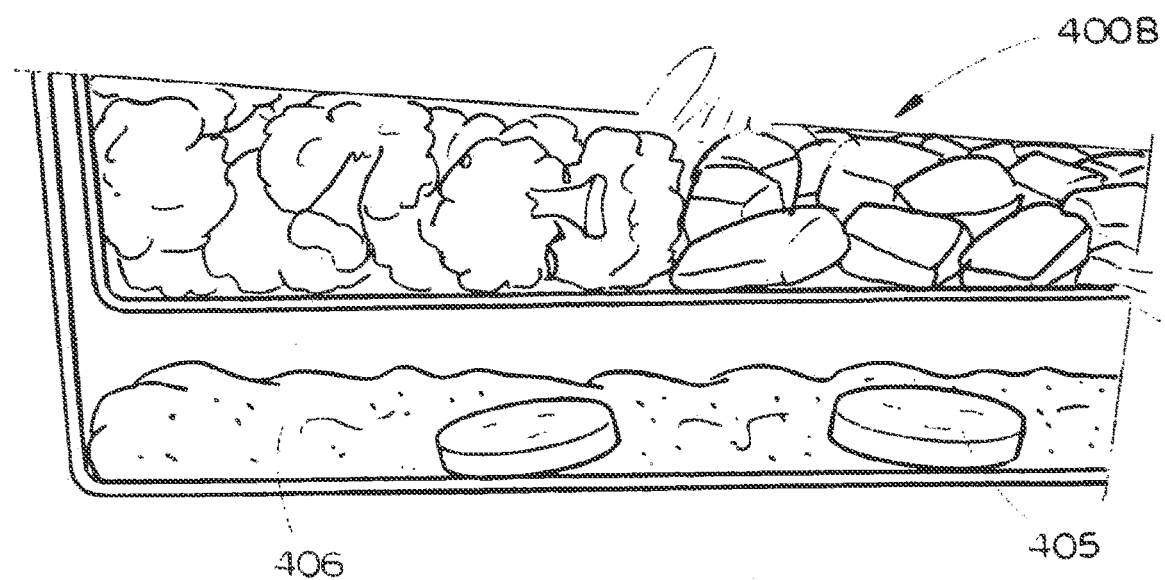
FIG. 36B is an illustration of solid food incorporated into a liquid component.

As shown in FIG. 36B, solid food pieces 405 comprising portions of protein, vegetable, starch or other food types may be incorporated into the liquid component 406. Such incorporation provides for more direct flavor transfer between the liquid component 406 and the solid food component pieces 405. Also, such incorporation may remove the need for subsequent mixing steps for particular liquid component/solid component combinations which may be commonly preferred to be consumed together (e.g. pasta and sauce). Additionally, the disposition of solid food component pieces 405 which may be susceptible to freezer burn within the liquid component 406 may serve to reduce or eliminate such effects.

Figure 37:
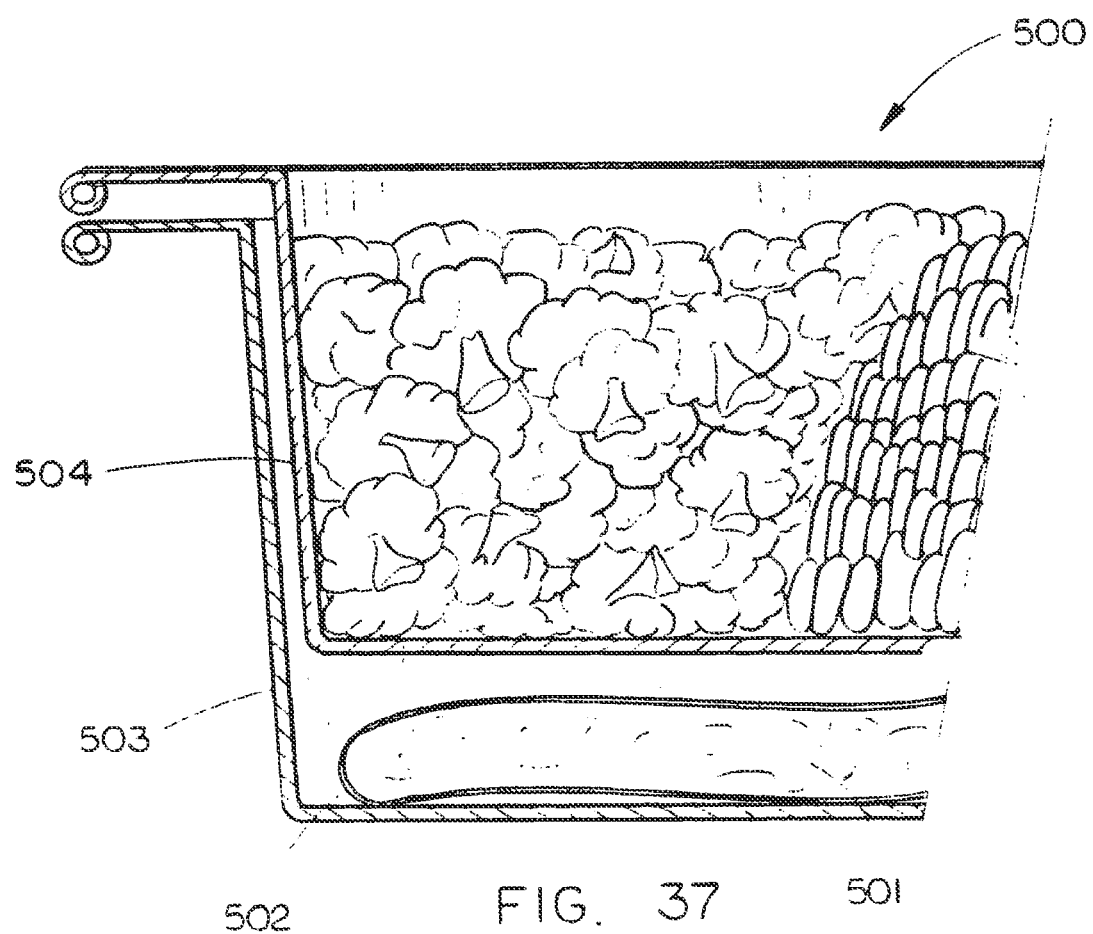
FIG. 37 is an illustration of a basket-tray removably received within a base container where a liquid component contained within the base container may be disposed within a pouch structure.

Referring to FIG. 37, a liquid component 501 may be disposed within pouch 502. The pouch 502 may be frangible or dissolvable upon heating or may be removable such that a user may open the pouch so as to dispense some or all of the liquid component 501 into the base container 503 prior to, during or after cooking. Such a pouch would allow for the use of a liquid component in combination with frozen, refrigerated or shelf-stable solid food components while still providing the benefits of the vapor-phase cooking capabilities of the apparatus, as previously described. The pouch 502 may be constructed so as to rupture due to a buildup of pressure within the pouch 502. Alternately, the pouch 502 may be dissolvable or edible and may be constructed from materials including starch, cellulose, or protein based components. Similarly, the base container 503 and/or the tray 504 may be constructed from edible materials including starch, cellulose, protein based components, food stuffs including tapioca, bamboo, potato, and pastries. The edible tray materials may further comprise various flavoring additives.

The liquid component may be formulated as a dehydrated or partially dehydrated composition, or as a powdered mix. Such formulations may provide numerous benefits. Maintaining the liquid component in a dehydrated or dry formulation may reduce or eliminate the need for full hermetic sealing of the cooking apparatus due to the shelf-stable or semi-shelf-stable nature of the dehydrated food component so that the cooking apparatus could be utilized in combination with refrigerated or shelf-stable solid food components.

Additionally, common practices in the art utilize blast freezing to freeze liquid components. Prior to its freezing, a liquid component may be introduced into a cooking apparatus at temperatures above its freezing point so that it may be conveniently poured into the apparatus. However, solid food components which may have already been individually quick frozen (IQF) and disposed within the apparatus may be partially thawed due to their exposure to the warmer liquid component. Such freezing and thawing may cause degradation of the cell structures of certain solid components resulting in negative taste and/or textural characteristics. Further such blast freezing steps may be both time and energy intensive. The use of dehydrated or partially dehydrated liquid components would eliminate the need for blast freezing steps in the production of components used in the cooking apparatus. The removal of moisture from the liquid component would also result in a lighter overall product thereby lowering production and shipping costs.

Figure 38:
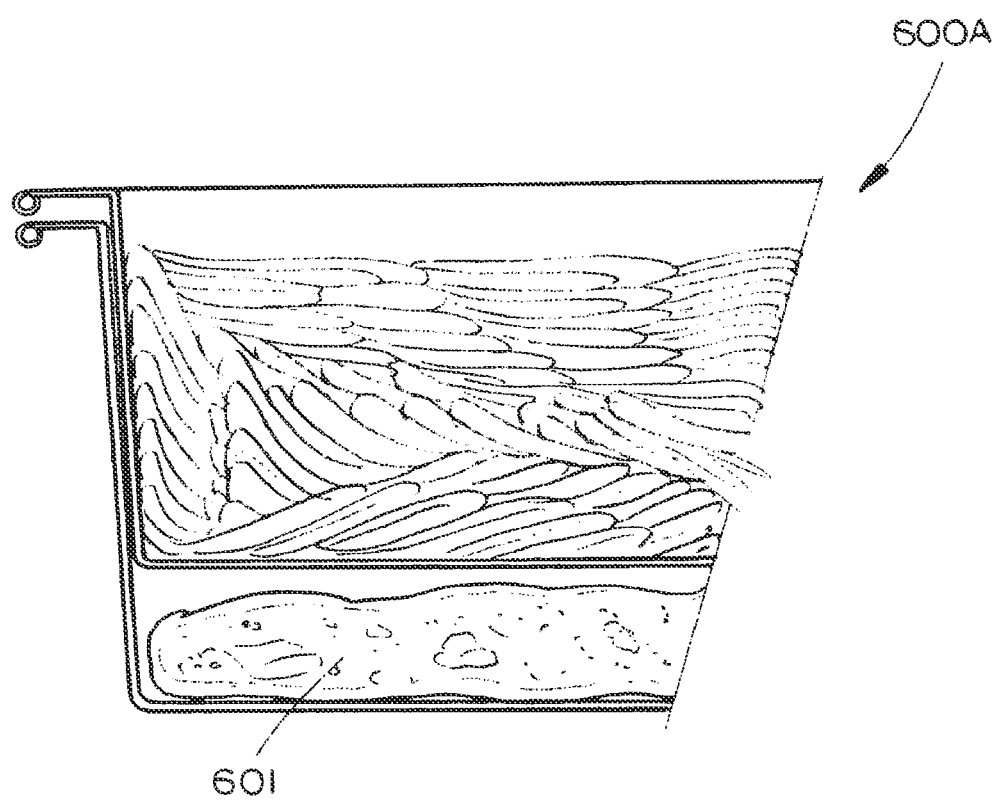
FIG. 38 is an illustration of a basket-tray removably received within a base container where a liquid component contained within the base container may be in a dehydrated, granulated or powdered formulation.
Figure 39:
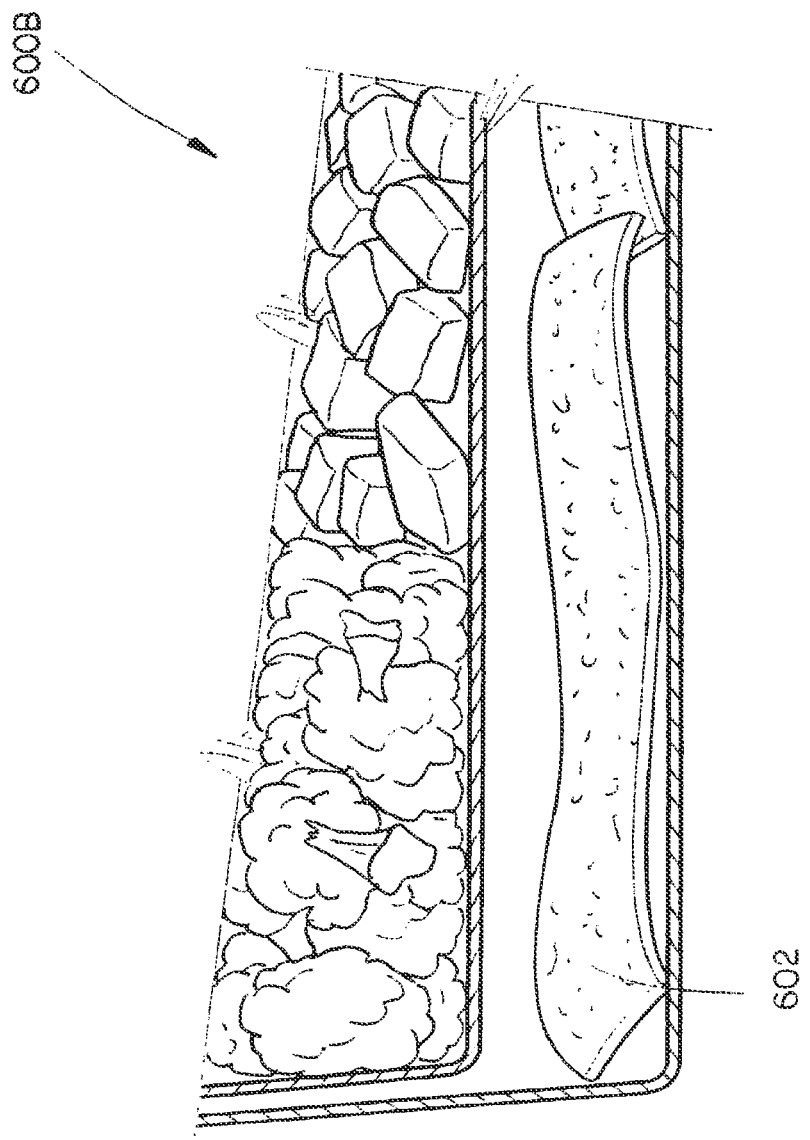
FIG. 39 is an illustration of a basket-tray removably received within a base container where a liquid component contained within the base container may be in a dehydrated, matrixed formulation.
Figure 40:
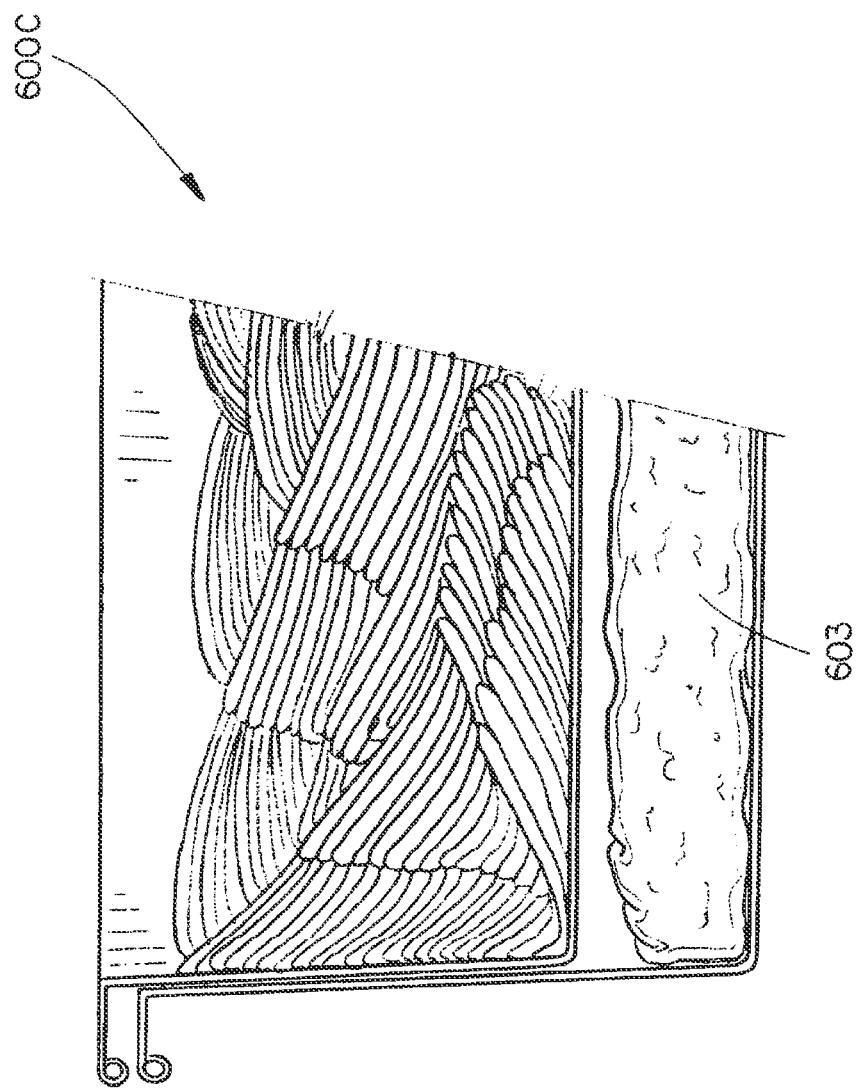
FIG. 40 is an illustration of a basket-tray removably received within a base container where a liquid component contained within the base container may be in a partially dehydrated, gel or concentrate formulation.

Referring to FIG. 38, a liquid component 601 may be formulated as a dehydrated powder or granular composition. Referring to FIG. 39, a liquid component may be formulated as a dehydrated matrix 602 where a binding agent may be incorporated to maintain the component in a singular complex which may be formed as strips, pieces or leathers. Such binding agents may include gums, starches or other binders known by those knowledgeable in the art. Referring to FIG. 40, a liquid component may be formulated as a partially hydrated composition 603, such as a gel, concentrate or paste. Such a formulation may be desirable where rehydration of a fully dehydrated liquid component may be impractical due to timing considerations.

Should a dehydrated liquid component be incorporated into a cooking apparatus 600, a mechanism for rehydrating the component would necessarily be required. Various rehydration mechanisms are presented in FIGS. 41-46.

Figure 41:
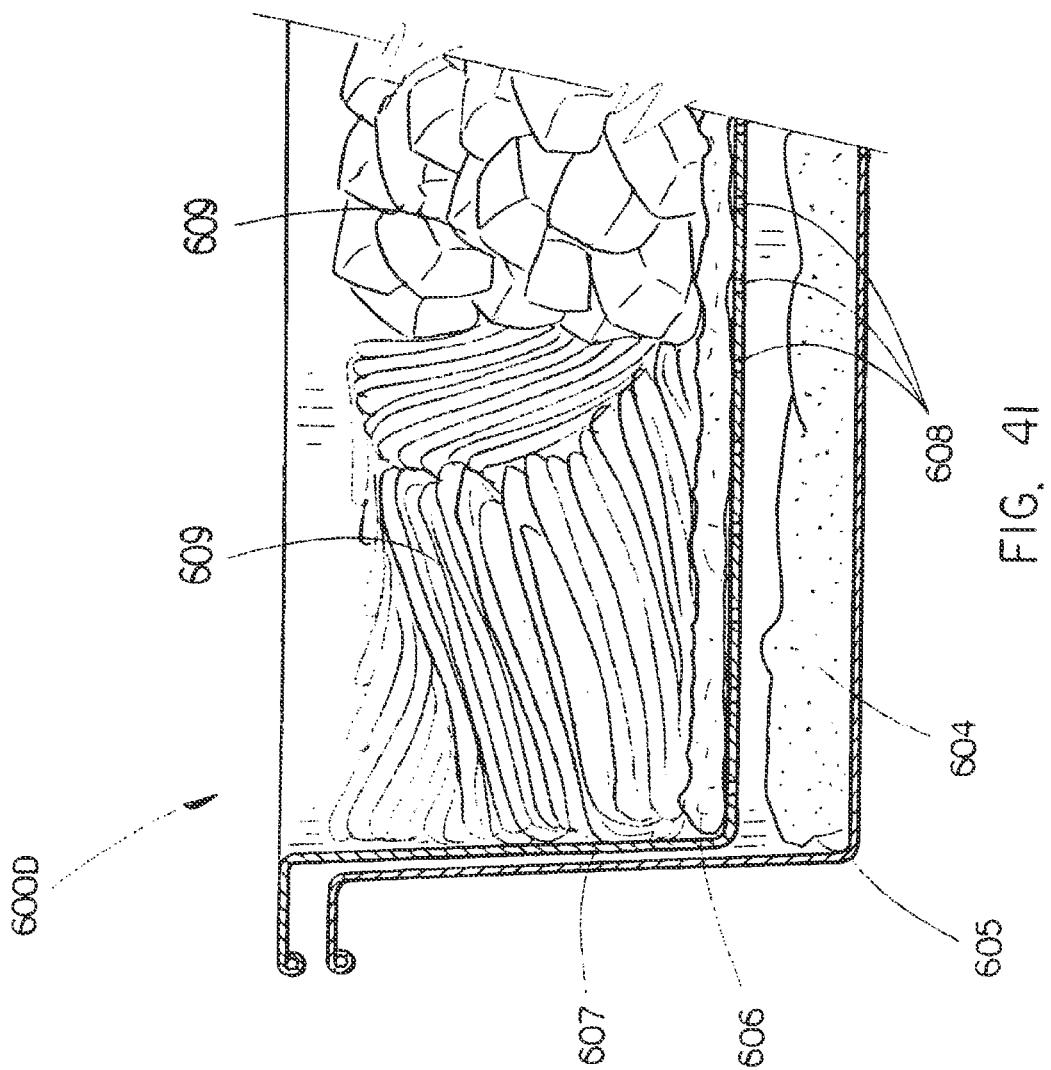
FIG. 41 is an illustration of a basket-tray removably received within a base container where a liquid component contained within the base container may be in a dehydrated formulation and a rehydrating liquid may be included in a frozen form.

FIG. 41 presents a cooking apparatus having a dehydrated liquid component 604 disposed within a base container 605. A layer or block of frozen liquid 606 may be disposed along the floor of an upper basket-tray 607. Upon heating, the frozen liquid 606 will melt and flow through the basket-tray perforations 608 and contact the dehydrated liquid component 604, thereby allowing for the steam cooking of the solid food components 609 contained in the basket-tray 607 via a rehydrated liquid component 604.

Figure 42:
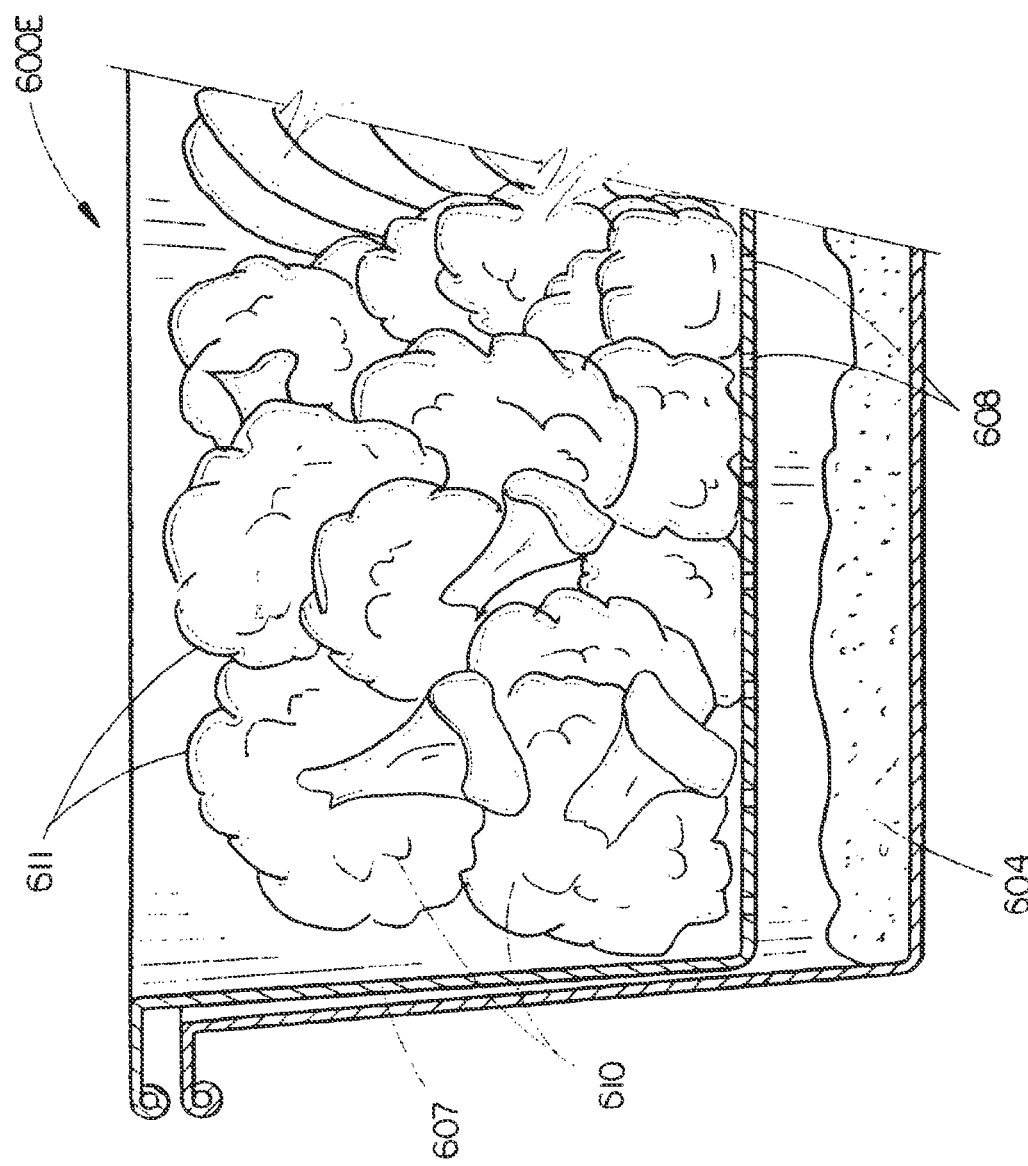
FIG. 42 is an illustration of a basket-tray removably received within a base container where a liquid component contained within the base container may be in a dehydrated formulation and a rehydrating liquid may be included in a frozen form as solid food component glaze.

Similarly, FIG. 42 presents a plurality of solid food components 610 on which a frozen liquid glaze 611 may have been disposed. Upon heating, the frozen liquid glaze 610 will melt and flow through the basket-tray perforations 608 and contact the dehydrated liquid component 604, thereby allowing for the steam cooking of the solid food components 610 contained in the basket-tray 607 via the rehydrated liquid component 604.

Figure 43:
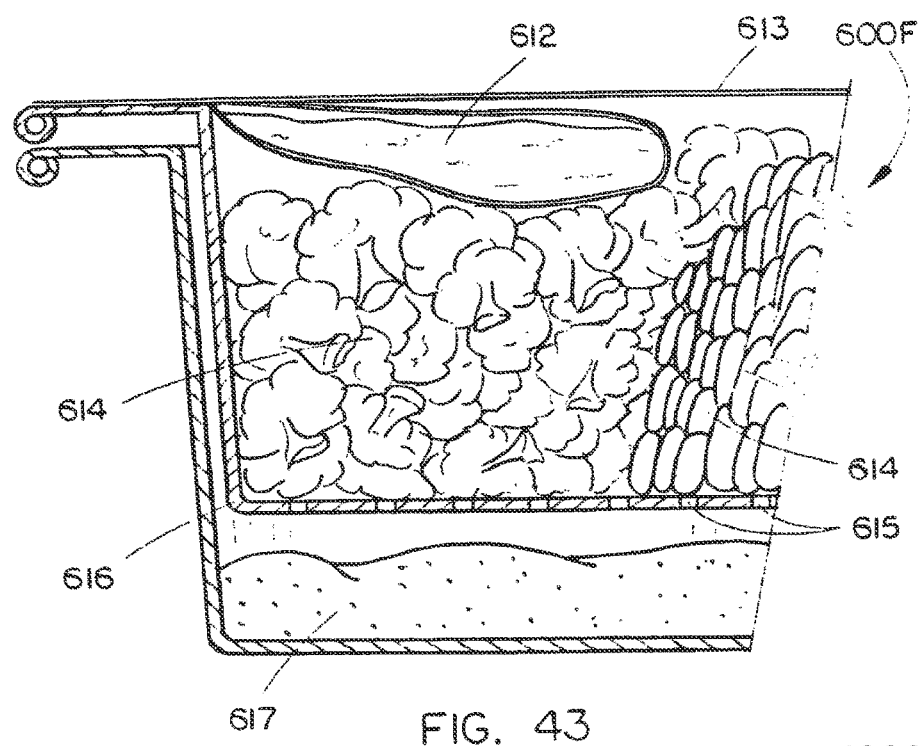
FIG. 43 is an illustration of a basket-tray removably received within a base container where a liquid component contained within the base container may be in a dehydrated formulation and a rehydrating liquid may be included in a pouch construction.

FIG. 43 presents a frangible or dissolvable liquid-containing pouch 612 which may be either adhered to a lid structure 613 which encloses the apparatus 600F or simply disposed atop a plurality of solid food components 614. Such a configuration allows a heated liquid to flow over the solid food components 614, thereby permitting rapid initiation of the steaming process. The liquid may then flow through the apertures 615 in the basket-tray 616 to contact the dehydrated liquid component 617 disposed within the base container 618 thereby rehydrating the liquid component 617.

Figure 44:
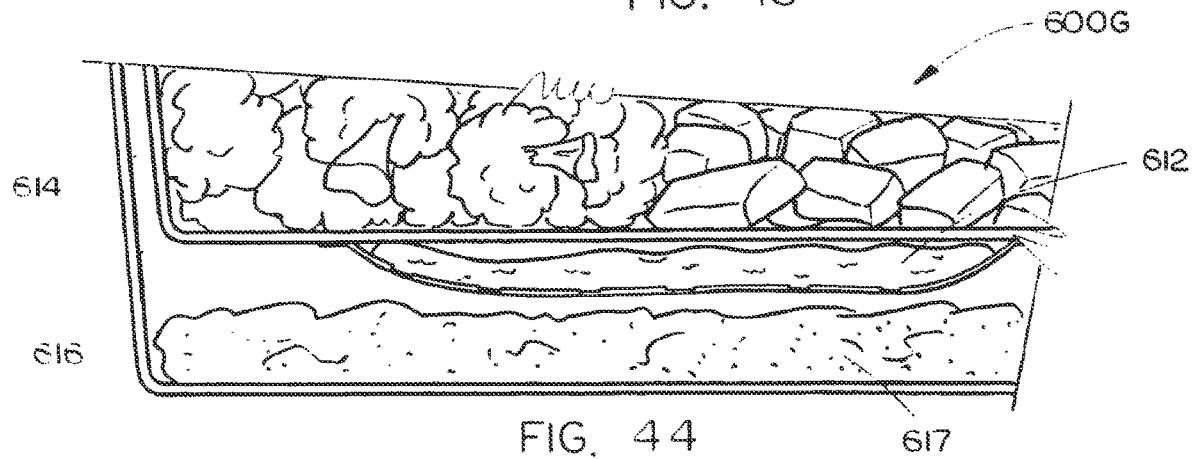
FIG. 44 is an illustration of a basket-tray removably received within a base container where a liquid component contained within the base container may be in a dehydrated formulation and a rehydrating liquid may be included in a pouch construction.

Similarly, FIG. 44 presents a similar configuration where the frangible or dissolvable liquid-containing pouch 612 may be disposed substantially adjacent to the underside of the basket-tray 616. Such a configuration ensures that a desired amount of liquid 612 may be contacted with the dehydrated liquid component 617 and may be not entrained within the solid food components 614.

It may also be desirable for the consumer or end-user to add the liquid required to rehydrate a dehydrated liquid component. Such a configuration may have several inherent benefits over frozen liquid components. For example, the cost of adding the liquid may be saved. Further, because less liquid may be contained in the food product, the overall weight of the food product may be reduced decreasing the cost of shipping the food product. Also, if the solid food components may be frozen, utilization of a dehydrated liquid component will decrease cooking time as the liquid component will not need to be thawed. Additionally, pre-heated liquids may be used as the rehydration medium so as to further reduce the cook time. Further, if the product may be to be frozen, the sauce will not have to be selected from sauces with lower freezing points so as to prevent the sauce from thawing prematurely and creeping into unintended areas.

Furthermore, partially dehydrated and fully dehydrated liquid components may not require pre-cooking as may be the case with hydrated liquid components. Therefore, the rehydrated liquid component will be fresher and taste better when it may be cooked for the first time by the consumer.

Also, the consumer or end-user may be permitted to vary the rehydrating liquid so as to customize the resulting liquid component to their particular tastes. The liquid may be any edible liquid, such as dairy based liquids (i.e. milk or cream), alcoholic beverages (i.e. beer or wine), meat stocks or broths, oils, sodas, waters, juices, and the like.

Figure 45A:
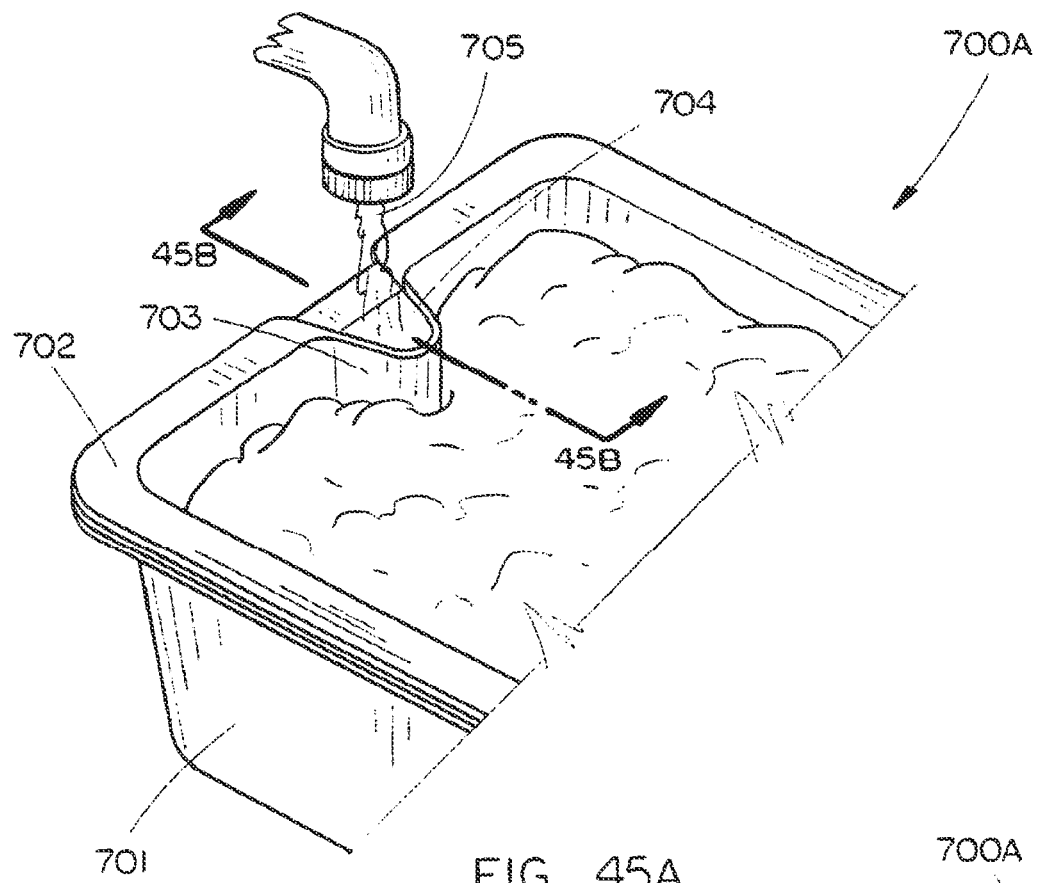
FIG. 45A is an illustration of a basket-tray removably received within a base container where a liquid component contained within the base container may be in a dehydrated formulation and a rehydrating liquid may be introduces from an external source.
Figure 45B:
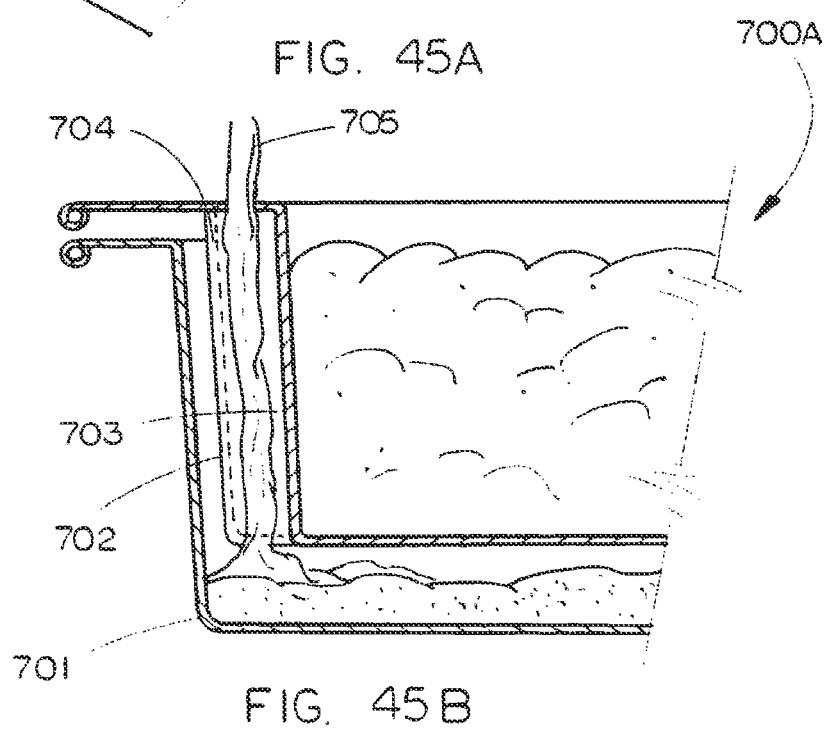
FIG. 45B is an illustration of a cross-section of a basket-tray removably received within a base container where a liquid component contained within the base container may be in a dehydrated formulation and a rehydrating liquid may be introduced from an external source.

Referring to FIGS. 45A and 45B a cooking apparatus 700A may comprise a base container 701 and a basket-tray 702. The perimeter wall of the basket-tray 702 may comprise an indention 703 along one side. The indention 703, together with the base container 701, may provide a conduit 704 whereby a rehydrating liquid 705 may be transmitted into the interior of the base container 701. Such a configuration provides for direct routing of the rehydrating liquid 705 to the dehydrated liquid component where the flowable characteristics of the rehydrating liquid 705 may serve to create a zone of turbulence thereby enhancing the rehydration process.

Figure 46A:
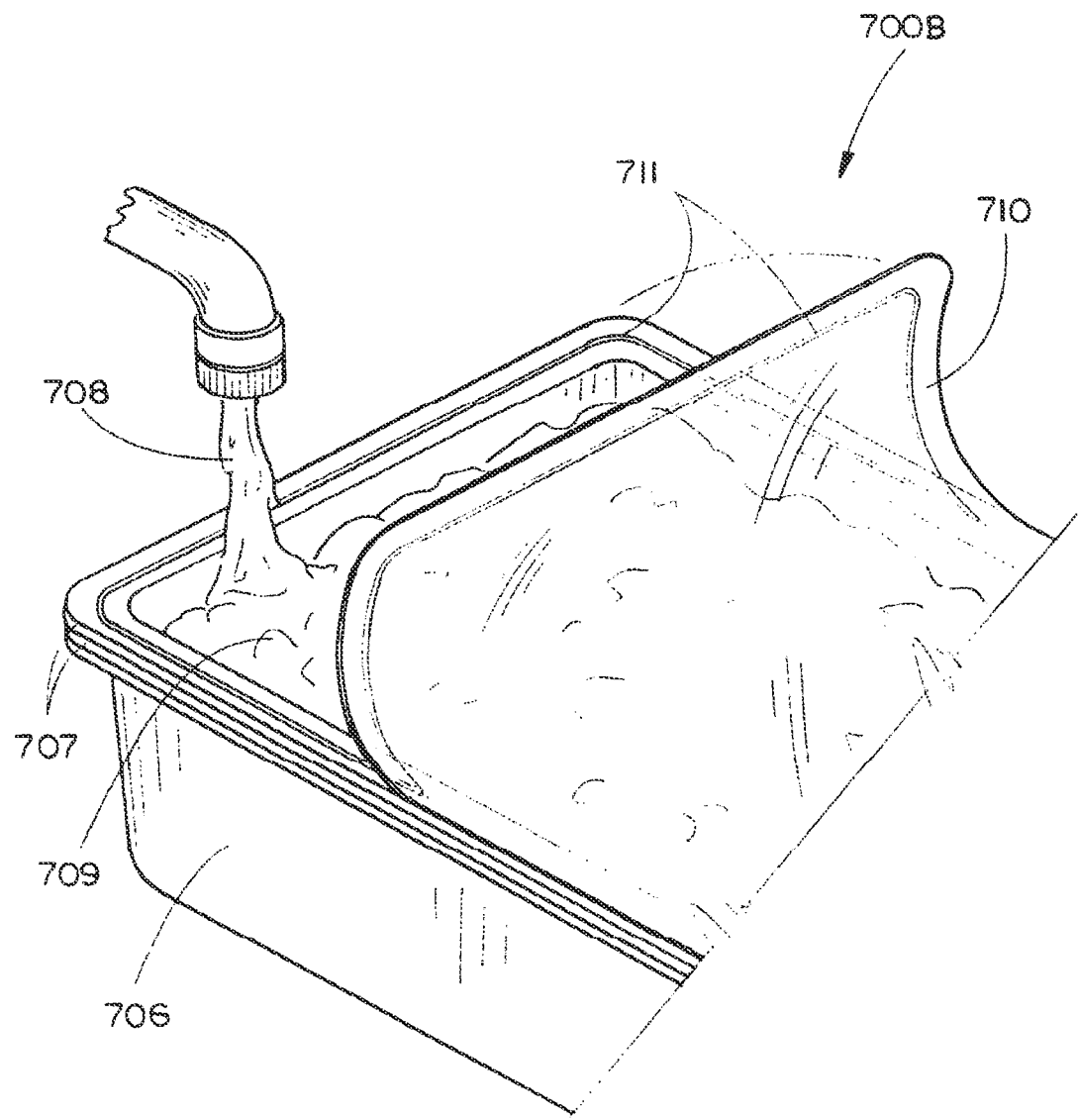
FIG. 46A is an illustration of a basket-tray removably received within a base container where the tray and container may be enclosed by a lid structure.

Referring to FIG. 46A, a cooking apparatus 700B may comprise a base container 706 and a plurality of basket-trays 707 which may be removably received within the base container 706. The base tray 706 may contain a dehydrated liquid component (not shown). In order to rehydrate the dehydrated liquid component, a rehydrating liquid 708 may be poured into the basket-trays 707. The liquid 708 may interact with the solid food components 709 as it flows downward through basket-trays 707 and into the base container 706 where it may rehydrate the dehydrated liquid component. This interaction between the liquid 708 and the solid food components 709 may serve to initiate thawing or pre-cooking of the solid food components depending on the temperature of the liquid 708. Such thawing or pre-cooking may serve to further shorten the cook time for the solid food components 709.

A cooking apparatus 700B, may comprise a resealable lid structure 710 having cooperating resealing means 711. Such resealing means 711 may comprise a complementary tooth and grove system, a zipper seal, resealable adhesives, snap-on connections, and the like. Such configurations may be beneficial when a complete seal about the entirety of the apparatus 700B may be desired.

Figure 46B:
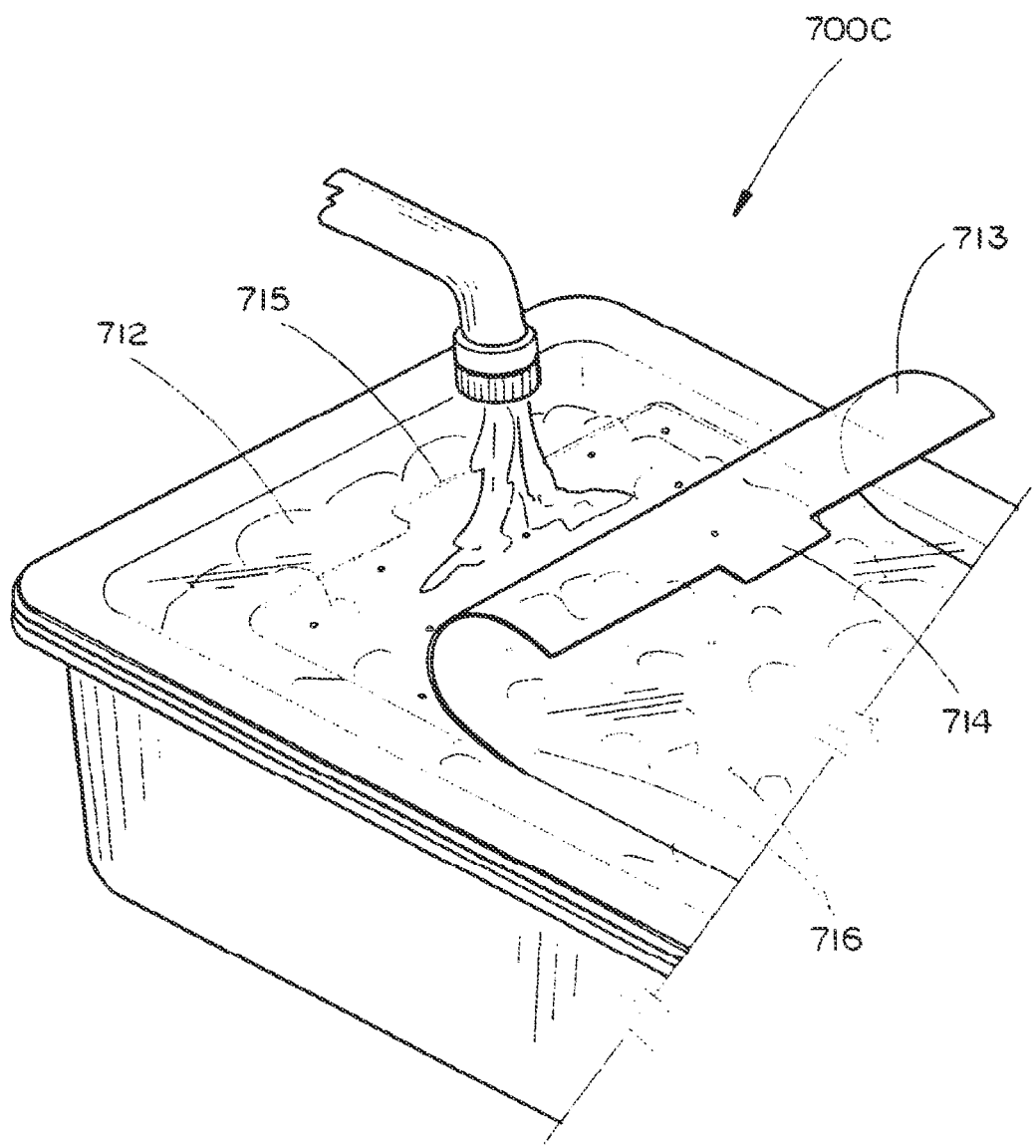
FIG. 46B is an illustration of a basket-tray removably received within a base container where the tray and container may be enclosed by a lid structure.
Figure 46C:
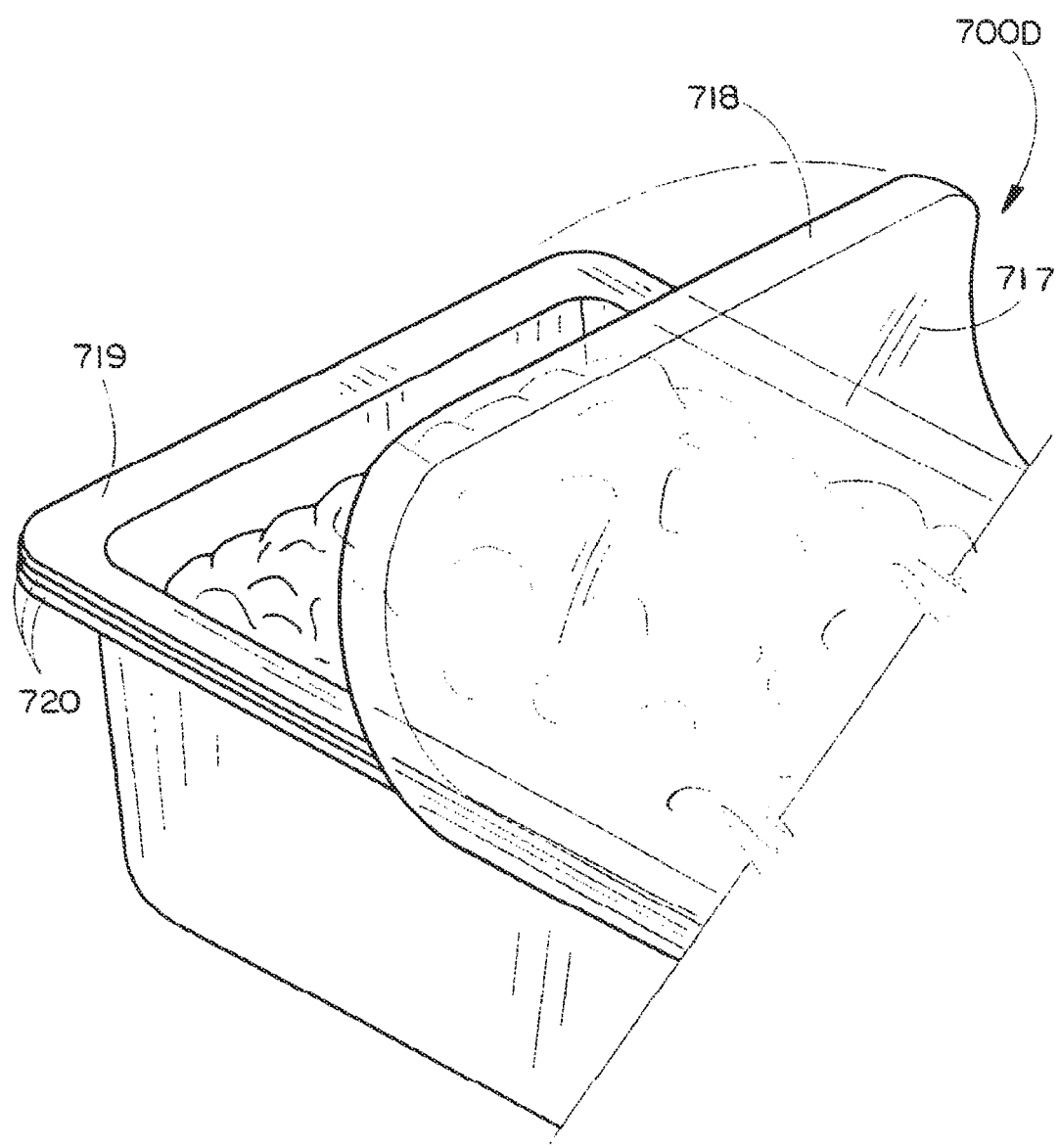
FIG. 46C is an illustration of a basket-tray removably received within a base container where the tray and container may be enclosed by a lid structure.

Similarly, as presented in FIG. 46B, the cooking apparatus 700C may comprise a sealed cover 712 having a releasable portion 713 which may be resealed by an interlocking tab 714 and slot 715. Such a configuration may be used when complete resealing may be not required. Additionally, the sealed cover 712 (and releasable portion thereof 713) may further comprise venting apertures 716. Such apertures 716 may allow for the release of a portion of the built up pressure within the apparatus 700C during cooking so as to avoid displacing the cover 712. Further, as presented in FIG. 46C, a resealable lid structure 717 may comprise a lip portion 718 which may cooperatively engage the flanged portions 719 of the base container and basket-trays 720.

It may be desirable to provide a cooking apparatus 800 which may allow for the pressure generated by the heating of the food components (particularly the liquid component) to be either vented or maintained so as to optimize the cooking characteristics of the food components.

Figure 47:
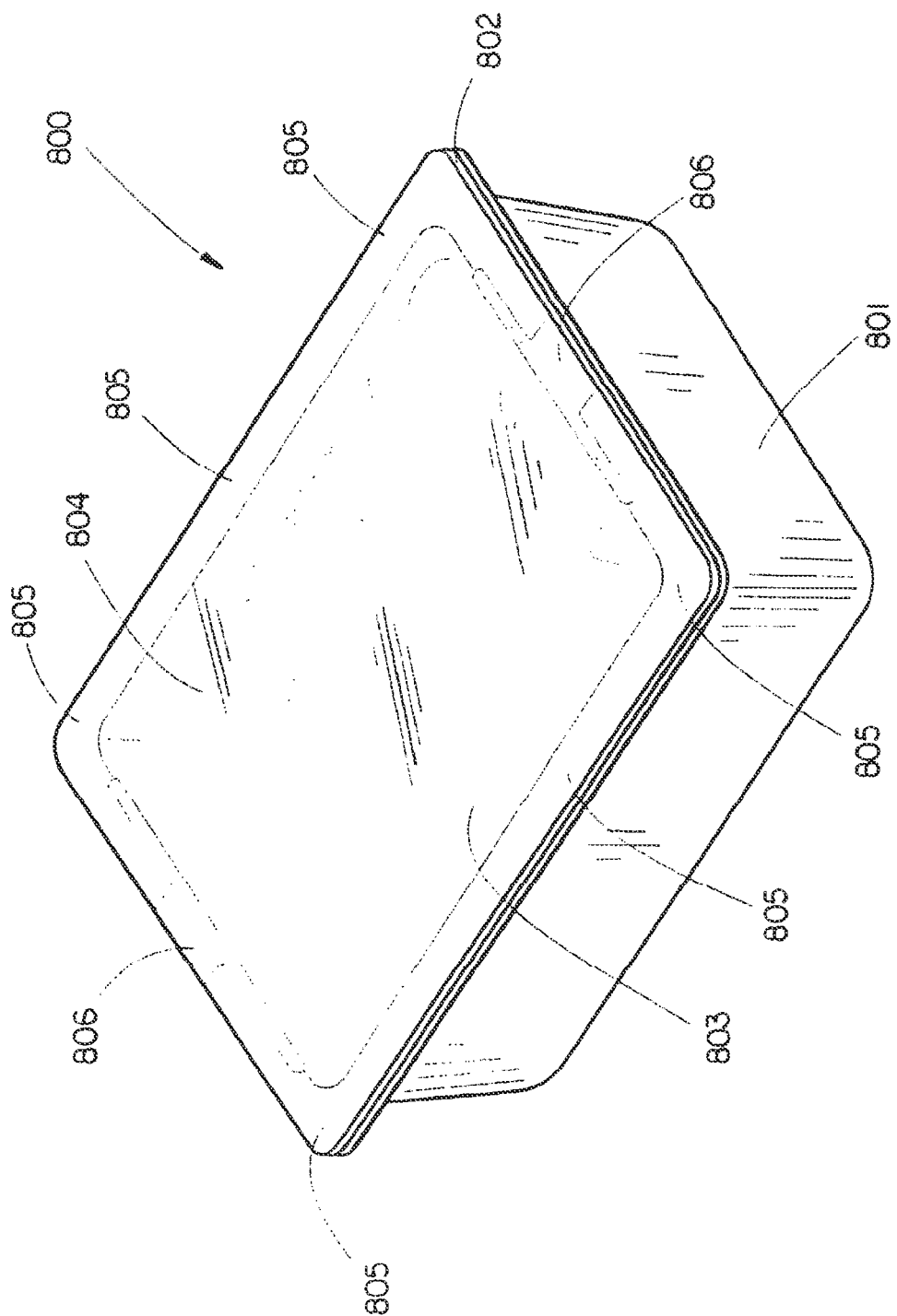
FIG. 47 is an illustration of a basket-tray removably received within a base container where the tray and container may be enclosed by a lid structure having a venting mechanism.

Referring to FIG. 47, a cooking apparatus 800 having a pressure release mechanism is presented. A cooking apparatus 800 may comprise a base container 801 and a basket-tray 802. A lid structure 803 may be disposed about the top of the apparatus 800 so as to enclose the food components 804 contained within. The lid structure 803 may be sealed about the flanged portions 805 of the base container 801 and the basket-tray 802 via mechanical or adhesive means. Additionally, substantially unsealed portions 806 may be disposed about the perimeter of the lid structure 803. The substantially unsealed portions 806 may provide a conduit for some or all of the expanding vapor generated by the heating of the food components 804 to be released into the atmosphere. The size and shape of the substantially unsealed portions 806 may be configured so as to regulate the amount of pressure which may be released so that overpressures may be maintained without risk of rupture.

The substantially unsealed portion 806 may comprise sufficient sealing strength so as to maintain a complete seal for a period of time, thereby enabling pressure cooking of the food components 804, but which will vent at a given time, temperature or internal pressure so as to provide for further vented cooking.

The apparatus 800 may comprise one-way or two-way valves or vents (not shown) as the pressure release mechanism. Such mechanisms may allow for more precise maintenance of the pressure levels within the apparatus. Other self-venting or controlled venting mechanisms which may be commonly known in the art may also be incorporated in the cooking apparatus 800.

A sealable cooking apparatus 800 may be vacuum sealed or flushed with non-oxidative gasses, such as nitrogen, so as to prevent the oxidation and/or degradation of the food components, thereby extending the shelf-life of the food components 804.

Figure 48:
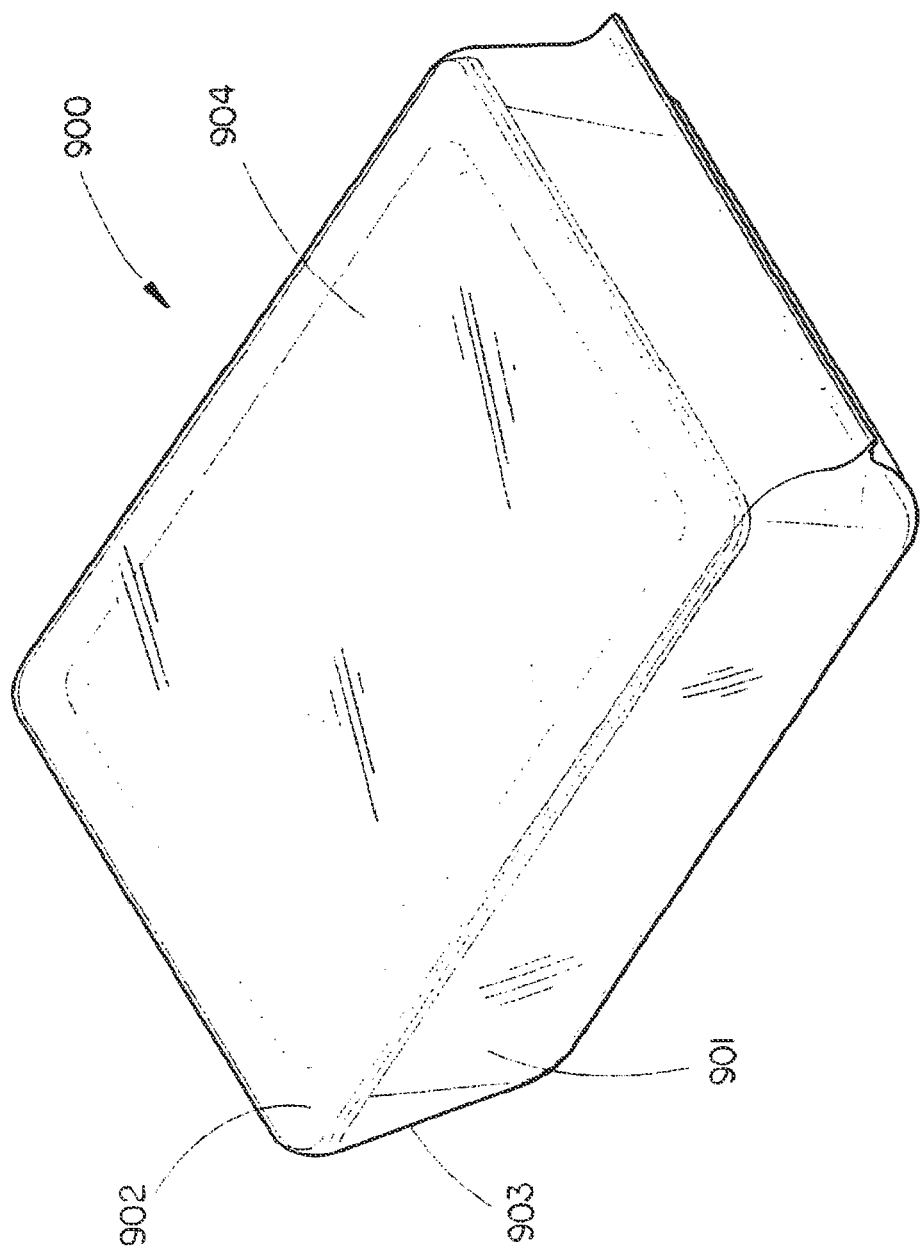
FIG. 48 is an illustration of a basket-tray removably received within a base container where the tray and container may be disposed within a non-venting film overwrap.

Furthermore, any of the cooking apparatuses described herein may be disposed within a film overwrap, such as those disclosed in U.S. patent application Ser. No. 11/636, 260, herein incorporated by reference. Referring to FIG. 48, a cooking apparatus 900 may comprise a base container 901 and one or more basket-trays 902 disposed within a non-venting film overwrap 903. The film overwrap 903 may comprise a nylon blend, polymers, heat sealable papers, cellophane, foils and the like, having selected physical properties such that it may maintain a closed cooking environment in both microwave and radiant-heat cooking environments. In order to be non-venting, the film overwrap 903 may be capable of maintaining an internal cooking environment that remains separated from the ambient environment during the cooking process.

The non-venting film overwrap 903 may have one or more of the following properties:
Heat deflection temperature (66 psi): at least 400° F.
Heat deflection temperature (264 psi): at least 160° F.
Melting point: at least 420° F.
Elongation fail percentage: 150-170%
Such film overwraps may include those produced by the KNF Corporation.

Such properties may enable the film overwrap 903 to expand to a certain degree under heating while maintaining its structural integrity and avoiding rupture. This allows the cooking apparatus 900 to maintain the sealed, non-venting environment in which the temperature and pressure can be increased during the cooking process. Such capabilities may provide for the pressure cooking of the food items 904. Because water's boiling point increases as the surrounding air pressure increases, the pressure built up inside the food packaging allows the liquid in the packaging to rise to a temperature higher than 212° F. before boiling, thereby providing elevated cooking temperatures resulting in reduced cook times.

The film overwrap 903 may be a heat-releasable or pressure-releasable film overwrap where the interior of the overwrap remains sealed until heating begins. The film overwrap may be constructed of plastics, polymers, heat sealable papers, cellophane, foils and the like.

Similarly, one or more individual food components disposed within various basket trays or tray compartments may also be enclosed within separate venting or non-venting cooking bags so as to produce specified cook characteristics such as pressure cooking, steam cooking, and the like. The material of the cooking bags may comprise nylon; Polyethylene Terepthalate (PET); PP; EVOH; polyurethane; formed, opened, or closed cellulose structures; combinations, blends or laminations thereof, and the like.

Figure 49:
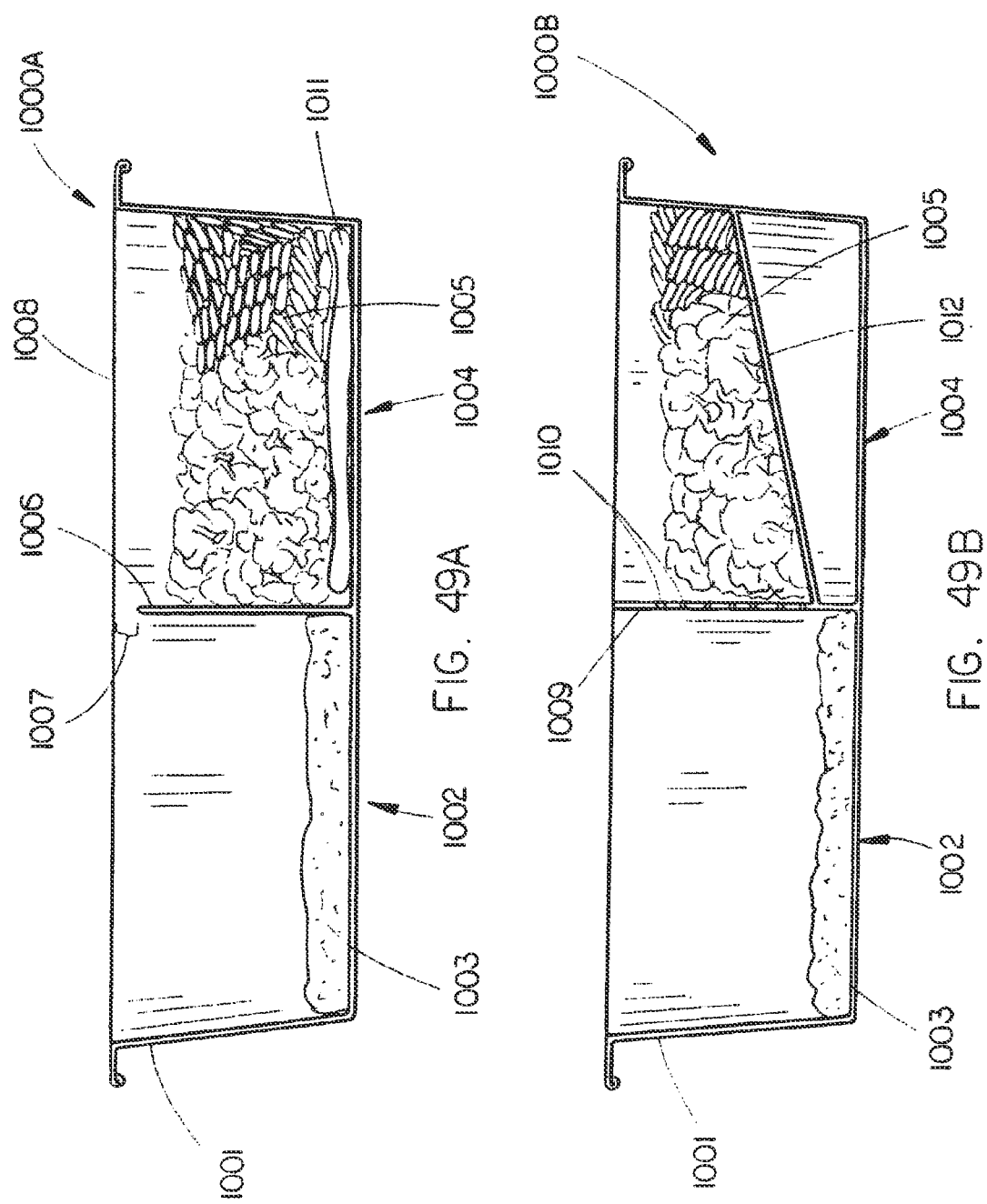
FIG. 49A is an illustration of a cooking apparatus having a partition maintained in spatial separation from the lid structure.
FIG. 49B is an illustration of a cooking apparatus having a screen with a plurality of perforations disposed between a first compartment and a second compartment.

Referring to FIGS. 49A and 49B, a cooking apparatus 1000 may include at least first 1002 and second 1004 substantially coplanar compartments wherein food components and a liquid component may be maintained in spatial separation so as to avoid their commingling during storage or cooking. The cooking apparatus 1000 may comprise a base container 1001 having at least a first compartment 1002 containing a liquid food component 1003 and a second compartment 1004 containing at least one solid food component 1005.

Referring to FIG. 49A, the cooking apparatus 1000A may further comprise a partition maintained in spatial separation 1007 from a lid structure 1008. The spatial separation 1007 may provide a pathway for the transfer of the vapor-phase portion of the liquid component 1003 into the second compartment 1004 to facilitate the steam cooking and flavoring of the solid food components 1005, as has been previously discussed. Additionally, a removable or collapsible partition portion, such as a tear away strip or hinged projection (not shown) may be incorporated so as to completely separate the first compartment 1002 and the second compartment 1003 during shipping and storage so as to prevent the commingling of the liquid component 1003 and the solid components 1005 until the cooking apparatus 1000A may be ready for use.

Additionally, the apparatus 1000A may comprise a condensation absorption mechanism. Particularly, the second compartment may comprise a liquid absorbing insert 1011 constructed of or coated with a moisture absorbing coating, such as polypropylene, cellulose, silica or foam based materials so as to prevent the solid food components 1005 from sitting in any condensate generated during cooking. Alternately, the portion of the base container 1001 comprising the second compartment 1004 may, itself, be constructed of like moisture absorbing materials.

Referring to FIG. 49B, a cooking apparatus 1000B may comprise a screen 1009 having a plurality of perforations 1010 which may be disposed between the first compartment 1002 and the second compartment 1004 thereby permitting the transfer of steam or other vapor-phase components between the respective compartments.

Additionally, the cooking apparatus 1000B may comprise a second compartment 1004 having an inclined floor 1014 so as to direct any condensed liquid back through the screen 1009 and into the liquid component 1003. The inclined floor 1014 may include channels (not shown) directed down the slope of the incline or a plurality of raised knobs (not shown) thereon to elevate the solid food components 1005 above the flow paths for any condensed liquid so as to facilitate the transfer of the condensed liquid from the second compartment 1004 back to the first compartment 1002. Such a configuration ensures that any nutrients which may leach out of the solid food components 1005 during cooking may be retained within the liquid food component 1003 so that the consumption of the solid food components 1005 and the liquid component 1003 ensures that all nutrients present in the original components may be preserved.

Additionally, there may be currently a limited number of materials that may be viable for dual ovenable cooking (i.e. suitable for use in both conventional ovens and microwave ovens). Such materials include crystalline polyethylene terephthalate (CPET), amorphous polyethylene terephthalate (APET)/CPET composites, and nylon/CPET composites. These materials may be acceptable for dual ovenability due to their high melting point and glass transition points.

However, certain limitations exist with respect to these materials. Typically, these materials must to be thermoformed and may be not capable of being formed through injection molding. This limits the size and variety of shapes available. Additionally, perforations cannot be created in these materials in a tray format without adding a secondary cutting operation, which adds potential quality and food safety may be used (e.g. hangers, slivers, missed punches, etc). Containers constructed from these materials may also have highly crystalline structures making them fragile and prone to breakage upon forceful contact. It may also difficult to create and maintain hermetic seals to these materials.

Conversely, in dual-ovenable constructions, other traditional packaging materials, such as polypropylene (PP), high-density polyethylene (HDPE), and low-density (LDPE), may be not capable of withstanding the high temperatures of ovens due to their lower melting and glass transition points. For example, PP melts at roughly 350° F. However, these traditional materials may be capable of accounting for the shortcomings of CPET, APET/CPET, and nylon with respect to their thermoforming, perforation, and durability may be used.

Currently, foods packaged in a trays may be generally single-tray configurations (for all frozen, refrigerated, and shelf stable products) which requires that the single-tray must be able to withstand the full temperature of the oven. A solution to solving this may be to utilize food components disposed within progressively removably received trays thereby providing thermal insulation for the internal trays.

Figure 50:
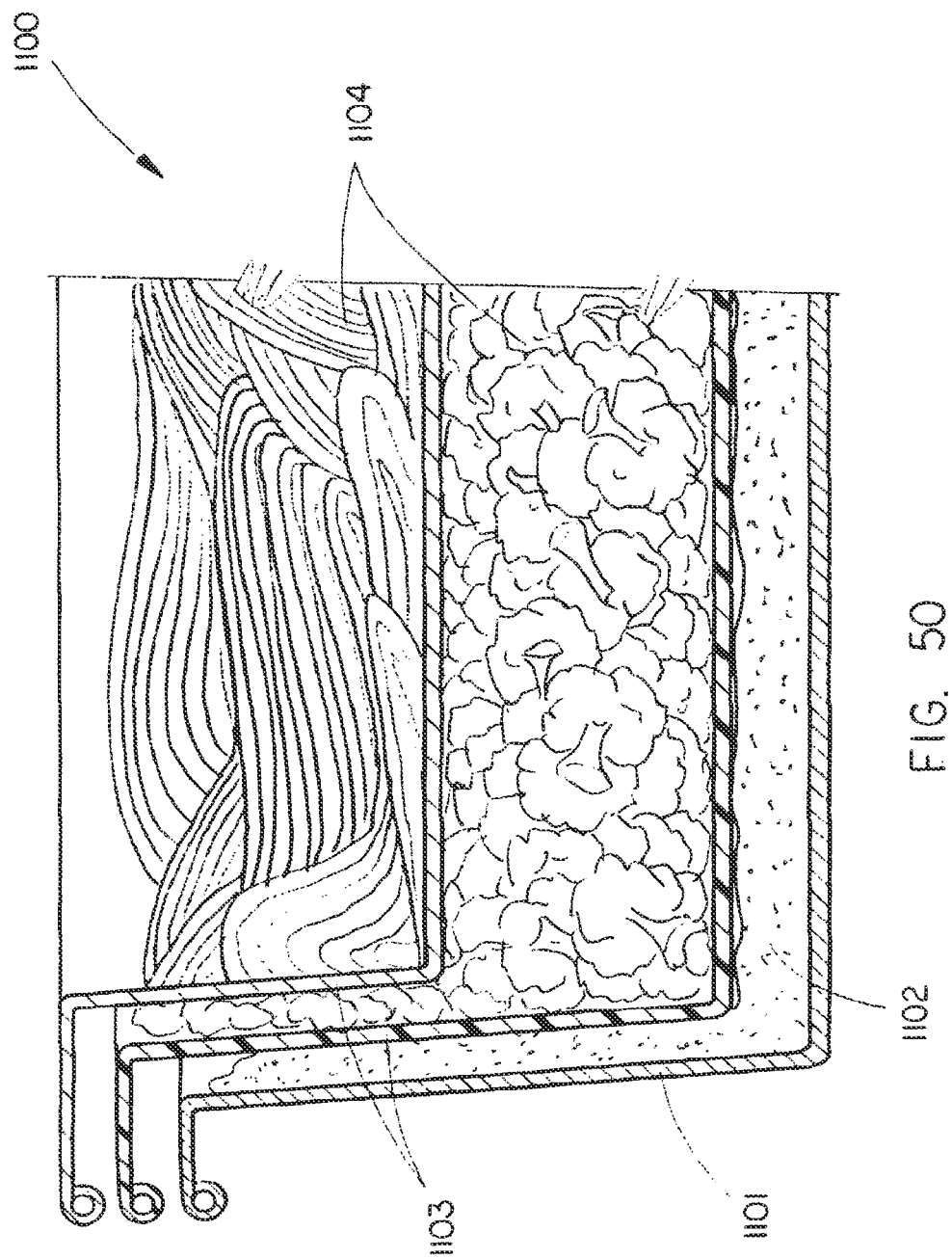
FIG. 50 is an illustration of a cooking apparatus having a plurality of removably received trays, wherein the interior trays may be insulated from full exposure to cooking temperatures by a layer of a food component.

Referring to FIG. 50, an outer base container 1101 may be manufactured from current dual ovenable materials (e.g. CPET, nylon, CPET/APET, etc). The base container 1101 may contain a food component 1102 which may be either a liquid component or a solid component. At least one inner basket-tray 1103 may be disposed within the base container 1101 and contain additional food components 1104. The full free spaces defined by the base container 1101 and basket-trays 1103 would be filled with food components 1102, 1104 including the vertically directed portions defined by the side walls of the base container 1101 and basket-trays 1103. As such, the food components 1102, 1104 may act as insulating layers around the entirety of each basket-tray 1103.

Typical finished cook temperatures of most food products may be approximately 165-185° F., with a fail-safe at 212° F. when the water in a water-containing component 1102, 1104 would begin to boil, thereby maintaining that temperature until the water was fully evaporated.

In such a configuration, the basket-trays 1103 could be manufactured from materials which can withstand temperatures of approximately 212° F. As such, numerous other material including PP (melting point at 348.5 deg F.), polyethylene (melting point of 278 deg F.), Poly(1-butene) (melting point of 270 deg F.), and others may be utilized in dual-ovenable constructions. Use of these materials would allow the basket-trays 1103 to be injection molded, allowing for a greater variety of shapes and features (including perforations or holes that may be made in-mold), greater shock resistance, and a much lower cost for the inner tray than if previously made from standard dual ovenable materials.

The presently disclosed cooking apparatus may have numerous advantages over the prior art by separating the different types of food components. This separation leads to significant improvements in food quality, including improvements in texture, hold life, color, and flavor.

First, the separate cooking produces a food product that may be plateable. Plateability allows the consumer to choose between different food items and/or sauces that may be cooked simultaneously. Therefore, an individual may plate, assemble, and customize their meal according to his or her preferences and tastes. Moreover, plateability allows food to be placed on a plate or tray in different visually appealing configurations. Further, if an individual may be allowed to plate his or her own meal, the cooking apparatus allows each individual to sort out unhealthy items if desired.

Second, the cooking apparatus provides several thermodynamic advantages in cooking by separating the different types of food components to create a more appetizing and higher quality food product. Separating the food components increases the surface area of the food components by total volume. The increased surface area increases the surface area to which heat may be transferred resulting in greater efficiency in cooking. Further, the thickness of the food components may be decreased, allowing for shorter cooking times and more even cooking.

Moreover, the density of the food components may be decreased allowing the heating apparatus (e.g., microwave oven, convection oven, and the like) greater access to the center of the food component for better and faster cooking times. Additionally, the food components may be not as densely packed, allowing the food component to be more effectively heated with better heat transfer also helping to shorten cooking times. Typically, the less cooking time utilized, the less heat degradation of the food product.

Furthermore, the cooking apparatus may be compartmentalized to allow food components that require that require varying amounts of thermal energy for cooking to be properly heated so as to prevent undercooking and/or overcooking of a food component. Individual compartments may comprise varying degrees of insulation so as to provide appropriate levels thermal energy transfer to a given food component.

Third, the cooking apparatus provides several storage advantages by separating the different types of food components to produce a more appetizing and higher quality food product. The separation of food components may help to prevent degradation and discoloration during storage from the interaction of differing types of food components. Further, separation of food components in multiple compartments may help to prevent freezer burn when the cooking apparatus may be stored in a freezer.

Fourth, the cooking apparatus provides several processing advantages by separating the different types of food components to produce a more appetizing and higher quality food product. The separate trays or compartments allow different types of food components to be manufactured, frozen, and/or processed, separately. Differing types of food components may require different processing, manufacturing, and freezing conditions and the conditions required for one food component may have negative effects on the quality of another food component by effecting texture, color, and the flavor of the food component. Therefore, by separating the differing types of food components, each type of foodstuff may get the exact amount of freezing, processing, and manufacturing required producing a better tasting and higher quality food product.

Fifth, the separation of the different types of food components also provides decreased freeze times for products that may be freezer stored. The reduced density and increased surface area of the food components provided by the separation of the different types of food components makes the food components freeze faster. The decrease in freeze time reduces overall processing requirements and increases the efficiency of producing the product. An increase of efficiency reduces the cost of making the freezer stored product.

It may be believed that the above description may be further understood by the following examples, which may be not limiting in any way.

Example 1: Chicken Primavera

Two samples of Chicken Primavera were prepared under the same conditions to look for improvement in food quality and cook times. The first sample was prepared according to current methods using an aluminum tray and a frozen block of the Chicken Primavera with all ingredients mixed together. The second sample was prepared using a foodservice compatible ovenable cooking apparatus 220, which included an aluminum basket 222 with openings 238 removably received within an aluminum container 224. The container 224 included a medium depth tray pan and contained sauce. The basket 222 was a shallow tray pan with between 20 and 40 oval shaped openings 238 approximately 1" long. The basket 222 was removably received within the container 224 and contained vegetables and proteins. The size of the basket 222, container 224, and the amount of sauce allowed for an air gap between the base 240 of the basket 222 and the sauce.

Significant improvements were observed in comparisons between the conventional method and the ovenable cooking apparatus 220. The sample prepared using the ovenable cooking apparatus 220 resulted in huge improvements in product quality, including improved sauce color and improved vegetable texture, color, and flavor.

Example 2: Beef Stew

Two samples of Beef Stew were prepared under the same conditions to look for improvement in food quality and hold life. The first sample was prepared according to current methods using an aluminum tray and a frozen block of the Beef Stew with all ingredients mixed together. The second sample was prepared using a foodservice compatible ovenable cooking apparatus 220, which included an aluminum basket 222 with openings 238 removably received within an aluminum container 224. The container 224 included a medium depth tray pan and contained sauce. The basket 222 was a shallow tray pan with between 20 and 40 oval shaped openings 238 approximately 1" long. The basket 222 was removably received within the container 224 and contained vegetables and proteins. The size of the basket 222, container 224, and the amount of sauce allowed for an air gap between the base 240 of the basket 222 and the sauce. The products were sampled after preparation, 30 minutes later, 60 minutes later, and 90 minutes later to compare their quality under conditions where they may be kept warm for serving after being cooked (their hold life).

Significant improvements were observed in comparisons between the conventional method and the ovenable cooking apparatus 220. The sample prepared using the ovenable cooking apparatus 220 resulted in huge improvements in product quality, including improved sauce color and improved vegetable texture, color, and flavor. The potatoes and carrots prepared using the ovenable cooking apparatus 220 were significantly better than the potatoes and carrots prepared using conventional methods. The beef also showed superior quality over time compared to the beef that was prepared conventionally.

Example 3: Chicken Parmigiana

A first sample of chicken parmigiana was prepared according to the conventional method, which included a frozen block of all ingredients in a foodservice tray. A second sample of chicken parmigiana was prepared using the ovenable cooking apparatus. The sauce was placed in the container and the chicken parmigiana and pasta were placed in the basket and cooked. The basket did not include openings for steam to enter the basket.

There were significant improvements in the sample prepared using the ovenable cooking apparatus. The chicken from the first sample was soggy and did not meet consumer standards. The chicken from the ovenable cooking apparatus had the appropriate crispy texture. The pasta also had improved texture and flavor.

Example 4: Tandoori Chicken

Tandoori Chicken was prepared using the ovenable cooking apparatus 220, which included an aluminum basket 222 removably received within an aluminum container 224. The basket 222 did not include perforations. The basket 222 contained 30 ounces of minted couscous with garbanzo beans. The container 224 contained 25 ounces of curry sauce and 30 ounces of Tandoori chicken breast in 1" chunks.

Significant improvements were observed compared to Tandoori Chicken prepared using a single tray and a frozen block of all Tandoori Chicken ingredients mixed together. There were particular improvements to sauce color and vegetable texture, color, and flavor.

Example 5: Jerk Chicken

Jerk Chicken was prepared using the ovenable cooking apparatus 220, which included an aluminum basket 222 removably received within an aluminum container 224. The basket 222 did not include perforations. The basket 222 contained 30 ounces of protein and 30 ounces of white rice. The container 224 contained 40 ounces of black beans and sauce.

Significant improvements were observed compared to Jerk Chicken prepared using a single tray and a frozen block of all the Jerk Chicken ingredients mixed together. There were particular improvements to sauce color and vegetable texture, color, and flavor.

Example 6: Chicken Milanese

Chicken Milanese was prepared using the ovenable cooking apparatus 220, which included an aluminum basket 222 and an aluminum container 224. The basket 222 did not include perforations. The basket 222 contained 20 ounces of Chicken Milanese, which included 10 chicken breast tenders. The container 224 contained 20 ounces of broccoli rabe and 30 ounces of mushroom risotto. The container 224 was covered and steamed for 1 hour. The chicken Milanese in the basket was reheated in a 350 degree oven for 15 minutes.

Significant improvements were observed compared to chicken Milanese prepared using a single tray and a frozen block of all the chicken milanese ingredients mixed together. There were particular improvements to sauce color and vegetable texture, color, and flavor.

Example 7: Vegetarian Pad Thai

Vegetarian Pad Thai was prepared using the ovenable cooking apparatus 220, which included an aluminum basket 222 and an aluminum container 224. The basket 222 did not include perforations. The basket 222 contained 30 ounces of rice flour vermicelli and 12 ounces of vegetables, including julienne carrots, bean sprouts, and green onions. The container 224 contained 30 ounces of sietan (wheat gluten) and 25 ounces of Pad Thai sauce. The container 224 was covered and steamed for 1 hour. The basket was covered and steamed for 20 minutes.

Significant improvements were observed compared to Vegetarian Pad Thai prepared using a single tray and a frozen block without separating the ingredients. There were particular improvements to vegetable texture, color, and flavor, as well as sauce color.

Example 8: Dim Sum Party Pack

A Dim Sum Party Pack was prepared using the ovenable cooking apparatus 220, which included an aluminum basket 222 and an aluminum container 224. The basket 222 did not include perforations. The basket 222 contained 6 boa buns with asian barbeque pork, 6 LaChoy Chicken Potstickers, and 6 steamed vegetable spring rolls. The container 224 contained 12 ounces of teriyaki sauce. The container 224 was heated for 15 minutes in a 350 degree oven while covered. The basket was steamed uncovered for 10 minutes.

The Dim Sum Party Pack was not compared to a Dim Sum Party Pack prepared using the conventional single tray method because this type of meal may be cannot be prepared according to traditional methods due to the breaded ingredients. However, use of the ovenable cooking apparatus 220 to prepare the Dim Sum Party Pack resulted in a very high quality result, with no sogginess in the breaded ingredients.

The presently disclosed apparatus and methods provides numerous advantages over prior art. First, use of the container to hold the liquid component and the basket to hold the second food component provides separation of the food ingredients during cooking. This may lead to significant improvements in food quality, including improvement in texture, hold life, color, and flavor. Separation of the food ingredients also provides enhanced control of the moisture levels and ultimately, the quality of the food ingredients. Individually quick frozen (IQF) foods may be placed in the basket and may be separated from other food ingredients. As the IQF foods thaw, moisture can drain from the basket into the container. This keeps the IQF foods from becoming soggy from excess moisture, and also ensures that the other food ingredients in the container do not dry out.

Second, the apparatus and methods may allow the introduction of new food items into the foodservice industry. Currently, breaded items may not meet consumer standards when prepared in foodservice trays that do not provide separation of ingredients. By placing breaded items in the basket of the ovenable cooking apparatus, they may come out crispy instead of soggy. This will open up a plethora of new food items for the foodservice industry without excessive changes to current methods.

Third, apparatus and method may also provide significant thermodynamic and heat transfer advantages. Separating the food ingredients increases the surface area to volume ratio, which increases the surface area to which heat may be transferred. This may result in greater efficiency in cooking.

Fourth, the apparatus may be largely compatible with existing methods of meal preparation in the foodservice industry. By nesting the basket in the container during packaging and cooking, there may be no need for additional oven space to prepare the meal.

Last, the ovenable cooking apparatus may allow users to plate, assemble, and customize their meal according to their preferences and taste. The presentation of the meal may be more attractive and appealing when consumers can choose how to place each component and how much of each food ingredient they would like to put on their plate. By keeping the food components separate during cooking, the ingredients don't intermix and consumers can customize their meals with varying amounts of ingredients.

It may be believed that cooking apparatuses and methods and many of their attendant advantages will be understood by the foregoing description, and it will be apparent that various changes may be made in the form, construction and arrangement of the components thereof without departing from the scope and spirit of the above description or without sacrificing all of its material advantages. The form herein before described being merely an explanatory representation thereof, it may be the intention of the following claims to encompass and include such changes.

What is claimed:

1. A pre-packaged food product comprising:
   a food comprising a first food component and a second food component, the first food component and the second food component being at least substantially separate during cooking;
   a container including a base and sidewalls extending upwardly from the base, the container holding the first food component within an interior of the container formed by the base and sidewalls, the base having a contour extending upwardly to reduce a thickness of portions of the first food component on the contour relative to portions of the first food component on other portions of the base to enhance heat transfer to the portions of the first food component on the contour during cooking; and
   an inner container removeably received into the interior of the container and including a base and sidewalls, the inner container holding the second food component separate from the first food component,
   wherein the base of the inner container defines a contour above the contour of the base of the container when the inner container is received in the container, wherein a space between the contour of the base of the inner container and the contour of the base of the container defines an air gap, and wherein a portion of the contour of the base of the container extends into the contour of the base of the inner container and above a portion of the base of the container.

2. The pre-packaged food product of claim 1, wherein the base of the container includes multiple contours extending upwardly.

3. The pre-packaged food product of claim 2, wherein the first food component is supported by at least two of the multiple contours.

4. The pre-packaged food product of claim 1, wherein the sidewalls of the container extend upwardly to a rim of the container.

5. The pre-packaged food product of claim 4, wherein the rim includes a rolled edge along at least a portion of the rim.

6. The pre-packaged food product of claim 4, wherein the sidewalls of the inner container extend upwardly to a rim of the inner container.

7. The pre-packaged food product of claim 6, wherein the rim of the inner container includes a rolled edge along at least a portion of the rim of the inner container.

8. The pre-packaged food product of claim 6, wherein at least a portion of the rim of the inner container is supported by the rim of the container.

9. The pre-packaged food product of claim 1, wherein at least one of the container and the inner container are formed from at least one member of a group consisting of: aluminum, CPET, polypropylene, nylon, pressed paperboard, and molded pulp.

10. The pre-packaged food product of claim 1, wherein the pre-packaged food product is heatable in an oven selected from the group consisting of: a conventional, convection, and microwave oven.

11. The pre-packaged food product of claim 1, wherein the pre-packaged food product is suitable for refrigerated storage and freezer storage, with heating subsequent to storage.

12. A pre-packaged food product comprising:
    a food comprising a first food component and a second food component, the first food component and the second food component being at least substantially separate during cooking;
    a container including a base and sidewalls extending upwardly from the base to a rim of the container, the container holding the first food component within an interior of the container formed by the base and sidewalls, the base having a contour extending upwardly to reduce a thickness of portions of the first food component on the contour relative to portions of the first food component on other portions of the base to enhance heat transfer to the portions of the first food component on the contour during cooking; and
    an inner container removeably received into the interior of the container and including a base and sidewalls extending upwardly from the base to a rim of the container, the inner container holding the second food component separate from the first food component,
    wherein the base of the inner container defines a contour above the contour of the base of the container when the inner container is received in the container, wherein a space between the contour of the base of the inner container and the contour of the base of the container defines an air gap, and wherein a portion of the contour of the base of the container extends into the contour of the base of the inner container and above a portion of the base of the container.

13. The pre-packaged food product of claim 12, wherein at least a portion of the rim of the inner container is supported by the rim of the container.

14. The pre-packaged food product of claim 12, wherein at least one of the container and the inner container are formed from at least one member of a group consisting of: aluminum, CPET, polypropylene, nylon, pressed paperboard, and molded pulp.

* * * * *